(12) United States Patent
Hall et al.

(10) Patent No.: US 11,803,807 B2
(45) Date of Patent: Oct. 31, 2023

(54) FLEET FOR DELIVERING PACKAGES

(71) Applicant: Hall Labs LLC, Provo, UT (US)

(72) Inventors: Stephen Hall, Provo, UT (US); David R. Hall, Provo, UT (US); Jeff Duncan, Tucson, AZ (US); Nathan Davis, Bountiful, UT (US)

(73) Assignee: Hall Labs LLC, Provo, UT (US)

( * ) Notice: Subject to any disclaimer, the term of this patent is extended or adjusted under 35 U.S.C. 154(b) by 101 days.

(21) Appl. No.: 17/476,287

(22) Filed: Sep. 15, 2021

(65) Prior Publication Data
US 2022/0081230 A1 Mar. 17, 2022

Related U.S. Application Data

(60) Provisional application No. 63/078,637, filed on Sep. 15, 2020, provisional application No. 63/078,619, (Continued)

(51) Int. Cl.
*G06Q 10/08* (2023.01)
*G06Q 50/28* (2012.01)
(Continued)

(52) U.S. Cl.
CPC ....... *G06Q 10/0836* (2013.01); *A47G 29/141* (2013.01); *B60L 53/80* (2019.02);
(Continued)

(58) Field of Classification Search
CPC ............ B65G 67/02; B65G 2814/0313; B60P 1/6418; B60P 1/6427; B60P 7/13; G05D 1/0291; B65D 88/12
See application file for complete search history.

(56) References Cited

U.S. PATENT DOCUMENTS

| 11,377,019 B1* | 7/2022 | Van Schaack ........ B60P 7/0853 |
| 2020/0148239 A1* | 5/2020 | Cooper .............. G05B 19/4189 |

(Continued)

*Primary Examiner* — Saul Rodriguez
*Assistant Examiner* — Ashley K Romano

(57) ABSTRACT

A fleet for delivering packages comprising a first number of containers, each container comprising at least one compartment for receiving packages at a main distribution center. The container comprises a first attachment member on an outer surface and a second attachment member on an outer surface. The fleet comprises a second number of long-range transports, each long-range transport is configured to carry multiple containers from the main distribution center to an intermediate distribution center, each long-range transport comprising multiple first attachment receivers, whereby the multiple containers are attached to the long-range transports during transport from the main distribution center to the intermediate distribution center. The fleet comprises a third number of short-range tractors, each short-range tractor is configured to carry at least one container from the intermediate distribution center to delivery destinations for the packages in the container, each tractor comprising at least one second attachment receiver, whereby the at least one container is attached to the short-range tractor during transport from the intermediate distribution center to the delivery destinations and back to the intermediate distribution center. The third number is at least twice as large as the second number and wherein the first number is at least twice as large as the third number.

17 Claims, 32 Drawing Sheets

Related U.S. Application Data filed on Sep. 15, 2020, provisional application No. 63/078,628, filed on Sep. 15, 2020, provisional application No. 63/078,645, filed on Sep. 15, 2020, provisional application No. 63/078,631, filed on Sep. 15, 2020.

(51) Int. Cl.

| | |
|---|---|
| G06Q 10/06 | (2023.01) |
| G07C 9/00 | (2020.01) |
| G07C 9/20 | (2020.01) |
| B60P 3/42 | (2006.01) |
| B60P 1/64 | (2006.01) |
| B60P 1/00 | (2006.01) |
| B60P 1/43 | (2006.01) |
| B60P 1/48 | (2006.01) |
| B65D 88/12 | (2006.01) |
| B65D 90/00 | (2006.01) |
| B65G 67/02 | (2006.01) |
| B60L 53/80 | (2019.01) |
| B60W 60/00 | (2020.01) |
| B60R 25/24 | (2013.01) |
| B62D 33/06 | (2006.01) |
| A47G 29/14 | (2006.01) |
| G01S 19/14 | (2010.01) |
| G05D 1/02 | (2020.01) |
| B65G 61/00 | (2006.01) |
| G06Q 10/0836 | (2023.01) |
| B60P 3/00 | (2006.01) |
| B60P 7/13 | (2006.01) |
| G06Q 10/0631 | (2023.01) |

(52) U.S. Cl.
CPC ............. *B60P 1/003* (2013.01); *B60P 1/43* (2013.01); *B60P 1/486* (2013.01); *B60P 1/6409* (2013.01); *B60P 1/6427* (2013.01); *B60P 3/007* (2013.01); *B60P 3/42* (2013.01); *B60P 7/13* (2013.01); *B60R 25/24* (2013.01); *B60W 60/00* (2020.02); *B62D 33/06* (2013.01); *B65D 88/12* (2013.01); *B65D 90/00* (2013.01); *B65G 67/02* (2013.01); *G01S 19/14* (2013.01); *G05D 1/0221* (2013.01); *G05D 1/0234* (2013.01); *G05D 1/0291* (2013.01); *G06Q 10/06315* (2013.01); *G06Q 50/28* (2013.01); *G07C 9/00309* (2013.01); *G07C 9/00658* (2013.01); *G07C 9/00896* (2013.01); *G07C 9/20* (2020.01); *A47G 2029/149* (2013.01); *B60P 1/6418* (2013.01); *B65G 61/00* (2013.01); *B65G 2814/0313* (2013.01); *G07C 2009/0065* (2013.01); *G07C 2009/0092* (2013.01); *G07C 2009/00642* (2013.01); *Y10S 901/00* (2013.01)

(56) References Cited

U.S. PATENT DOCUMENTS

| | | | |
|---|---|---|---|
| 2020/0174494 A1* | 6/2020 | Lessels | G06Q 50/28 |
| 2021/0053780 A1* | 2/2021 | Eidsmore | B60P 1/365 |
| 2021/0278856 A1* | 9/2021 | Kniess | B60P 1/649 |
| 2021/0316766 A1* | 10/2021 | O'Donnell | B60P 3/41 |
| 2021/0387808 A1* | 12/2021 | Kalouche | B65G 1/1376 |
| 2021/0395011 A1* | 12/2021 | Crawford, Jr. | G05D 1/0225 |
| 2022/0063903 A1* | 3/2022 | O'Malley | B60P 1/6481 |
| 2022/0185578 A1* | 6/2022 | Coomer | B60P 7/13 |
| 2022/0212728 A1* | 7/2022 | Ben Arye | B60P 7/0815 |
| 2022/0227236 A1* | 7/2022 | Chang | G06Q 10/083 |

* cited by examiner

FLEET FOR DELIVERING PACKAGES

CROSS-REFERENCE TO RELATED APPLICATIONS

This application claims priority to U.S. Provisional Patent Application No. 63/078,619 titled "Package Delivery System", U.S. Provisional Patent Application No. 63/078,628 titled "Multi Use Package Receptacle", U.S. Provisional Patent Application No. 63/078,631 titled "Package Delivery Vehicle", U.S. Provisional Patent Application No. 63/078,637 titled "Fleet for Delivering Packages", and U.S. Provisional Patent Application No. 63/078,645 titled "Container for Delivering Packages" filed on Sep. 15, 2020, which are incorporated herein by reference in their entirety.

TECHNICAL FIELD

The present disclosure relates generally to the field of delivery logistics.

BACKGROUND

Delivery of packages is a continually changing field. The logistics of moving packages from where they are to where they are wanted and at the low costs and speeds, they are needed in the modern era requires more and more thought. The ability to deliver packages more efficiently at lower costs is desired, especially when it comes to the part that is typically called "the last mile."

SUMMARY

In a first aspect, a fleet for delivering packages comprising a first number of containers, each container comprising at least one compartment for receiving packages at a main distribution center, a first attachment member on an outer surface, and a second attachment member on an outer surface, a second number of long-range transports, each long-range transport configured to carry multiple containers from the main distribution center to an intermediate distribution center, each long-range transport comprising multiple first attachment receivers, whereby the multiple containers are attached to the long-range transports during transport from the main distribution center to the intermediate distribution center, and a third number of short-range tractors, each short-range tractor configured to carry at least one container from the intermediate distribution center to delivery destinations for the packages in the container, each tractor comprising at least one second attachment receiver, whereby the at least one container is attached to the short-range tractor during transport from the intermediate distribution center to the delivery destinations and back to the intermediate distribution center, and wherein the third number is at least twice as large as the second number and wherein the first number is at least twice as large as the third number.

In another aspect of the invention, the long-range transports comprise a trailer pulled by a long-range tractor.

In a still further aspect, the first attachment member is located on a top surface of the containers, whereby multiple containers hang from a trailer load bearing structure when attached.

In a yet still further aspect, the second attachment member is located on a bottom surface of the containers, whereby the containers rest on top of a tractor load bearing structure when attached. The trailer further comprises a lifting mechanism configured to move the trailer load bearing structure vertically, whereby when a container supported by the trailer load bearing structure is moved down, the container comes into contact with and rests on top of the tractor load bearing structure and when the trailer load bearing structure is moved up, the container is lifted off of the tractor load bearing structure to be fully supported by the trailer load bearing structure.

In another aspect, each short-range tractor further comprises a lifting mechanism configured to move the short-range tractor load bearing structure vertically, whereby when a container supported by the short-range tractor load bearing structure is moved up, the container comes into contact with and attaches to the trailer load bearing structure and when the short-range tractor load bearing structure is moved up, the container is released from of the trailer load bearing structure to be fully supported by the short-range tractor load bearing structure.

In another aspect of the invention, the short-range tractor load bearing structure is a horizontal, longitudinal rail, extending rearwardly from a cab. The bottom surface of the containers includes a channel into which the rail is inserted to attach a container to a short-range tractor.

In still another aspect, each trailer load bearing structure is a transverse rail extending from a longitudinal frame member of the trailer. The top surface of the containers includes a channel, which channel captures a transverse rail to attach a container to a trailer.

In a still further aspect, each trailer comprises at least four transverse rails to thereby attach at least four containers. The trailer further comprises a lifting mechanism for each of the at least four transverse rails, with each lifting mechanism configured to move one transverse rail vertically, whereby when a container supported by the transverse rail is moved down, the container comes into contact with and rests on top of the short-range tractor load bearing structure and when the transverse rail is moved up, the container is lifted off of the short-range tractor load bearing structure to be fully supported by the trailer load bearing structure.

In a still yet further aspect, the trailer further comprises a lifting mechanism for all of the at least four transverse rails, with the lifting mechanism configured to move all of the transverse rail vertically, whereby when containers supported by the transverse rail are moved down, the containers comes into contact with and rests on top of the short-range tractor load bearing structures and when the transverse rails are moved up, the containers are lifted off of the short-range tractor load bearing structures to be fully supported by the transverse rails.

In another aspect of the invention, a system for package distribution comprising a long-range transport comprising at least four hanging mounts, at least four containers each comprising an overhead mount and a bottom mount and each short-range transport carrying packages, each of the overhead mounts configured to mate with one of the hanging mounts, at least four short-range tractors, each comprising a top mount and each short-range tractor being self-propelled, the top mount configured to mate with the bottom mount, and wherein the short-range tractor mates with the bottom mount, the overhead mount disconnects from the hanging mount, the short-range tractor travels and delivers at least a portion of the packages, the short-range tractor returns to the long-range transport, situating the container such that the overhead mount mates with the hanging mount, the bottom mount and top mount disconnecting, leaving the container mounted to the long-range transport.

In still another aspect, the top mount comprises pins and the bottom mount comprises holes, the pins configured to extend and mate with the holes, attaching the container to the short-range tractor.

In a still further aspect, the overhead mount comprises lips that extends over both sides of the container and the hanging mount comprises two grooves with end caps, the lips resting in the grooves between the end caps, the container engaging the grooves by being raised up such that the lip passes over the end caps, aligning the lips with the grooves, and lowering the container until the lips rest in the grooves.

In a yet still further aspect, the short-range tractor is configured to raise the container by hydraulic suspension, move the container to align the lips with the grooves, and lower the container, disengaging top mount from the bottom mount when the lips reach the grooves, wherein removal of the container from the grooves involves reversing these steps.

In another aspect, a shipping container comprising a top mounting member configured to mount the shipping container to hang from a structure or a first transport, and a bottom mounting member configured to mount the shipping container on and be secured to a second transport.

In still another aspect, the top mounting member of the shipping container is a groove captured by a rail on the first transport.

In a yet still further aspect, the bottom mounting member of the shipping container is a groove captured by a rail on the second transport.

Further aspects and embodiments are provided in the foregoing drawings, detailed description, and claims. Unless specified otherwise, the features as described herein are combinable and all such combinations are within the scope of this disclosure.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Overview

Figure 1:
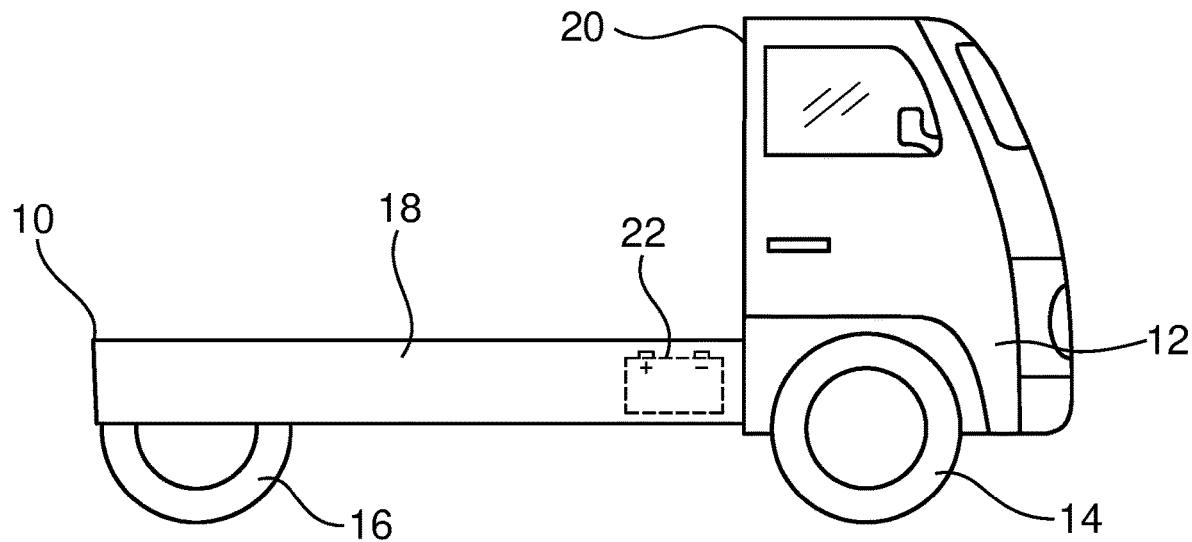
FIG. 1 is a side view of a tractor, according to an embodiment of the disclosure.

Embodiments of methods, devices and processes described herein are directed towards delivery logistics. Delivery logistics provides efficient and low cost systems and methods to move packages from one location to another.

The disclosure herein describes a fleet for delivering packages. The fleet includes a first number of containers comprising a plurality of compartments, a second number of long-range transports to transport multiple containers to an intermediate destination and a third number of short-range tractors to carry at least one container to deliver packages to delivery destinations. The emptied containers can be loaded onto the long-range transports and transported back to a warehouse to be re-loaded with packages.

Definitions

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, the term "tractor" is a type of vehicle that carries a removable container to transport and deliver goods or packages. The tractor can be driven by a human or be autonomously driven.

As used herein, the term "autonomous vehicle" refers to self-driving vehicle, such as an autonomous tractor or autonomous transport. An autonomous vehicle is a vehicle that is autonomously driven and is capable of sensing its environment and moving safely with little or no human input. Self-driving vehicles can combine a variety of sensors to perceive their surroundings, such as radar, lidar, sonar, global positioning system (GPS), odometry, and inertial measuring units. Advanced control systems comprising hardware and software interpret sensory information to identify appropriate navigation paths, as well as obstacles and relevant signage.

As used herein, the term "container," which may also be referred to as a "package container," or "short-range transport," is meant to refer to a box or other device to transport goods or packages. As will be discussed below, the container is preferably provided with compartments for holding multiple packages. Also, as discussed below, the containers may either be self-propelled or transported by short-range tractors.

As used herein, the term "curb side" is the right side of the vehicle for a drive on the right country and the left side for the vehicle for a drive on the left country.

As used herein, the term "neighborhood" has a relatively broad meaning, referring to either a rural area with scattered houses, a suburban area with adjacent houses, an apartment or condo complex, or a group of businesses.

As used herein, the term "warehouse" is used synonymously with the terms "main distribution center," "distribution point" and "central distribution point." All of these terms are intended to refer to a building or group of buildings or shelters where goods are stored for distribution. In some warehouses, goods are also packaged for shipment to the end consumer.

As used herein, the terms "delivery destinations" and "end destinations" are intended to be synonymous, referring to the destination at which the packages are delivered.

As used herein, the terms "intermediate destination" and "intermediate distribution center" are intended to be synonymous. Both terms are intended to refer to a location between the warehouse and the delivery destinations.

As used herein, the term "Mecanum wheel" refers to an omnidirectional tireless wheel design for a land-based vehicle to move in any direction. The wheel is composed of a series of rubberized external rollers obliquely attached to the whole circumference of the wheel rim.

As used herein, the term "artificial neural network" refers to computing systems inspired by the biological neural networks that constitute animal brains. An ANN is based on a collection of connected units or nodes called artificial neurons, which loosely model the neurons in a biological brain. Each connection, like the synapses in a biological brain, can transmit a signal to other neurons. An artificial neuron receives a signal then processes it and can signal neurons connected to it. The "signal" at a connection is a real number, and the output of each neuron is computed by some non-linear function of the sum of its inputs.

Exemplary Embodiments

The present disclosure relates to delivery logistics to provide an efficient and low cost method to move packages from one location to another, such as from a warehouse to the recipient. Containers are loaded with packages at the warehouse. The containers may be releasably attached to trailers by an attachment mechanism. The trailers are typically connected to long-range transports to move the containers from the warehouse to an intermediate destination that is closer in proximity to where the packages need to be delivered. From the intermediate destination, the containers are transported to end destinations. The containers may be configured to be carried by short-range tractors or may be self-propelled, to deliver the packages to package receptacles or to individual residences or businesses of the recipients.

In various exemplary embodiments, the containers comprise a plurality of package storage modules wherein each module has an individually controlled access door. Each storage module can contain one or more packages. Upon reaching the delivery destination, the doors can be individually opened to access the one or more packages to be delivered.

In various exemplary embodiments, the short-range tractors are capable of individually loading one or more containers connected to a trailer then disconnecting the container from the trailer. The tractor can then move the container to locations where the packages located within the container can be delivered to the end destinations. The tractors may be human, remote control, or autonomously driven and can be powered by a battery or an internal combustion engine or a combination thereof.

In various exemplary embodiments, a multi-use receptacle may be used to receive and pickup packages at the end destination. The receptacle has a plurality of storage compartments that can be locked and unlocked and can be individually accessed by a user. The storage compartments may be assigned to an individual dwelling such as a home or apartment. The multi-use receptacle may also be used to receive trash or re-usable packaging to be shipped back to a warehouse for disposal or re-use for packaging and delivery of new and different goods or products.

In various exemplary embodiments, re-usable packaging may be used to deliver products from the warehouse to the end destination and delivered empty back to the warehouse for "full circle" zero waste. The packaging may come in a limited number of standard sizes for easier planning of loading into the containers at the warehouse. The packages in some instance can have insulation or refrigeration for delivery of spoilable items such as food products. The packaging can have electronics for tracking purposes in the event the packages are lost or stolen.

An advantage of several embodiments of the invention is that it is possible to reduce the amount of packaging used in shipping products. Often, in current shipping systems, products that are already contained in a package, such as a cardboard box from the manufacturer, are placed in another box, a bag or a padded envelope for shipping. This is done to protect the inner packaging and to facilitate addressing of the package. Naturally, this outer packaging adds to the cost and environmental footprint of shipping. Nevertheless, in accordance with embodiments of the present invention, it may not be necessary to add this extra packaging. This is particularly true for the embodiments where the packages are delivered to a receptacle, which serves to protect the upon package. This is also particularly true for the embodiments where the packages are placed in individual compartments in the container, thus protecting the package and also facilitating getting the package to the correct recipient.

In various exemplary embodiments, a fleet for delivering packages can be assembled comprising a first number of containers, a second number of trailers, and a third number of tractors. The first number of containers is at least twice as large as the third number of tractors and the third number of tractors is at least twice as large as the second number of trailers.

In various exemplary embodiments, delivery robots may be used for "last mile" deliveries of packages from a container to a recipient at an end destination. The delivery robots operate autonomously or by remote control. The robots may comprise a robotic arm to remove a package from the cargo bay of the robot.

Package Delivery System

The following embodiments relate to a package delivery system for moving packages from a warehouse or central distribution point to end destinations.

Figure 29:
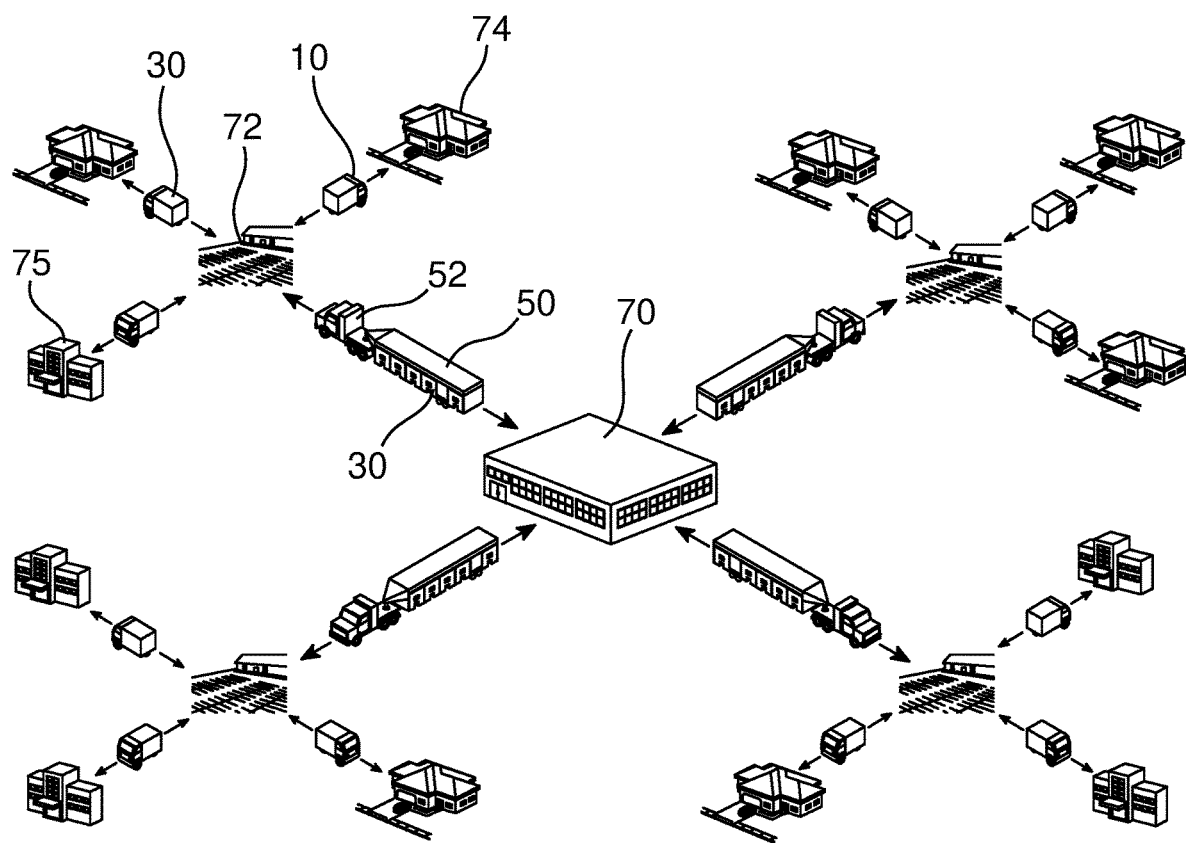
FIG. 29 is a schematic diagram of a system for delivering packages from a warehouse to end destinations, according to an embodiment of the disclosure.

FIG. 29 is a schematic diagram of a system for delivering packages from a warehouse to end destinations, according to an embodiment of the disclosure. Warehouse 70 contains a plurality of packages to be delivered to end destinations. End destinations can include home residences 74 such as an apartment or house, or a commercial or industrial site 75, or other location. In some embodiments, the end destinations may be one or more package receptacles. The system includes a fleet of self-propelled long-range transports, preferably consisting of trailers 50 pulled by long-range tractors such as semis 52. The system also includes a fleet of containers 30. The long-range transports may be powered by an electric motor wherein a rechargeable battery provides power to the electric motor. The long-range transports may also be self-driving and autonomous or remote controlled.

Packages that are destined for end destinations 74 are loaded into the containers 30. The containers may also be referred to as short-range transports. After loading, the containers are loaded onto the trailers 50 of the long-range transports. In some embodiments, the containers may be loaded with a plurality of packages while attached to the long-range transports. In some embodiments, the containers have a plurality of boxes or compartments each with a door, each of the plurality of boxes carrying a package or packages for each end destination. Preferably, each long-range transport is configured to be loaded with at least four loaded containers.

The long-range transports move the containers 30 from the warehouse 70 to an intermediate destination 72, wherein the containers are configured to then be transported to an end destination, i.e., the "last mile." The containers offload their packages at the end destination and are transported back to the long-range transports to be returned to the warehouse. In some embodiments, a fleet of short-range tractors 10 are maintained and located at the intermediate destination. The tractors drive under the containers that are loaded on the long-range transport, whereupon the containers mount to the tractors and detach from the long-range transport.

The tractors 10 are self-propelled and may be either self-driving autonomous tractors, remote controlled, or driven by a driver in the cab. The tractors then travel from the intermediate destinations to end destinations 74, 75 that are proximate to the intermediate destinations. At least some of the packages are delivered to the end destinations. After completing delivery, the tractors return the containers to the long-range transports, which return the containers back to the warehouse for reloading of new packages.

Figure 30:
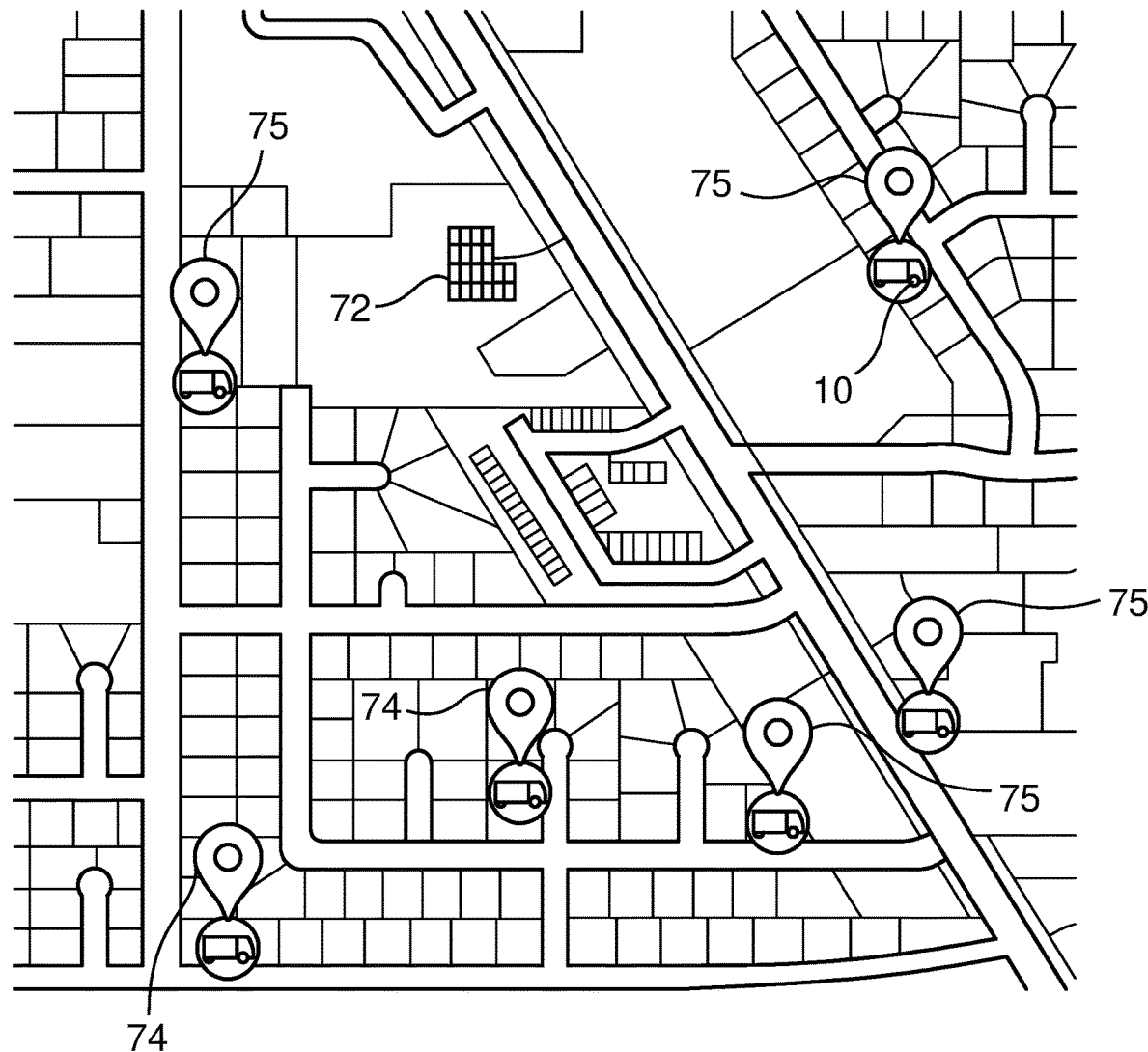
FIG. 30 is a schematic representation illustrating the system for delivering packages to the end destinations, according to an embodiment of the disclosure.

FIG. 30 is a schematic representation of the "last mile" delivery, i.e., the containers being moved by the short-range tractors from the intermediate destinations to the end destinations, according to an embodiment of the disclosure. The containers disperse from the intermediate destination to travel to end destinations throughout a city, town, or other location where packages are delivered.

In one embodiment, there are more containers 30 than there are long-range transport slots, allowing for continual loading of containers while the loaded containers are brought to the intermediate destinations 72. In one embodiment, there are twice as many containers than long-range tractors.

In one embodiment, a processor is used to process the data relating to the identity of the packages and their respective delivery destinations. The processor is configured to determine efficient loading of the packages into each of the containers. This means that the packages will be removed from the container in the order of delivery at the end destinations. This processor further determines efficient loading of the container onto the long-range transports. In one embodiment, the processor determines efficient locations for the one or more intermediate destinations based on the end destinations of the packages loaded in the containers on that particular day. The processor may still be further configured to determine efficient routes for the containers to travel to the end destinations. In an alternative embodiment, the location of the intermediate destinations is determined based on historical data for packages over a given number of days, weeks, or months. In such determinations, the processor works with data based on distance and current and/or historical travel times.

Intermediate locations are selected based on their physical location, i.e., for proximity to the end destinations as well as proximity to major highways. In some embodiments, the same intermediate destinations are used from day to day. In other embodiments, the intermediate destinations are changed each day to provide the most efficient delivery options for that day's deliveries.

Preferably, the intermediately delivery destinations are pre-existing paved lots, so as to save the expense of building them anew. For example, parking lots at malls or factories may be used, particularly if the time of day for deliveries would not interfere with other uses.

In other embodiments, the intermediate delivery destinations are purpose built for the delivery system. This is especially preferred when the short-range tractors are stored and even charged at the intermediate delivery destinations.

It should be noted that, although the preferred embodiment is used in the context of daily deliveries, the inventions herein are also suited for use in delivery systems which provide the opportunity of multiple deliveries and/or pickups per day. Likewise, the inventions herein are suited for use in sparsely populated areas where deliveries and pickups occur less than once a day.

In some embodiments, during delivery of at least some of the packages, the container stops at pickup locations proximate to the end destinations and receives new packages to be delivered by the container back to the warehouse. In some embodiments, a GPS unit and processor also determine the route and order to reach the delivery destinations.

In some embodiments, the package delivery system may include packaging that can be re-used one or more times. The products can be packaged at the warehouse with the re-usable packaging. At the end destination, the recipient removes the product from the packaging and returns it to the package delivery system where the packaging can be sent back to the warehouse where it can be used to package other products for delivery to other end destinations such that there is "full circle" usage and zero waste. The re-usable packaging may only come in a limited number of sizes, perhaps 3-4 sizes as most products can be packaged in a limited number of package sizes. This allows for predictable and efficient packing of packages in the containers. In other embodiments, the re-usable packaging is removed by the delivery person or delivery robot at the time the item is delivered.

The re-usable packaging may also comprise refrigeration units and/or insulation for delivery of perishable products such as food, livestock, chemicals, or prescription drugs. The packaging may also comprise electronics for logistical and tracking purposes. For example, a Bluetooth® beacon or other wireless identifier may be incorporated into the re-usable packaging. Such a beacon may be used to give the re-usable packaging a unique identifier, which can be used for tracking and selection of the route and particular container to load the package on. The electronics may also be used to confirm delivery, or to track lost or stolen packages. The packaging may comprise wheels to easily move the package into a garage or through a door to a residence, commercial or industrial location. In other embodiments, the re-usable packaging may be self-propelled to autonomously move the package from the delivery container to the precise spot where the end user dictates the package be left. Upon delivery of the package contents, the self-propelled re-useable packaging can autonomously return to the delivery container. The self-propelled re-usable packaging may also move by remote control.

Fleet for Delivering Packages

The following embodiments relate to a fleet for delivering packages, i.e., the various components of the delivery system that move the packages and containers from central warehouse to the end destinations. In the preferred embodiment, this fleet is comprised of containers, long-range transports, and short-range tractors.

Figure 16:
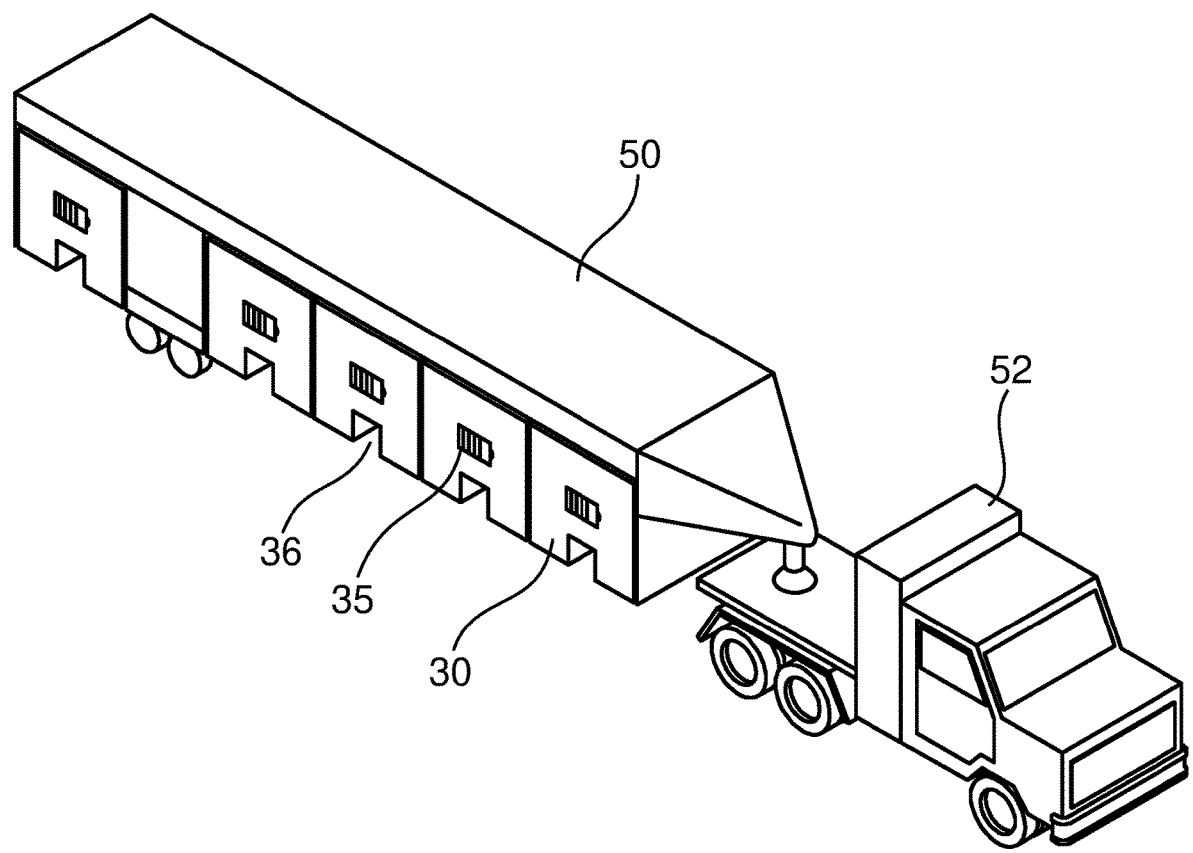
FIG. 16 is an isometric view of a long-range transport carrying removable containers, according to an embodiment of the disclosure.

In one embodiment, a fleet of self-propelled long-range transports are provided. FIG. 16 is an isometric view of a single long-range transport carrying removable containers 30, according to an embodiment of the disclosure. The long-range transport comprises a trailer 50 coupled with a long-range tractor, such as a semi or rig 52. Each of the containers are configured to be loaded at the warehouse with packages to be delivered to end destinations. Preferably, each long-range transport is configured to be loaded with at least four of the loaded containers and transport the at least four of the loaded containers from the warehouse to one or more intermediate destinations. Upon arrival of one of the loaded long-range transports at one of the one or more intermediate destinations, at least one of the loaded containers separates from the loaded long-range transport, whereupon the separated container delivers packages to the end destinations proximate to the one of the one or more intermediate destinations. After delivery of at least some of the packages loaded thereon at the warehouse, the container is once again loaded on the long-range transport and returned to the warehouse to be loaded with more packages.

As mentioned, the fleet preferably comprises a number of short-range tractors that transport the containers from the intermediate destination to the end destination. In an alternative embodiment, the containers are self-propelled, i.e., get themselves from intermediate destination to the end destinations. Such self-propelled containers may be human driven (See FIG. 38), remote-controlled, or autonomous (see FIG. 39).

Returning again to the preferred embodiment, the containers are mounted on the short-range tractors to facilitate delivery of packages from the intermediate destinations to the end destinations. The short-range tractors may be maintained at the one or more intermediate destinations or elsewhere. The containers are loaded onto the short-range tractors at the one or more intermediate destinations.

In the preferred embodiment, there are more trailers in the fleet than long-range tractors. In this way, the long-range tractors do not have to stand idle waiting for unloading and reloading the containers and are instead always in motion for increased efficiency. In other words, the long-range tractor can park a loaded trailer at the intermediate destination, whereupon the short-range tractors come and take the appropriate containers and start their delivery routes. In the meantime, the long-range tractor can hitch a trailer that has already had the containers returned after deliveries have been made, whereupon the long-range tractor can move to another intermediate destination or return to the central warehouse. Alternatively, the long-range tractor simply waits at the intermediate destination for the containers to be brought back, whereupon the long-range tractor returns the emptied containers to the warehouse.

Figure 35:
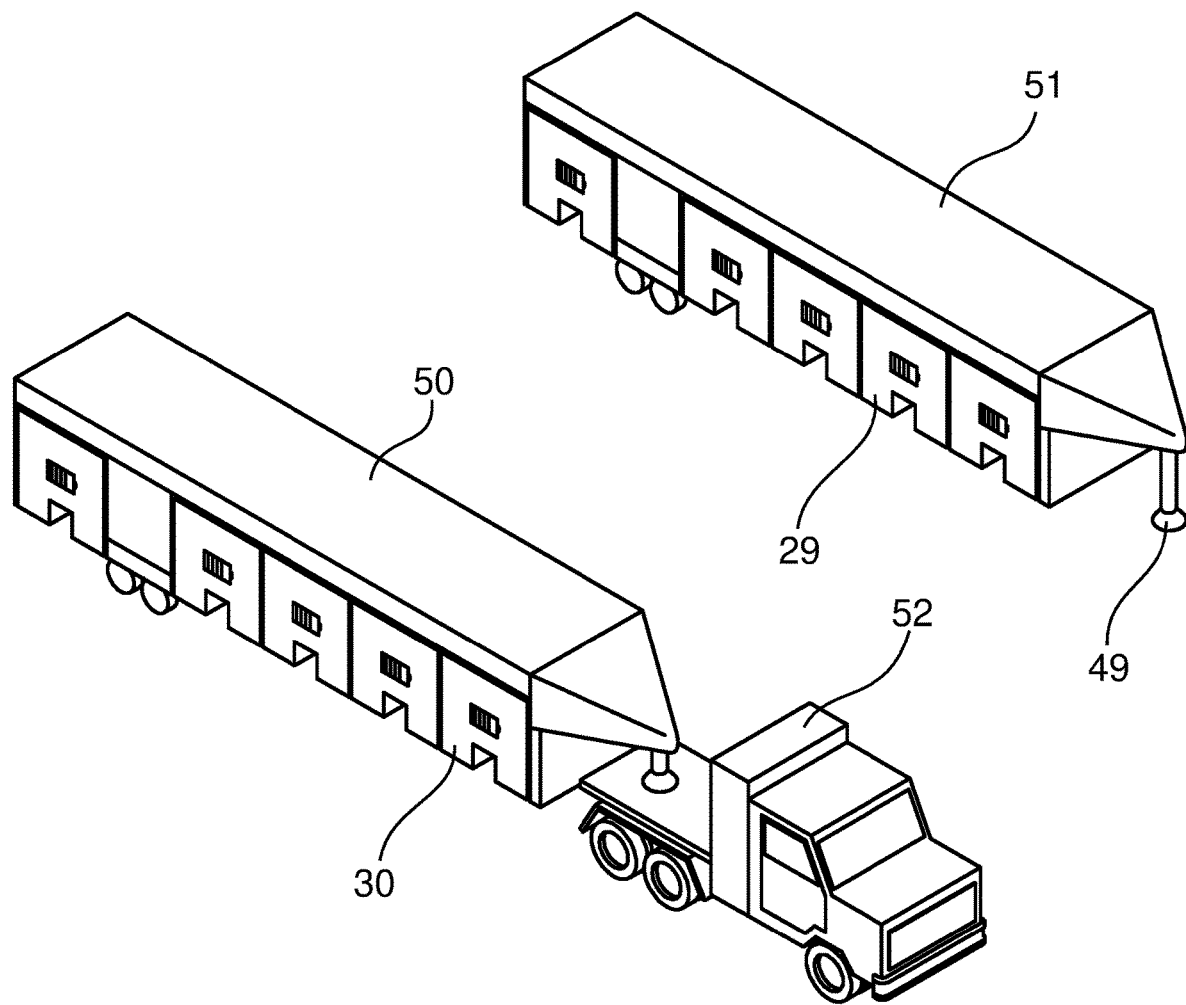
FIG. 35 is an isometric view of a long-range transport and trailer, according to an embodiment of the disclosure.

This scheme is illustrated in FIG. 35, which shows a second trailer 51 is idle and supported on its foot 49. The second trailer 51 has containers 29 that are empty and the long-range transport 52 switches from the first trailer 50 to the second trailer 51 and returns the second trailer 51 and its associated containers 29 for reloading, leaving the first trailer 50 to be unloaded, the containers to do their deliveries, and then reloaded. This prevents the driver or long-range transport 52 from being idle.

In one embodiment, a fleet of short-range package delivery vehicles is provided. Preferably, a first number of tractors is provided, each with a motor, a pair of front wheels, a rear wheel, and a rail between the pair of front wheels and the rear wheel. A second number, at least twice as large as the first number of removable containers is provided, each comprising a space for storing packages, a bottom of the removable containers configured to fit over the rail and rear wheel and to mount to the rail of the tractors.

At any given time, some of the removable containers are mounted to tractors ready for delivery of the packages, and others of the removable containers are separated from tractors and are being loaded with packages at a distribution center. Preferably, the system has more removable cargo sections (short-range transports or containers) than driving sections (tractors). In this way, the removable cargo sections can be loaded with packages at the warehouse when not attached to the driving section.

In one embodiment, a fleet for delivering packages is provided. A first number of containers is provided. Each container has at least one compartment for receiving packages at a main distribution center, a first attachment member on an outer surface, and a second attachment member on an outer surface. A second number of trailers is provided. Each trailer is configured to carry multiple containers from the main distribution center to an intermediate distribution center. Each trailer has multiple first attachment receivers, whereby the multiple containers are attached to the trailer during transport from the main distribution center to the intermediate distribution center. A third number of tractors is provided. Each tractor is configured to carry at least one container from the intermediate distribution center to delivery destinations for the packages in the container. Each tractor has at least one second attachment receiver. The at least one container is attached to the tractor during transport from the intermediate distribution center to the delivery destinations and back to the intermediate distribution center.

Preferably, the third number (short-range tractors) is at least twice as large as the second number (long-range transports, e.g., trailers) and the first number (containers) is at least twice as large as the third number. In other words, there are at least twice as many containers as there are short-range tractors, so that the short-range tractors do not have to be idle while the containers are being loaded at the warehouse or in transit between the warehouse and the intermediate distribution point. Also, there are at least twice as many short-range tractors as there are long-range transports or trailers, so that the long-range transports can be used to bring containers to multiple short-range tractors with each trip.

Container for Delivering Packages

The following embodiments relate to containers for delivering packages.

Figure 3:
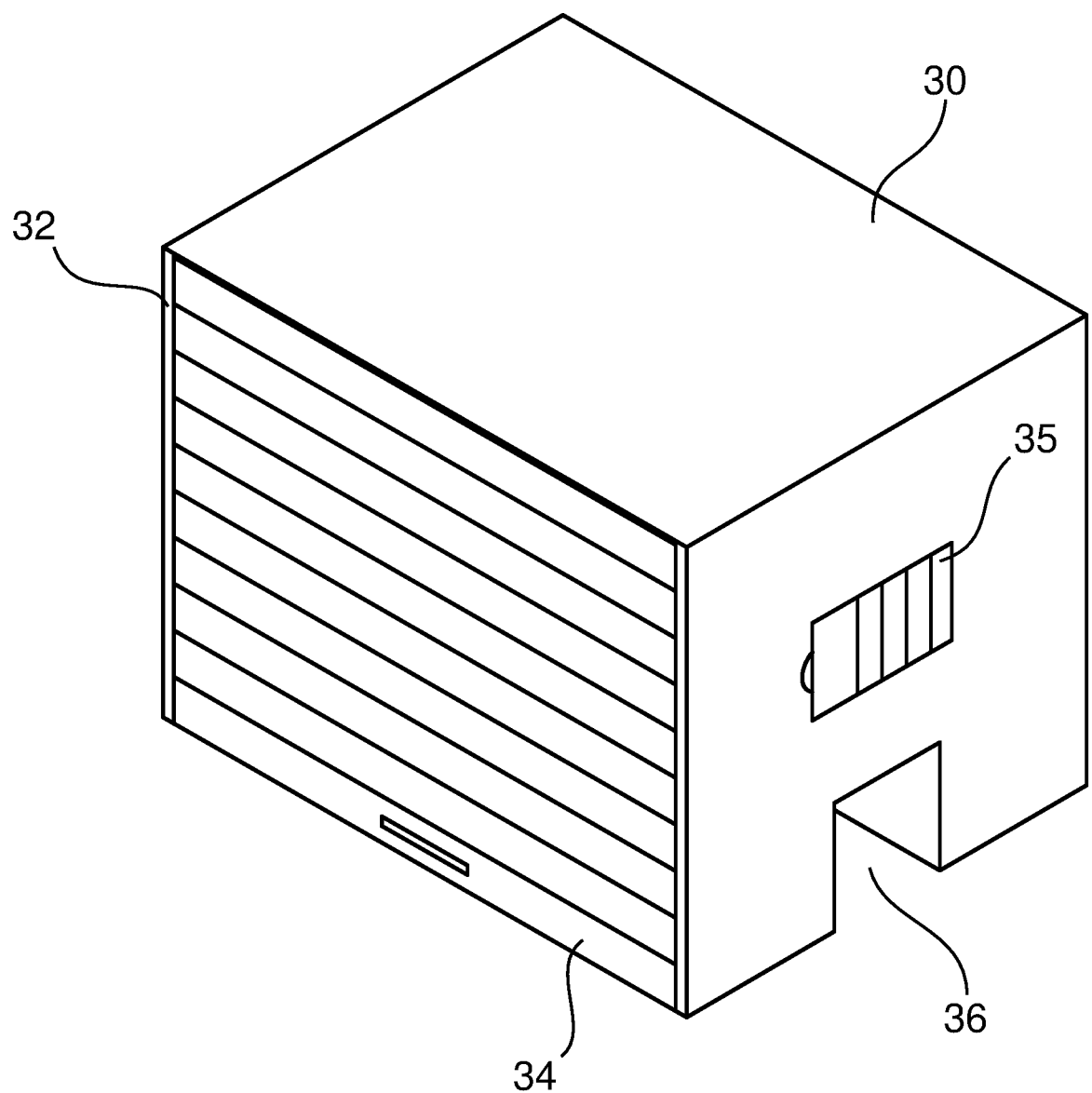
FIG. 3 is an isometric view of a removable container, according to an embodiment of the disclosure.
Figure 8:
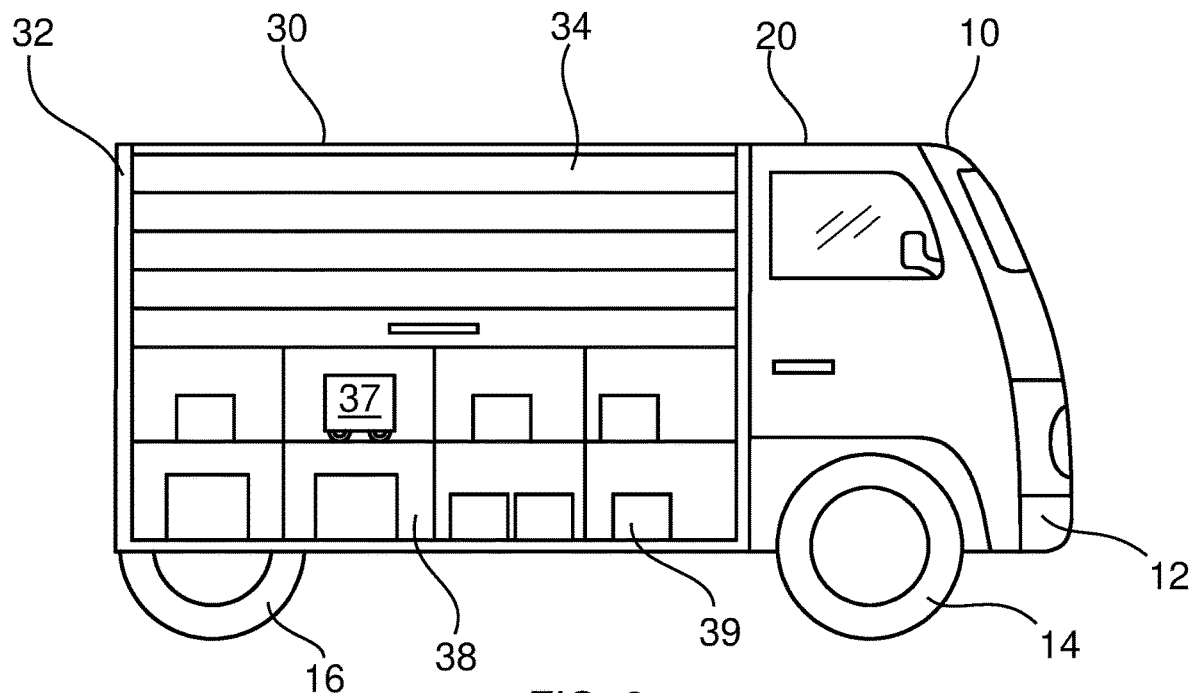
FIG. 8 is a side view of the tractor and removable container illustrated in FIG. 5, the container door being partially open, according to an embodiment of the disclosure.
Figure 9:
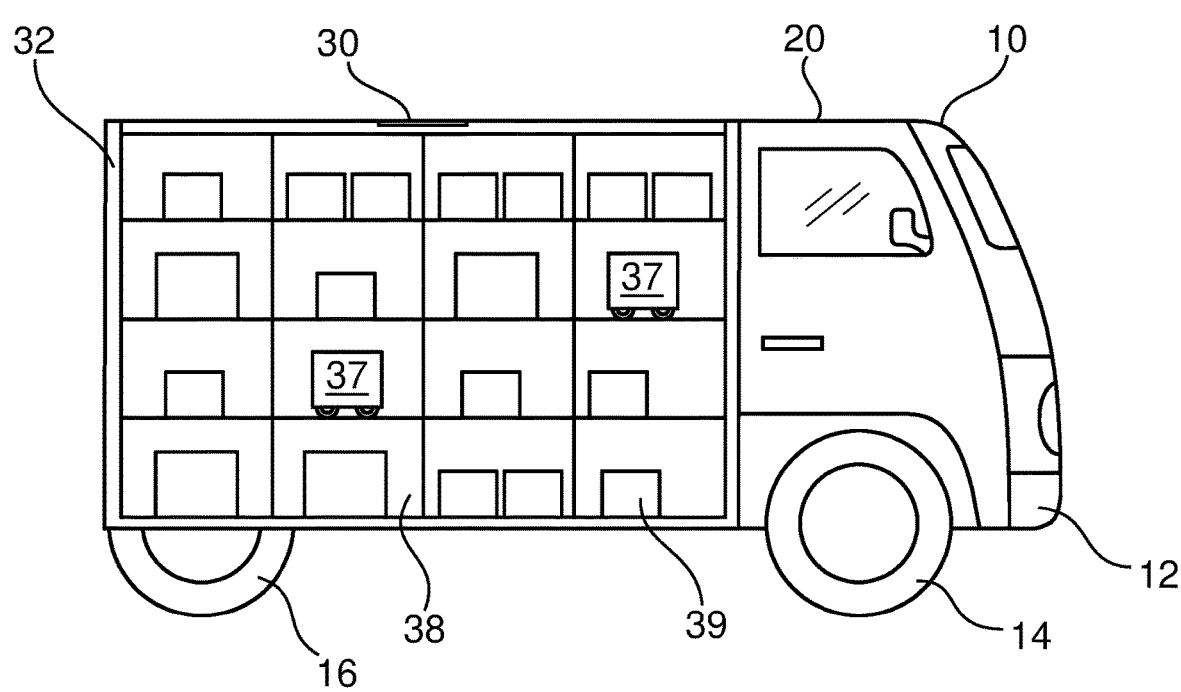
FIG. 9 is a side view of the tractor and removable container illustrated in FIG. 5, the container door completely open, according to an embodiment of the disclosure.
Figure 33:
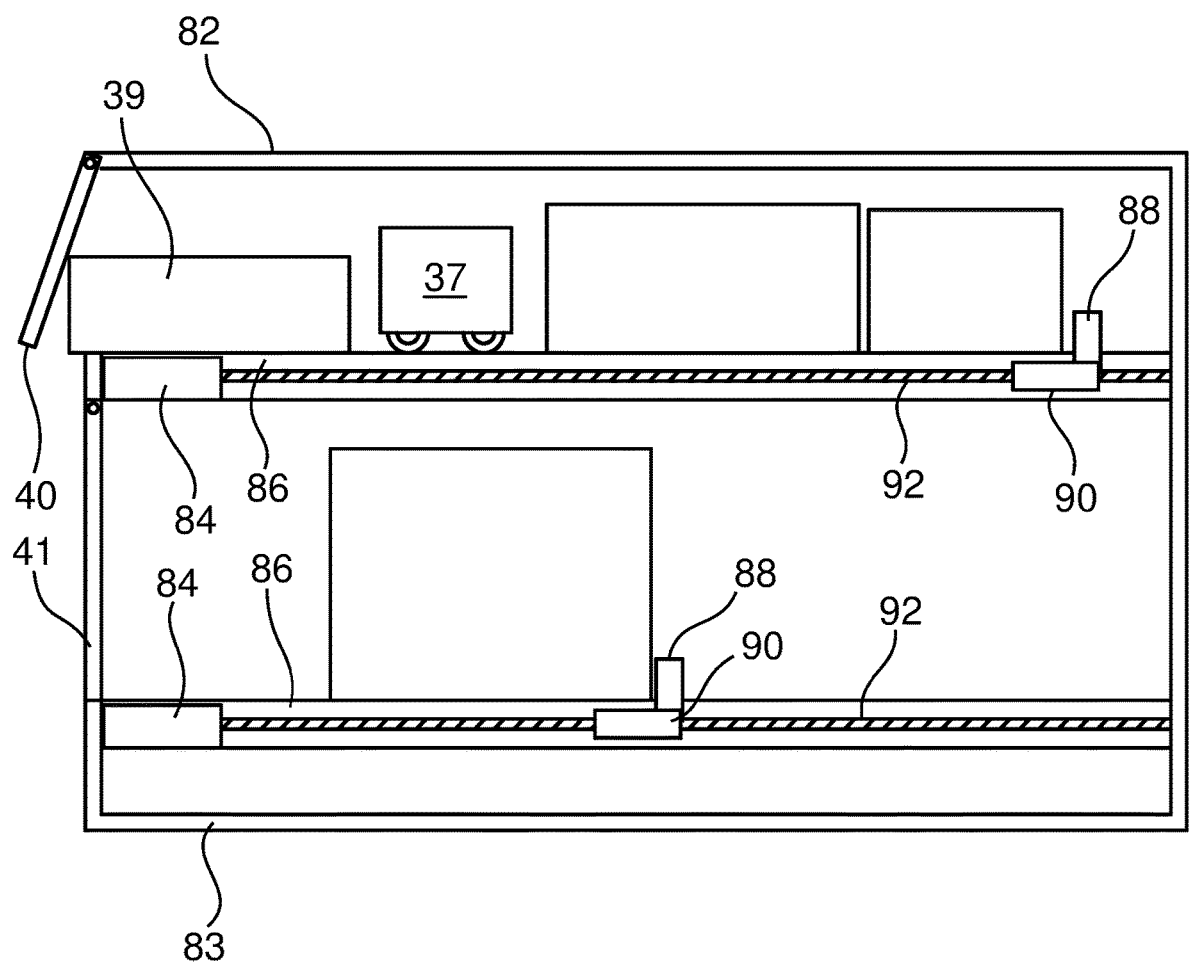
FIG. 33 is a cross-sectional view of a package dispenser, according to an embodiment of the disclosure.
Figure 34:
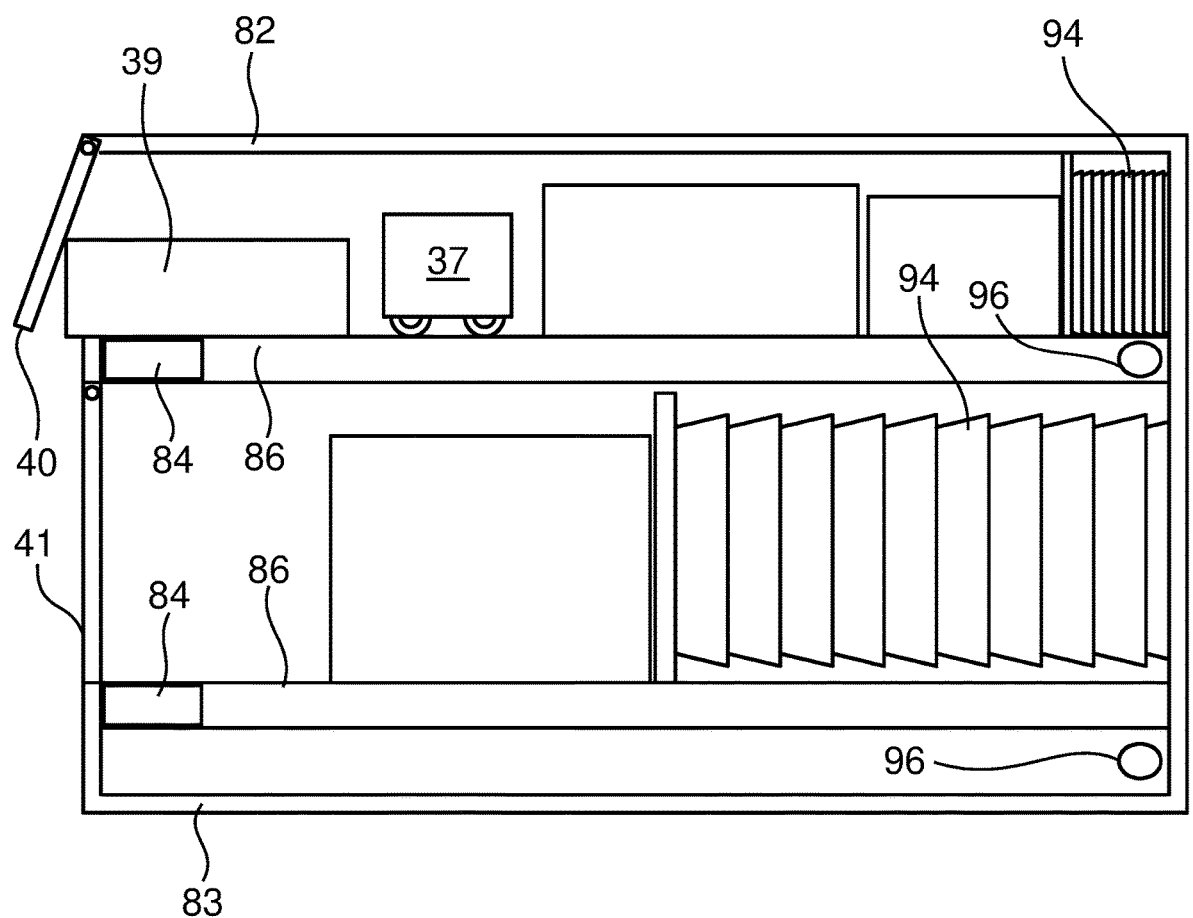
FIG. 34 is a cross-sectional view of a package dispenser, according to an embodiment of the disclosure.

FIG. 3 is an isometric view of a removable container 30, according to an embodiment of the disclosure. The depicted container 30 consists of a shell 32, a rolling door 34, a battery (internal, not shown) with a battery indicator 35 (external), and a groove 36. The shell 32 is subdivided into smaller compartments 38 which can be filled with packages 37, 39 as shown in FIGS. 8-9. Some packages 37 comprise wheels so they can be easily moved if they are heavy or for someone who is handicapped or with a disability that prevents them from carrying the package. In some embodiments, the smaller compartments 36 contain pushers, as shown in FIGS. 33 and 34 and discussed below. In some embodiments, the shell is a hollow box in which packages can be stacked. In some embodiments, all the doors are located on the curb side of the vehicle.

Figure 10:
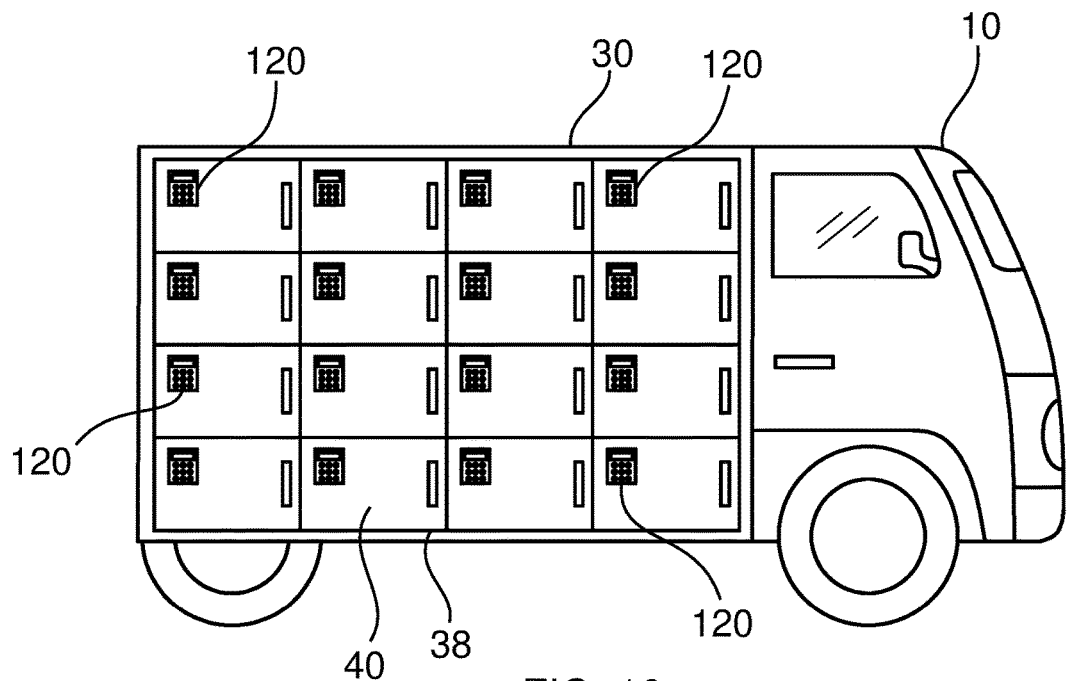
FIG. 10 is a side view of a tractor carrying a removable container, according to an embodiment of the disclosure.

FIG. 10 is a side view of a removable container on the back of a short-range tractor, according to an embodiment of the disclosure. In this design, the container comprises a plurality of doors 40 wherein each door can access a compartment by an access code on a keypad. In other embodiments, only a key may be necessary to open the compartments.

In most embodiments, packages are delivered directly to an individual residence or business. In alternative embodiments discussed in greater detail below, the container, such as that shown in FIG. 10 is off-loaded from the short-range tractor and parked in a convenient pickup location, such as a common area of a large apartment complex or a common area of a business or industrial park. Recipients of the packages in the container are notified that a package is sitting in a particular compartment of the container and given an access code or some other means for accessing that compartment to retrieve their packages. For example, an identification signal sent from a recipient's smartphone may be the means to access the compartment. Preferably, the user is also given the time window for accessing the compartment, i.e., the time that the container will be located at that location. In this embodiment, the container may be parked in that location for a day, i.e., until the next day when the container is swapped out for another container with new packages. Alternatively, the dwell time for the container at the pickup location may be shorter or longer. Preferably, in this "parked container" embodiment, the container is outfitted with cameras and other security measures to provide safety for the packages and users of the system. Also, the parked container is preferably configured so as to be able to accept packages to be returned to the central warehouse.

Figure 31:
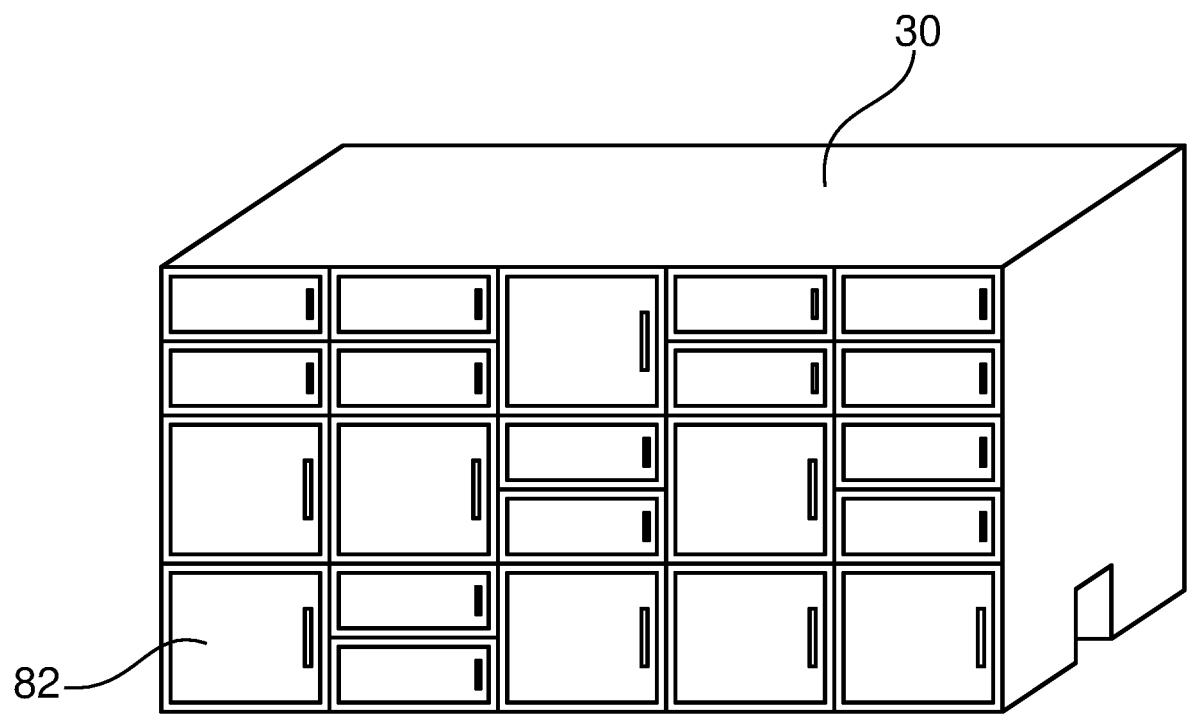
FIG. 31 is a container with removable package holders, according to an embodiment of the disclosure.
Figure 32:
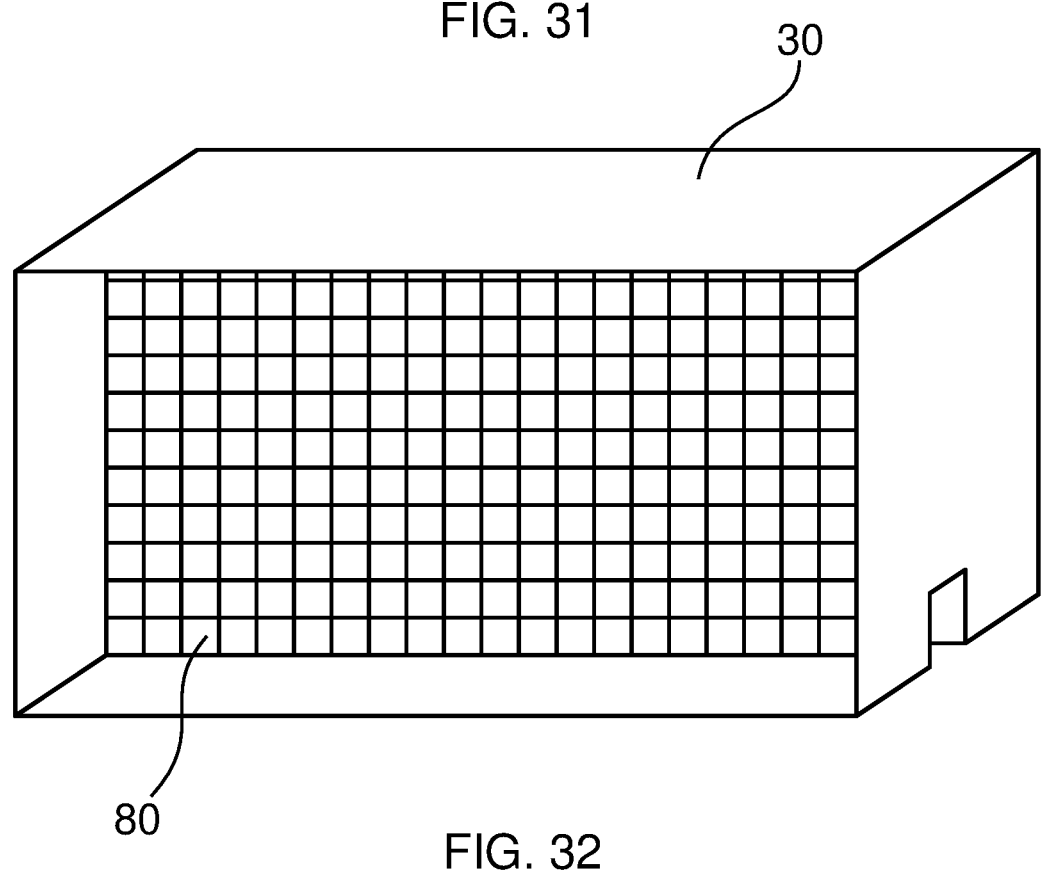
FIG. 32 is the container shown in FIG. 20 without the package holders, according to an embodiment of the disclosure.

FIG. 31 is a container with removable package holders that may be used in one embodiment of the present invention. FIG. 32 is the container of FIG. 31 without the package holders. This container may be mounted to a tractor 10 such as that illustrated in FIG. 1 or may be a traditional box container. The center of the container 30 contains a wall with mounting brackets 80 on which removable package holders 82 are mounted. Each of these removable package holders is coded so that once a package is placed in it only the end destination package recipient can open it, either by typing in a code, by a wireless device, or other method. The removable package holders 82 are of a variety of sizes, allowing for different size packages to be placed in them in order to maximize space usage on the container 30. The end destination may also have packages, trash, or re-usable packaging materials to be picked up and the removable package holders 82 may be used to receive the packages, trash, or re-usable packaging materials from end users, as well.

FIG. 33 is a cross-sectional view of a package dispenser that may be used in one embodiment of the present invention. The package dispenser shown consists of two chambers, a small package dispenser chamber 82 and a large package dispenser chamber 83. The two chambers are otherwise identical. These package dispensers can be mounted in the container of FIG. 31, though the doors 40 and 41 open from the bottom in this embodiment, instead of the side as in FIG. 31. When a user transmits his code (by typing it in or via a wireless device), the door 40 holding his package 37, 39 unlocks. Door 40 is not openable from the outside—the package 37, 39 being pushed through makes the door 40 open. The motor 84 turns a screw 92 which causes follower 90 to travel forward. Follower 90 has fingers that extend up through slots in compartment floor 86 and pushes the packages forward, pushing package 39 through door 40 until the recipient can grab the package 39 and remove it. The door 40 immediately shuts and locks. The packages behind package 39 are not removable by that recipient and are intended for other recipients.

In one embodiment, if the end user removes his package and then forces the door 40 open and removes any further packages, the theft of the extra packages is reported wirelessly to the delivery company and police are notified. Cameras may be situated on the outside of the container to observe package recipients for both theft prevention, theft recovery, and to show the end user in case he thinks he did not get the package who received it.

FIG. 34 is a cross-sectional view of a package dispenser that may be used in one embodiment of the present invention. The package dispenser shown consists of two chambers, a small package dispenser 82 and a large package dispenser 83. The two chambers are otherwise identical. These package dispensers can be mounted in the container of FIG. 31, though the doors 40 and 41 open from the bottom in this embodiment, instead of the side as in FIG. 31. When a user transmits his code (by typing it in or via a wireless device), the door 40 holding his package 39 unlocks. Facial or fingerprint recognition may also be used to achieve access. Door 40 is not openable from the outside—the package 39 being pushed through makes the door 40 open. The air pump 84 pumps air through automatic valve 96 and actuates a bellows 94 which pushes the packages forward, pushing package 39 through door 40 until the recipient can grab the package 39 and remove it. The door 40 immediately shuts and locks, the packages behind package 39 not being removable by that recipient, being intended for other recipients.

Figure 36:
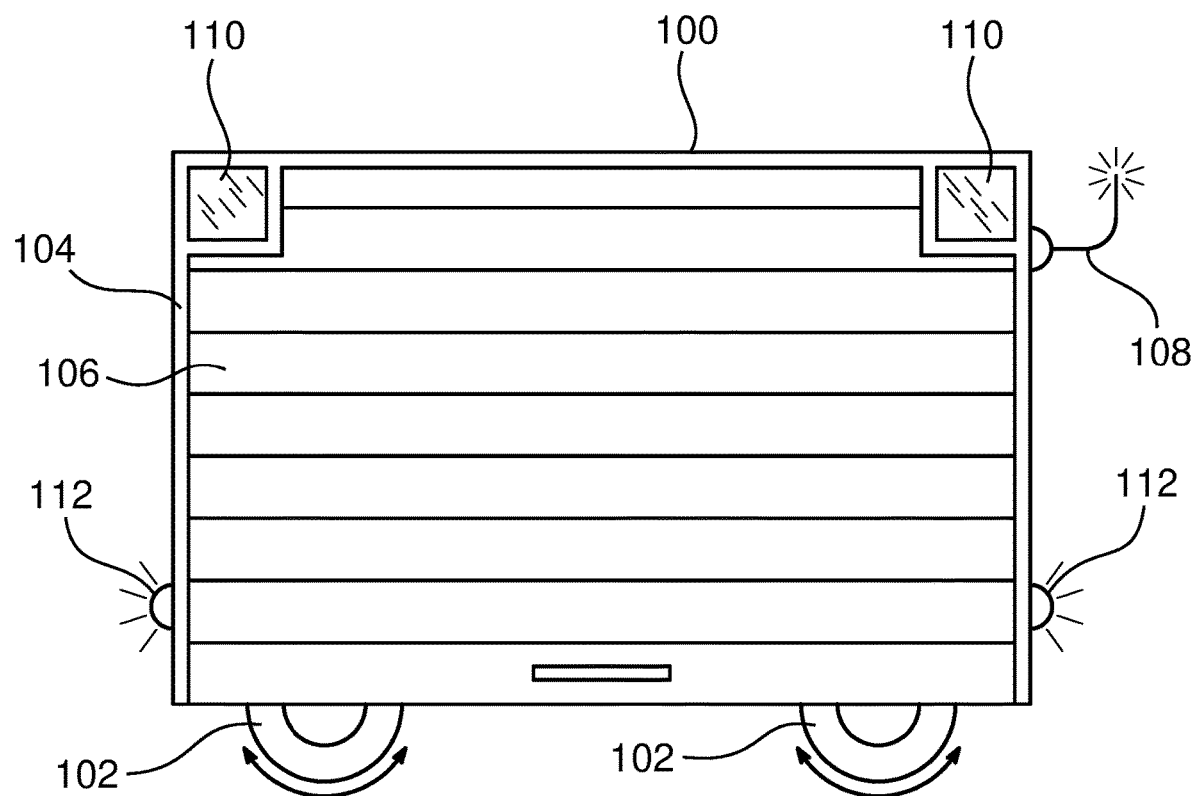
FIG. 36 is a side view of a self-propelled container, according to an embodiment of the disclosure.

In another embodiment, the containers 30 are configured with wheels and motors and are therefore able to load onto and off of the long-range transports 106 without a tractor. In some embodiments, the containers are self-driving. FIG. 36 is a side view of a self-propelled container 100, according to an embodiment of the disclosure. FIG. 36 illustrates how powered wheels may be integrated with a container. Wheels 102 are located at the front and rear of the container. The wheels can propel the container in a forward and backward fashion. The front and rear wheels may be able to be turned to steer the container in desired directions. The wheels may be retractable such that when the container is coupled to a trailer in the long-range transport, the wheels can be lifted up during transport. When the long-range transport reaches the intermediate destination, the wheels may be lowered and the container disconnected so it can drive away to deliver packages to the end destinations.

Container 100 further comprises a shell 104 and rolling door 106. Other types of doors may be used such as hinged doors. Container 100 further comprises an antenna 108 to be able to receive wireless signals such as from a global positioning system (GPS) or from a communications center for navigational purposes.

Self-propelled container 100 comprises one or more windows 110. The windows which are shown on the front and sides of the container may also be located in the rear of the container to allow for one or more optical sensors and one or more gyroscopes or other navigational electronics components to operate effectively while also protecting the electronics from damage. The self-propelled container further comprises one or more headlights 112. The headlights may be on the front or rear of the self-propelled container so the container can operate at night or in rainy or foggy conditions.

Two or more self-propelled autonomous containers may be able to communicate with each other to form an artificial neural network (ANN) wherein each container act as a node. As the autonomous containers 100 navigate through a city or town they collect information and come across obstacles that can delay their trip to their final destinations. The obstacles may include construction zones, stairs, temporary or permanent barriers, or naturally formed obstacles such as snow, ice, or water puddles. The autonomous containers can collect and communicate this information to the other autonomous containers so that their routes can be adjusted and can be re-directed to avoid the obstacles and provide a more efficient route to their final destinations.

Figure 37:
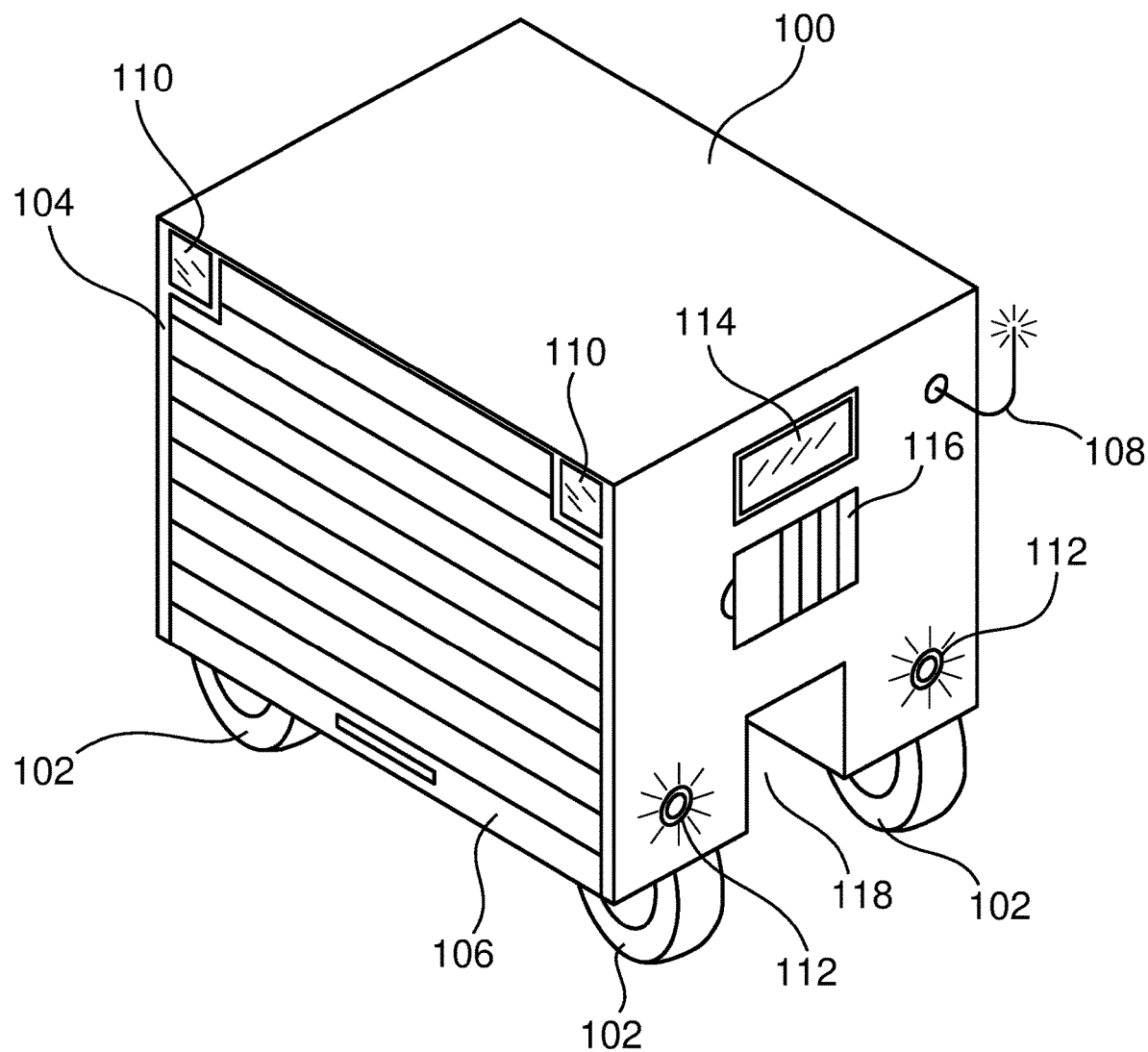
FIG. 37 is an isometric view of a self-propelled container 100, according to an embodiment of the disclosure.

FIG. 37 is an isometric view of a self-propelled container 100, according to an embodiment of the disclosure. This view further illustrates how the headlights are arranged and a front facing window 114 behind which sensors or other electronics may be located. The self-propelled container may be moved by an electric motor wherein the motor is powered by a rechargeable battery. This view further illustrates a battery indicator 116 that shows the battery charge level and a groove or slot 118. The groove allows for a tractor 10 couple with the self-propelled container for another means to transport the self-propelled container.

Figure 38:
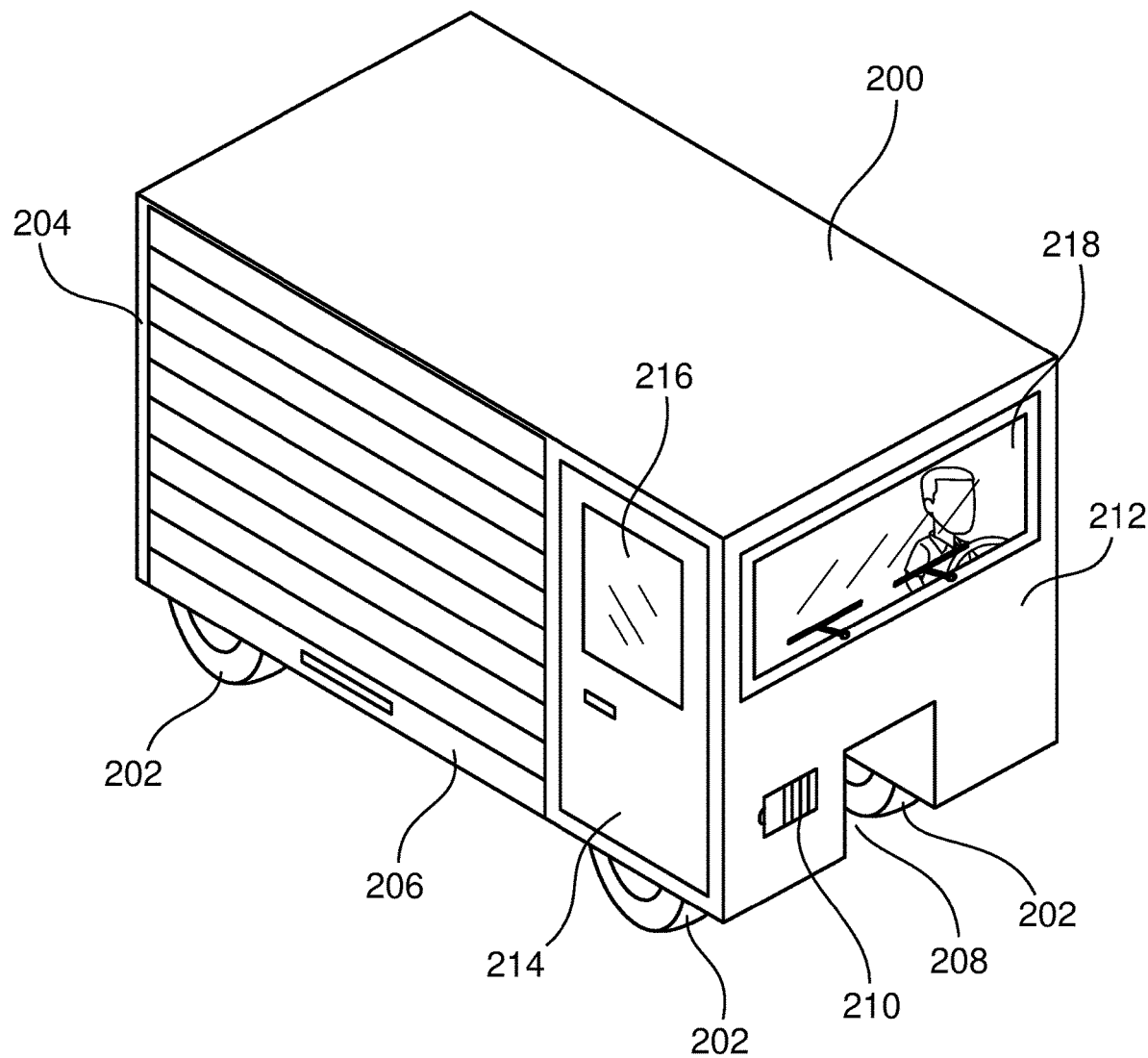
FIG. 38 is an isometric view of a human driven container comprising a cab, according to an embodiment of the disclosure.

In other embodiments, the containers may have a driver's cab for a human to operate and direct the container. FIG. 38 is an isometric view of a human driven container 200 comprising a cab, according to an embodiment of the disclosure. Wheels 202 are located at the front and rear of the container. The wheels can propel the container in a forward and backward fashion. The front and rear wheels may be able to be turned to further move the container in desired directions. The wheels may be retractable such that when the container is coupled to a trailer in the long-range transport, the wheels can be lifted up during transport. When the long-range transport reaches the intermediate destination, the wheels may be lowered and the container disconnected so it can drive away to deliver packages to the end destinations.

Container 200 further comprises a shell 204 and a door 206 to access the packages being delivered. Container 200 comprises a groove 208 to allow the container to be carried on a short-range tractor and a battery charge indicator 210. The container further comprises a cab 212 and a cab door 214 for a driver to enter the cab. A door may be located on both sides of the cab and wherein the door comprises at least one window 216. The cab comprises a windshield 218. The human driven container can be driven and decoupled or coupled with a trailer of a long-range transport. In some embodiments, the container may also be operated as an autonomous vehicle or by remote control if a driver is unavailable. The container may additionally be equipped with navigational equipment described in the autonomous container 100 embodiment.

It should be noted that a trailer 50 in a long-range transport, such as the embodiment illustrated in FIG. 16, is capable of carrying the same or different types of containers at the same time. For example, a trailer may transport a container 30 that is transported by a short-range tractor, an autonomous container 100, and a human driven container 200.

The motors in the containers may be an internal combustion engine (ICE) or an electric motor that is powered by a rechargeable battery or a hybrid that is a combination of an ICE and an electric motor. The containers may be charged at the warehouse while they are being loaded with packages. Alternatively, the containers may have depleted batteries swapped out for charged batteries at the warehouse.

Figure 18:
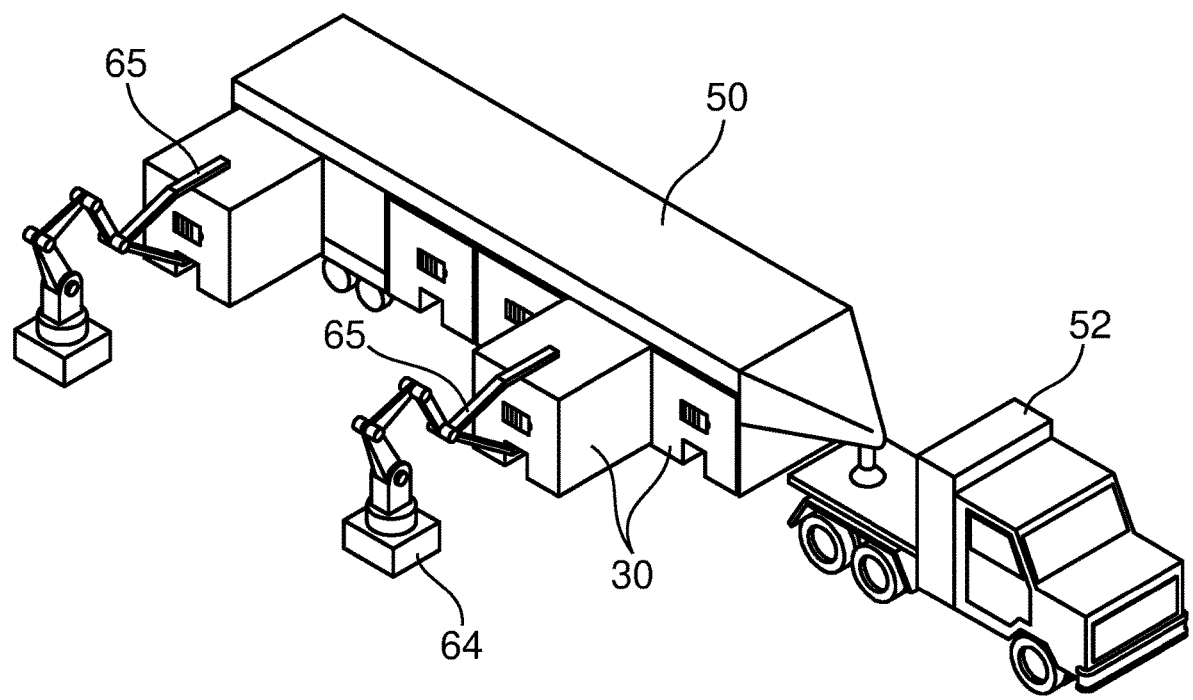
FIG. 18 is an isometric view of the long-range transport illustrated in FIG. 16 with robots loading or unloading removable containers from the long-range transport, according to an embodiment of the disclosure.

FIG. 18 is an isometric view of the long-range transport of FIG. 16 with robots loading or unloading removable containers from the long-range transport, according to an embodiment of the disclosure. The robots comprise pincers or grabbers 65 to take hold of the containers to remove them from the trailer. Robots may be used to remove and load the containers from the long-range transport at the warehouse or an intermediate destination.

The removable containers 30 may be the same as those in FIGS. 3-11. The long-range transport consists of a trailer 50 and a long-range tractor, "semi" or "rig" 52. The containers 30 hang from under the trailer 50 when they are moved from a central warehouse to a local hub or intermediate destination, as described below in conjunction with FIGS. 29 and 30.

Figure 17:
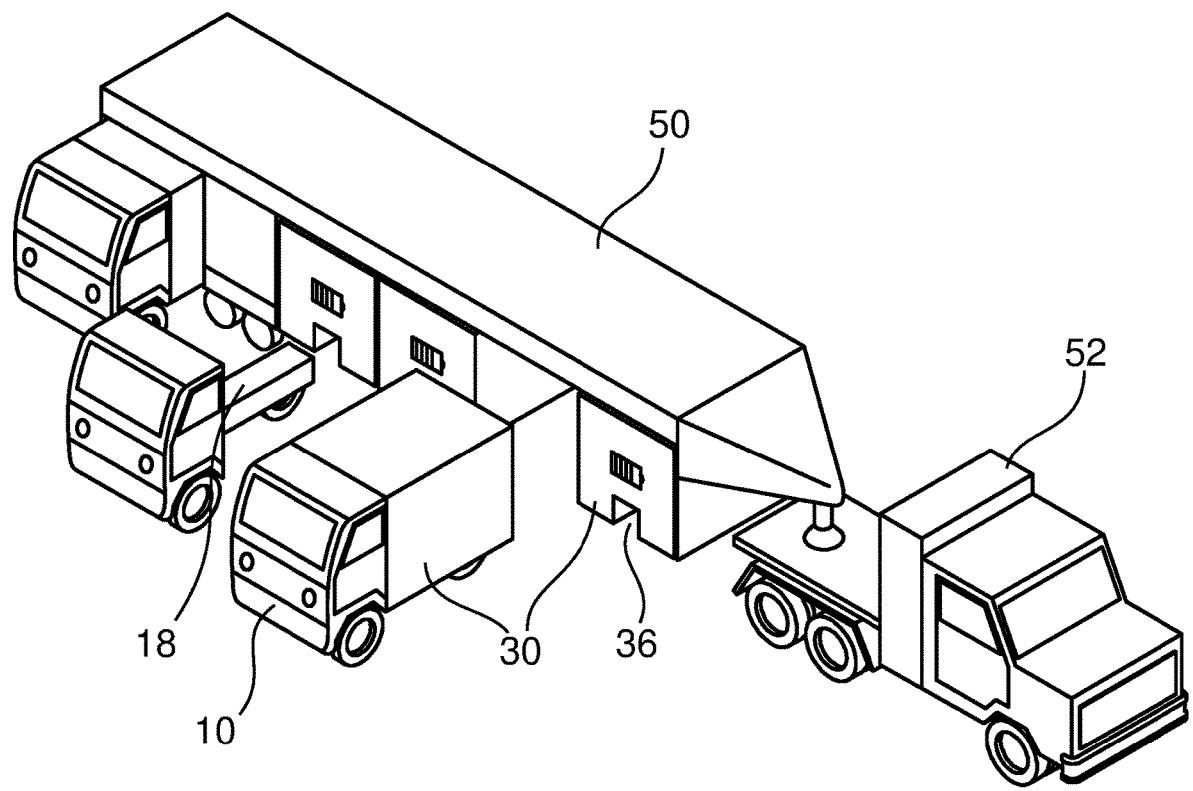
FIG. 17 is an isometric view of the long-range transport illustrated in FIG. 16 with tractors loading or unloading removable containers from the long-range transport, according to an embodiment of the disclosure.

FIG. 17 is an isometric view of the long-range transport of FIG. 16 with tractors loading or unloading removable containers 30 from the long-range transport, according to an embodiment of the disclosure. This view illustrates how the single rail 18 of the tractor backs into the groove 36 of a container that is coupled to the trailer 50. Once the rail of the tractor is inserted into the groove of a container, the container can be disconnected from the trailer such that the tractor can drive away with the container. In other embodiments, the container may be a self-propelled container 100 that may move away on its own or be connected to a tractor to be able to be moved and transported to another location.

As seen in FIGS. 17 and 29, upon arrival at the intermediate destination or local hub, the containers 30 are offloaded by short-range tractors 10 from the trailer 50. After the tractors have delivered at least a portion of the packages contained in the containers to end destinations, the tractors return the containers to the trailer. Upon reloading the containers, the tractors disengage and the semi 52 returns the trailer and containers to the warehouse. There, robots or humans or both can unload the containers from the trailer. The containers are reloaded with packages and the containers are reloaded under the trailer of a long-range transport, beginning the delivery cycle again.

The container includes one or more compartments for receiving packages at a distribution center. A delivery access portal is configured to allow access to an appropriate package for a given delivery destination. A mechanism moves the appropriate package from the compartment to the delivery access portal at or before the container arrives at the given delivery destination.

The container may comprise a processor that determines that the container is transported to a specific end destination and transmits to a recipient at the specific end destination, via a smart device, a code with which to open the door to access the box carrying the package or packages for the specific end destination.

In one embodiment, the containers 30 have external indicators for showing battery status. In one embodiment, the batteries are swappable when depleted or damaged. The secondary batteries in the tractor are used for moving the tractors when disconnected from the containers. These are also swappable when depleted or damaged.

In some embodiments, the container has one or more doors to access packages stored therein. Preferably, the one or more doors are all located on the curb-side of the vehicle.

Package Delivery Vehicle

The following embodiments relate to vehicles for delivering packages.

Figure 2:
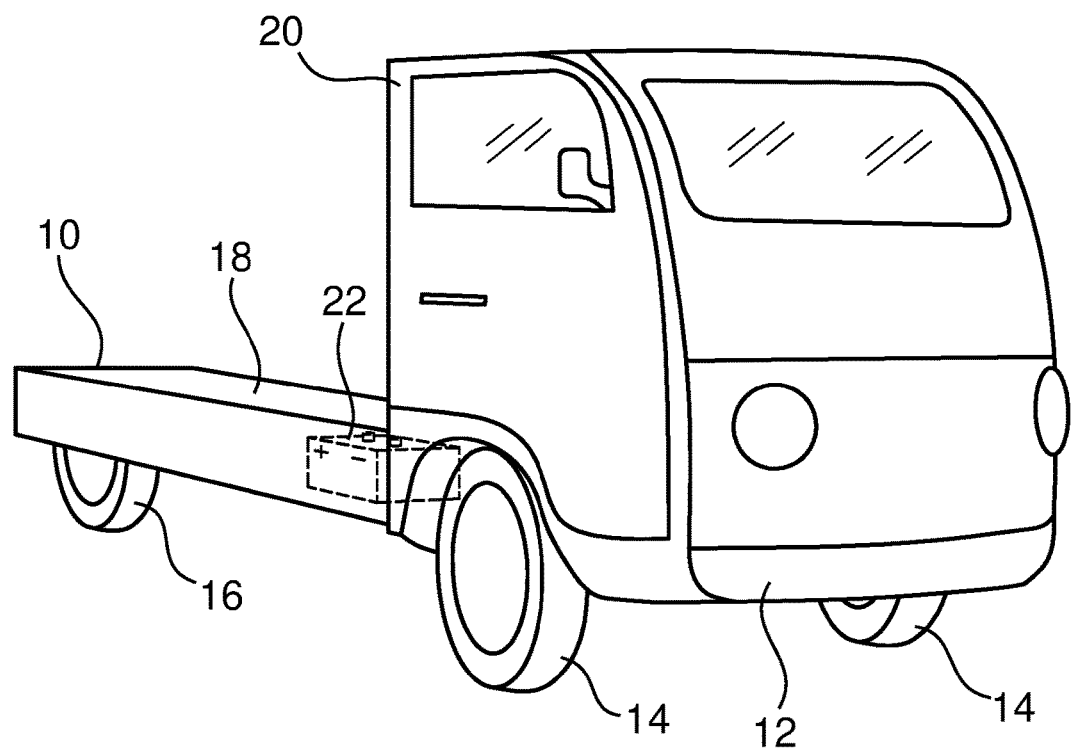
FIG. 2 is an isometric view of the tractor shown in FIG. 1, according to an embodiment of the disclosure.
Figure 4:
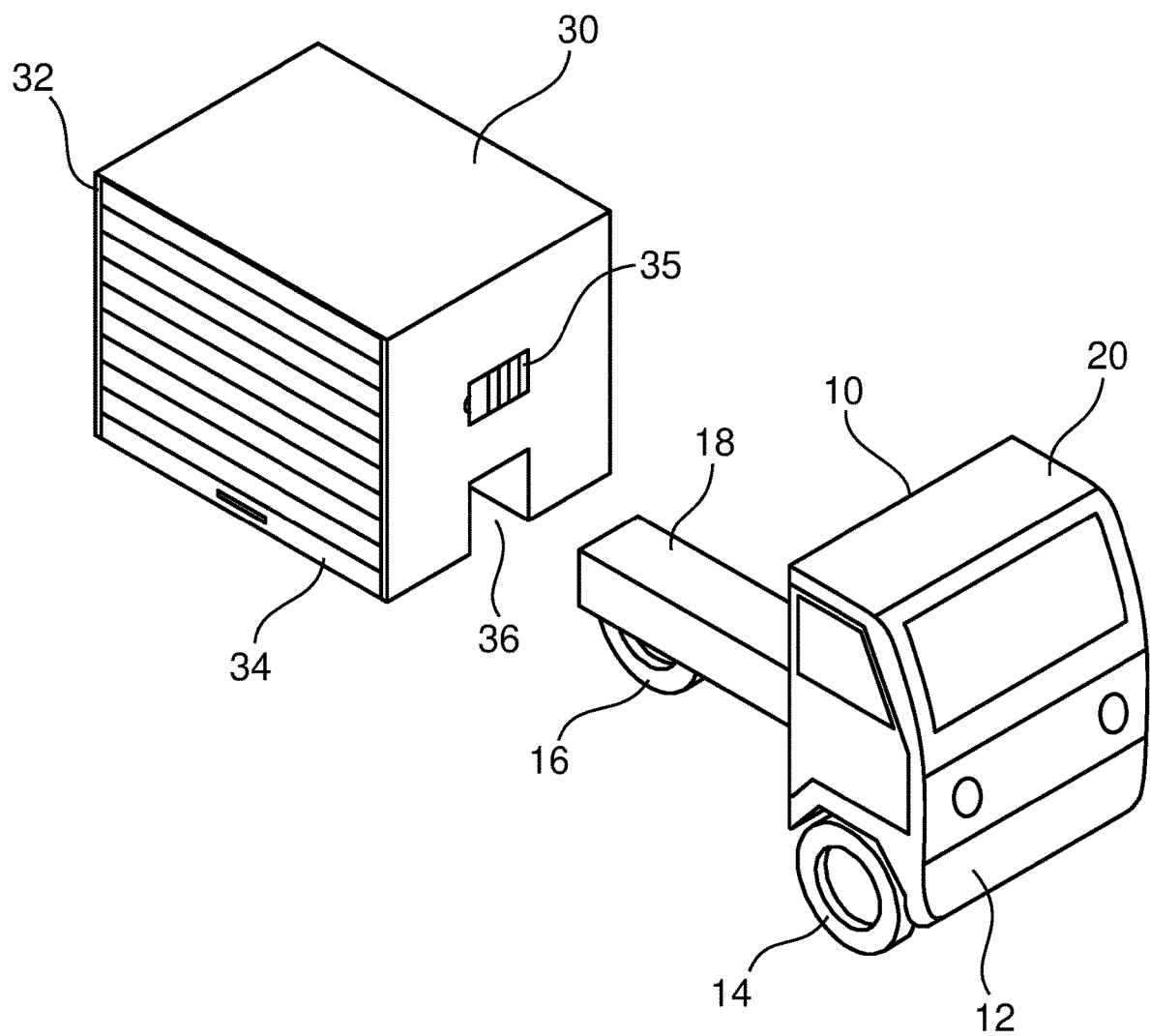
FIG. 4 is an isometric view of the tractor illustrated in FIG. 1 aligned with the removable container illustrated in FIG. 3, according to an embodiment of the disclosure.
Figure 5:
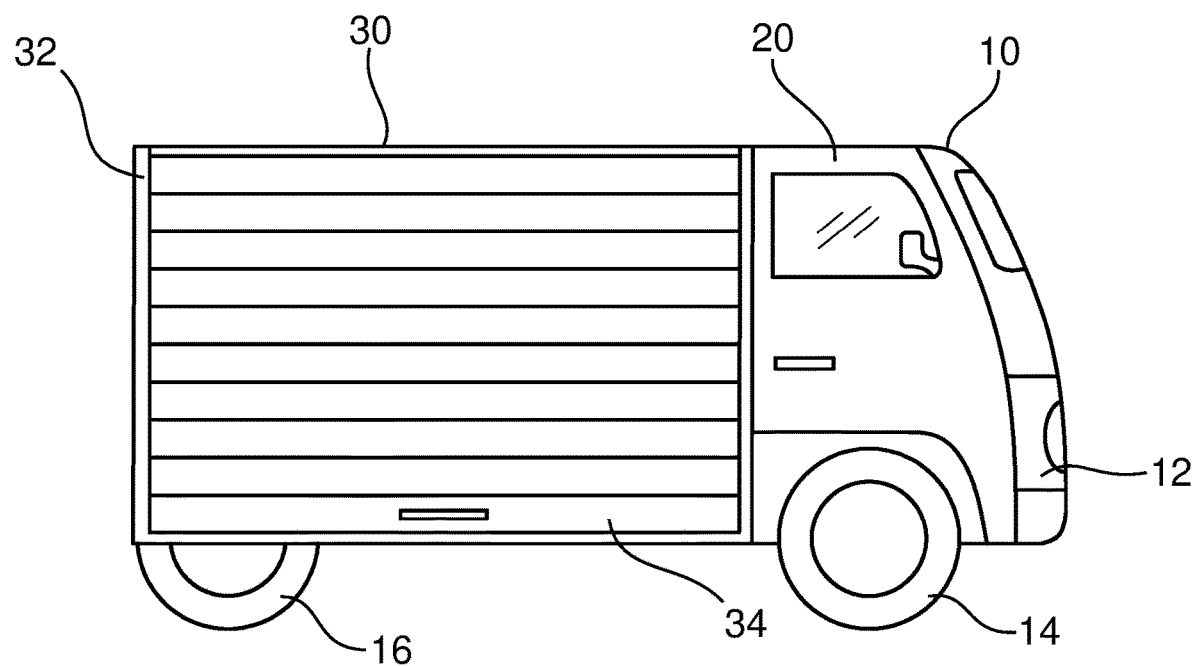
FIG. 5 is a side view of the tractor illustrated in FIG. 1 carrying the removable container illustrated in FIG. 3, according to an embodiment of the disclosure.
Figure 6:
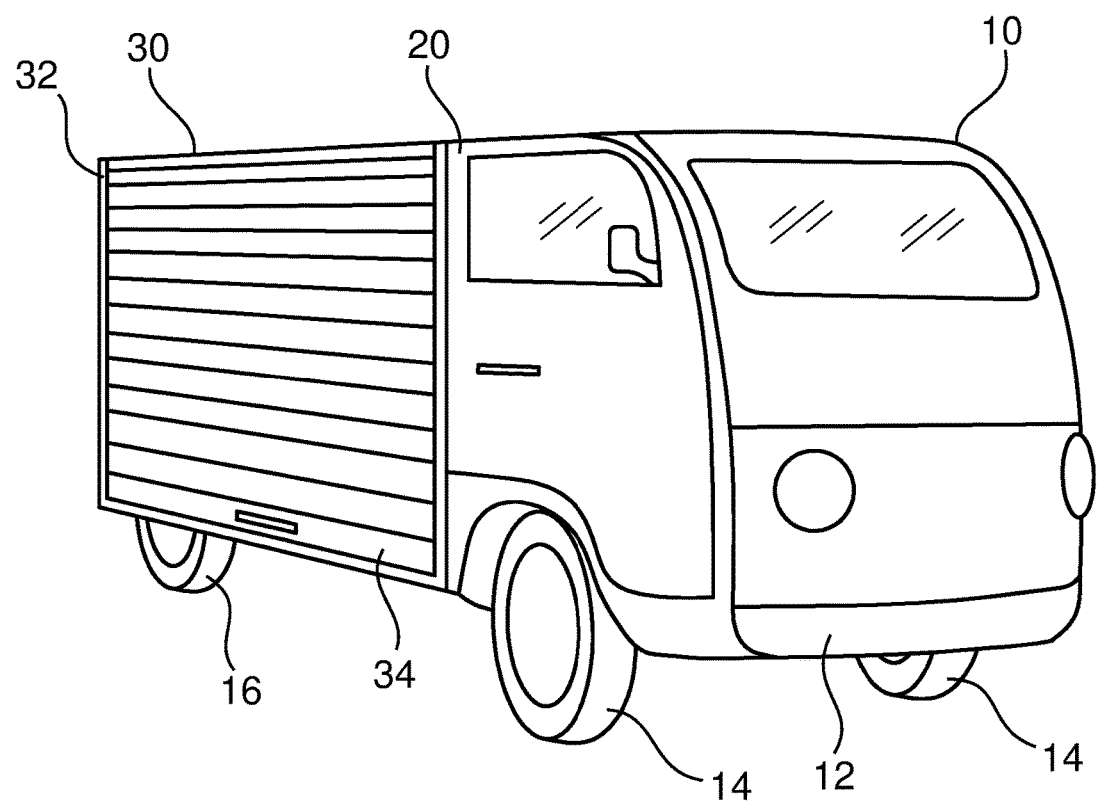
FIG. 6 is an isometric view of the tractor and removable container illustrated in FIG. 5, according to an embodiment of the disclosure.
Figure 7:
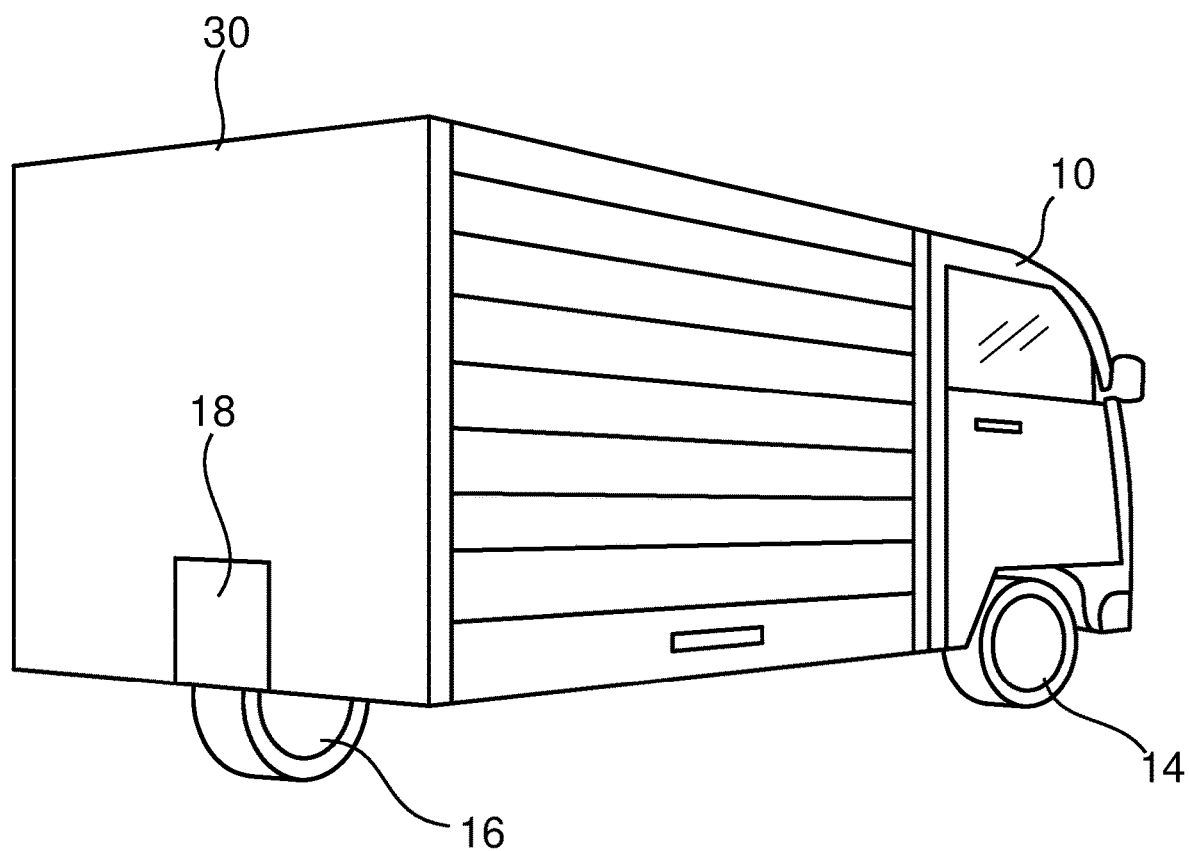
FIG. 7 is an isometric view of the back of the tractor and removable container illustrated in FIG. 3, according to an embodiment of the disclosure.

FIG. 2 is an isometric view of the tractor of FIG. 1. FIG. 4 is an isometric view of the tractor of FIG. 1 aligned with the removable container of FIG. 3. FIG. 5 is a side view of the tractor of FIG. 1 carrying the removable container of FIG. 3. FIG. 6 is an isometric view of the tractor and removable container of FIG. 3. FIG. 7 is an isometric view of the back of the tractor and removable container of FIG. 3. FIG. 8 is a side view of the tractor and removable container of FIG. 3, the container door being partially opened. FIG. 9 is a side view of the tractor and removable container of FIG. 3, the container door completely open. The tractor 10 consists of a motor 12, a driver's cab 20, a pair of front wheels 14, a rear wheel 16, and a longitudinal rail 18 between the pair of front wheels and the rear wheel. A battery 22 is preferably mounted inside the rail. The rear wheel is centered at the back end of the rail. The tractor 10 is therefore a three-wheeled vehicle with a motor and chassis. The driver's cab 20 is configured with driving controls and a driver's door on the curb side of the vehicle.

The short-range tractors may contain batteries for propelling tractors without the container 30 being loaded. The batteries can be charged at the intermediate destinations.

The short-range tractors may be propelled by electric motors. Preferably, the electric motors are powered by batteries carried on the containers. The short-range tractors can also have secondary batteries for propelling short-range tractors for short distances without a container loaded thereon. The batteries can be recharged while the containers are loaded on the long-range transports. Alternatively, the batteries are recharged while the containers dwell at the central warehouse. Still alternatively, the batteries are recharged in both situations. The containers contain a device and indicator 35 to check the status of the batteries while the containers are loaded on the long-range transports. In some embodiments, the motor is an electric motor. A battery is carried in the removable container which powers the electric motor. The battery can be charged when the removable container is separated from the tractor. For example, the battery in the container may be charged at the central warehouse while the container is being loaded with packages. Alternatively, the battery can be swapped out of the removable container when depleted or damaged. Most efficiently, these processes are carried out at the central warehouse.

A secondary battery can be carried by the tractor to power the electric motor when the removable container is separated from the tractor or when the battery in the removable container is depleted or damaged. The secondary battery is charged by the battery in the removable container. The secondary battery can be swapped out of the tractor when depleted or damaged.

In one embodiment, the tractor and the container are attached by an automated latch, which mechanically locks the removable container onto the tractor 10. In another embodiment, pins in the rail 18 of the tractor extend into the container, locking the container in place. The container 30 has a first attachment member on a top surface (see FIGS. 19-24, for example) and a second attachment member on a bottom surface of the container. This can be on the top or sides of the groove 36 of the container.

FIG. 10 is a side view of a tractor, such as that of FIGS. 1-6, carrying a removable container that may be used in embodiments of the present invention. The bottom of the container configured to fit over the rail and rear wheel of the tractor and to mount to the rail. The removable container is like that in FIGS. 3-6 except each of the smaller compartments 36 have individual doors. The delivery operator opens the door to retrieve a package and deliver it to the end destination. In one embodiment, the doors can be opened automatically by wireless connection by a device, such as a smart phone, carried by the delivery operator. The container is synced to a GPS system and determines which door to open at each end destination as the delivery operator walks from the cab to grab packages. All other doors 40 remain secure.

Figure 11:
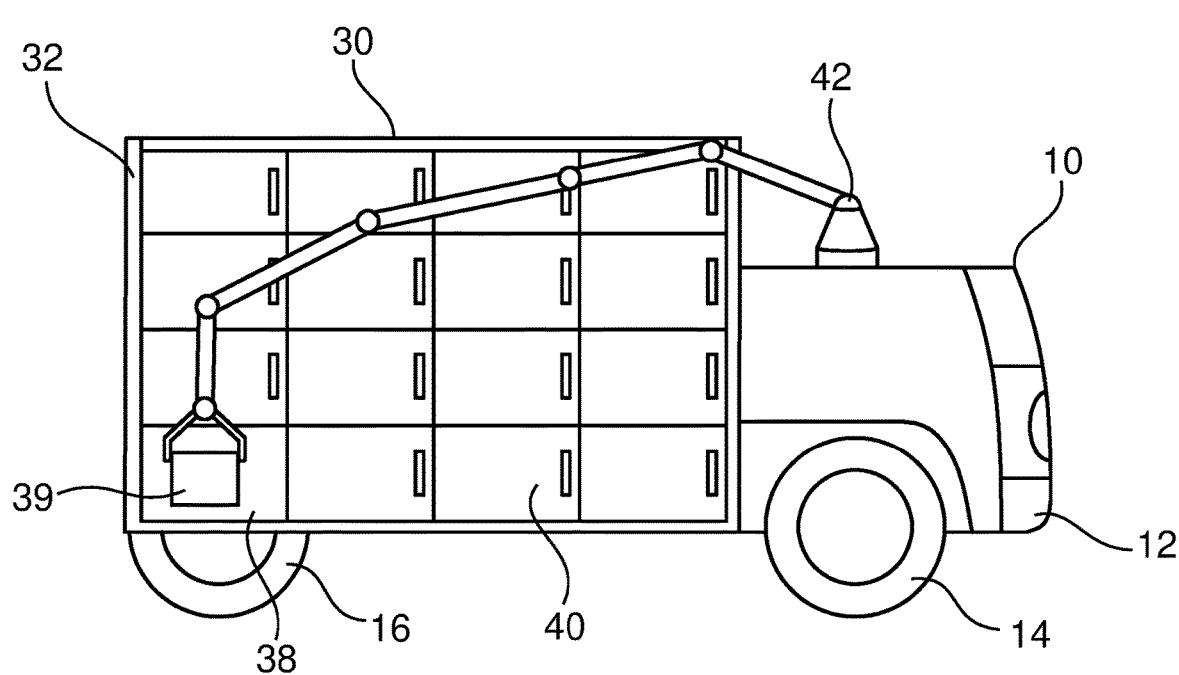
FIG. 11 is a side view of an autonomous tractor with robotic arm carrying a removable container, according to an embodiment of the disclosure.

FIG. 11 is a side view of an autonomous tractor with robotic arm carrying a removable container that may be used in one embodiment of the present invention. The removable container is like that in FIG. 10. The GPS system determines which door 40 to open at each end destination and the robotic arm 42 reaches into the small compartment 38, grabs the package 39 for delivery.

In another embodiment of FIGS. 9 and 10, there is no delivery operator or robotic arm. The delivery vehicle transmits a message to the package recipient of the end destination alerting the package recipient that his package 39 has arrived, which door 40 the package is behind, and the code to enter into a keypad 120 on the door to open the door to retrieve his package. In one embodiment, instead of a code, he presses a button in a smart phone app while standing next to the container 30 that opens the appropriate door. Although an optional keypad is shown on each door in FIG. 10, in other embodiments only one keypad is located on the container where a recipient can enter code to direct a specific door to be opened. The keypad may also comprise an optical scanner to read optically readable code, a chip reader, or a magnetic strip reader. The keypad may be able to receive a wireless signal to open the door.

Figure 12:
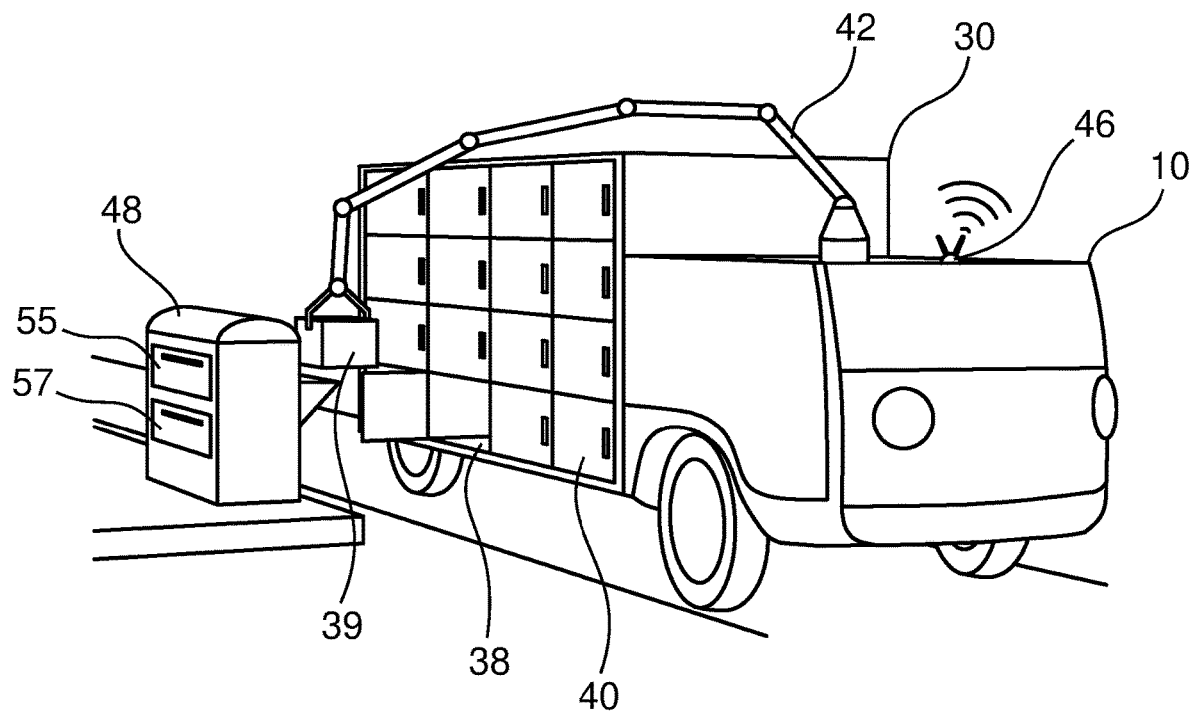
FIG. 12 is an isometric view of the tractor and removable container of FIG. 11 delivering a package to a package receptacle, according to an embodiment of the disclosure.
Figure 13:
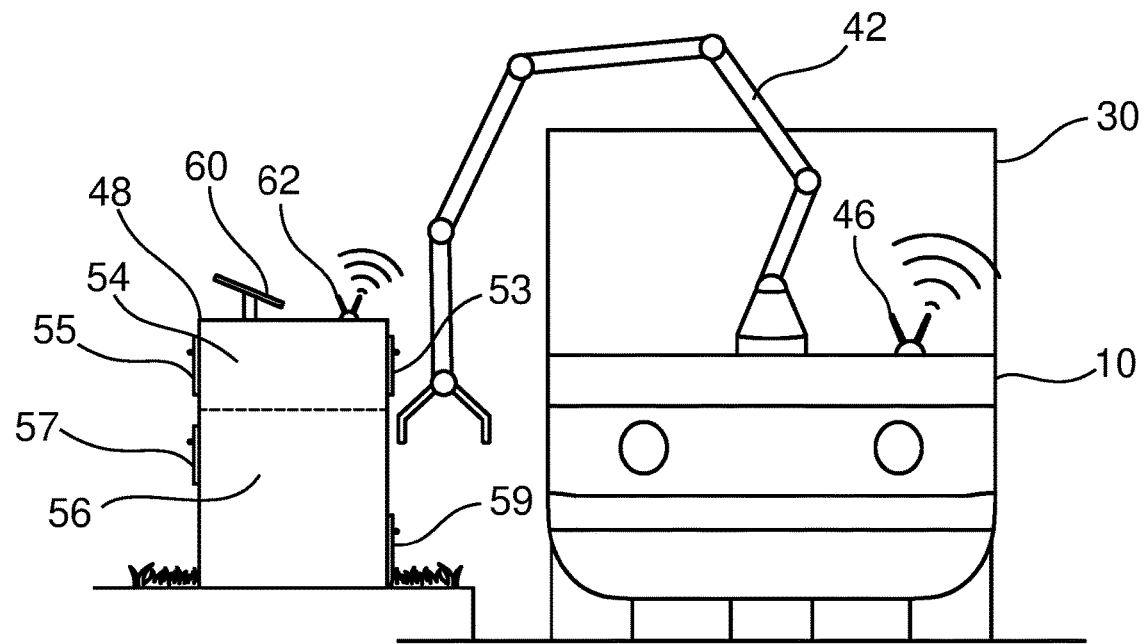
FIG. 13 is a front view of the tractor and removable container illustrated in FIG. 12 and a package receptacle, according to an embodiment of the disclosure.

FIG. 12 is an isometric view of the tractor and removable container of FIG. 11 delivering a package to a package receptacle that may be used in one embodiment of the present invention. FIG. 13 is a front view of the tractor and removable container of FIG. 11 with the package receptacle of FIG. 12. The tractor 10 transmits a signal wirelessly by transmitter 46 which communicates with receiver 62, the receiver transmits the signal to an access control unit that verifies the delivery service and opens door 53 to allow the robotic arm 42 access to the top compartment 54 of the package receptacle 48. The robotic arm takes the package 39 and places it into the top compartment. The package recipient has access to the top compartment to receive deliveries, either by codes for the door 55, by smart phone app, by Bluetooth®, by key, or similar means. Preferably, the package receptacle is powered by a solar panel 60 that charges a battery.

In some embodiments, the signal is provided by the package recipient. In other embodiments, the signal is provided by a smart device, wirelessly sending a unique access code. In still other embodiments, the signal is provided by the recipient entering a code provided to the recipient in advance. In still yet other embodiments, the signal is provided by entering the code on a keypad. In some embodiments, the signal is provided by speaking the code. In other embodiments, the signal is provided by a GPS unit and a processor that recognizes the appropriate destination has been reached.

In some embodiments, the signal is provided by a wireless beacon at the delivery destination that emits a unique identifying code. In other embodiments, the wireless beacon is integrated in a package receptacle at the delivery destination. In still other embodiments, the signal is provided by scanning an optically readable code at the delivery destination, for example an optically readable code located on an outer surface of the package receptacle.

In some embodiments, each of the compartment doors comprise a light or other visual indicator to indicate when the door is unlocked.

In some embodiments, the GPS unit and processor also determine the route and order to reach the delivery destinations.

In some embodiments, the autonomous vehicle is configured to drive both forward and backward, whereby the container can always align the delivery portal to curb-side.

Figures 19, 20:
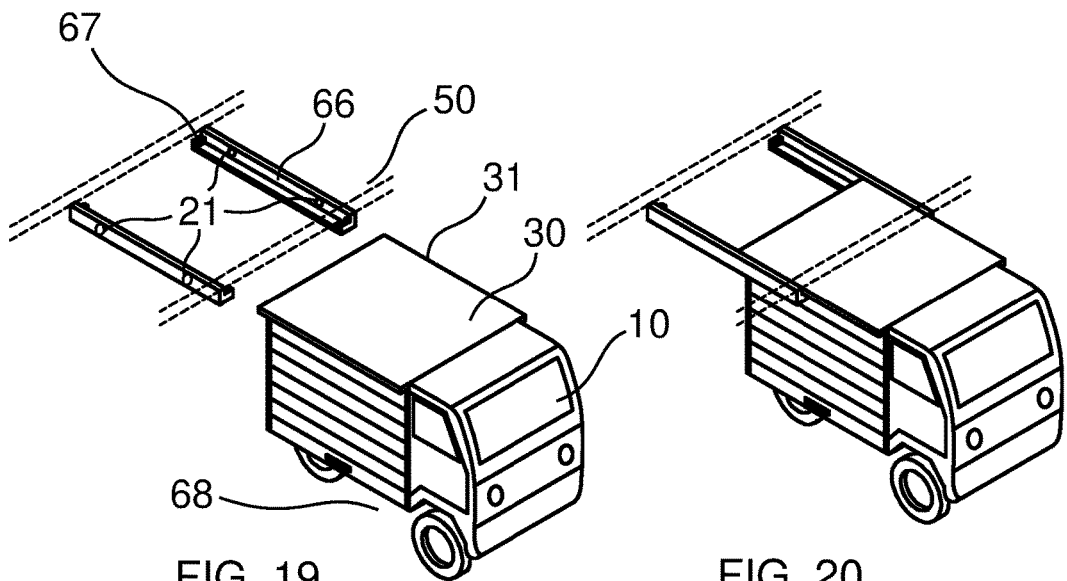
FIG. 19 is an isometric view of a tractor and container in front of a partial see-through view of a long-range transport with container brackets, the tractor lifted by hydraulic suspension, according to an embodiment of the disclosure.
FIG. 20 is an isometric view of a tractor and container partially backed under the long-range transport, according to an embodiment of the disclosure.

FIG. 19 is an isometric view of a tractor and container in front of a partial see-through view of a long-range transport with container brackets, with the tractor lifted by hydraulic suspension that may be used in one embodiment of the present invention.

FIG. 20 is an isometric view of the tractor and container partially backed under the long-range transport, according to an embodiment of the disclosure.

Figures 21, 22:
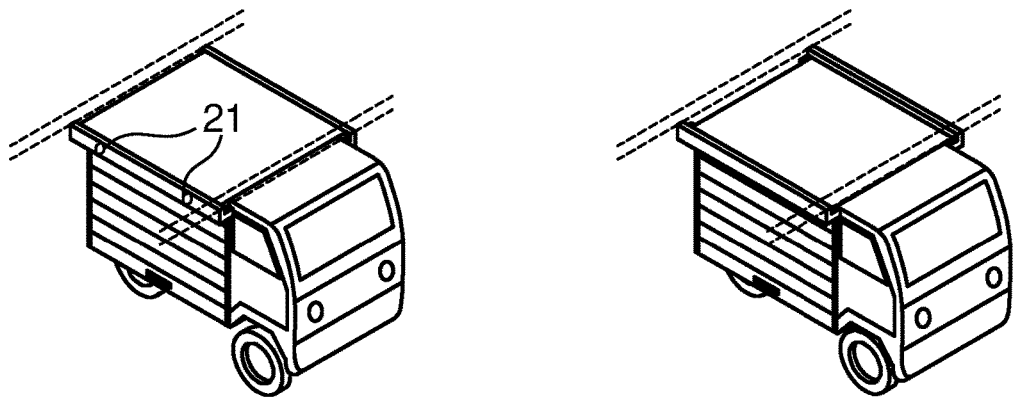
FIG. 21 is an isometric view of a tractor and container completely backed under the long-range transport, according to an embodiment of the disclosure.
FIG. 22 is an isometric view of a tractor and container completely backed under the long-range transport, the tractor lowered by the hydraulic suspension and disconnected from the container, according to an embodiment of the disclosure.

FIG. 21 is an isometric view of the tractor and container completely backed under the long-range transport, according to an embodiment of the disclosure.

FIG. 22 is an isometric view of the tractor and container completely backed under the long-range transport, the tractor lowered by the hydraulic suspension and disconnected from the container, according to an embodiment of the disclosure.

Figures 23, 24:
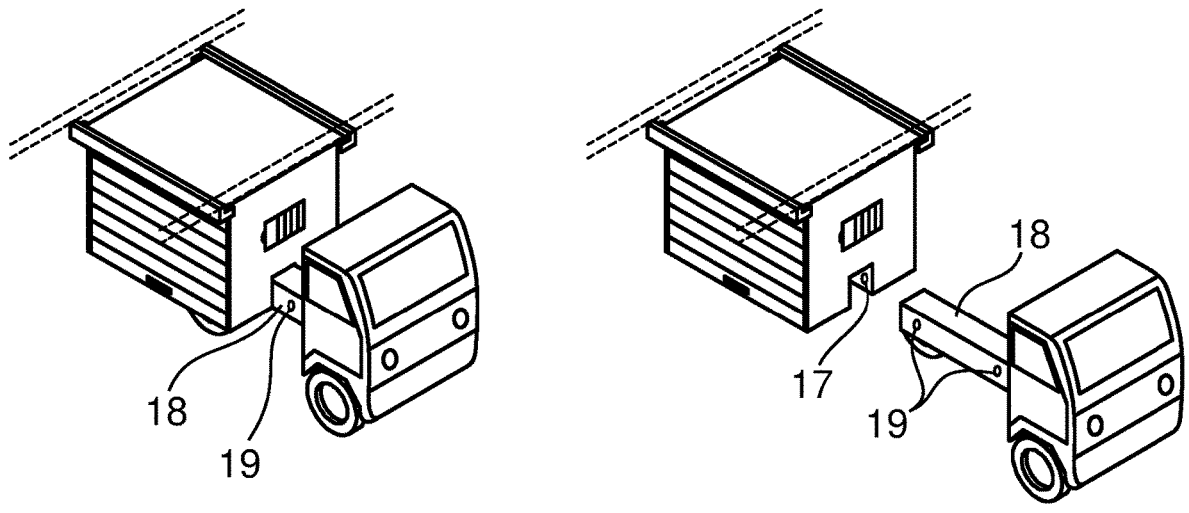
FIG. 23 is an isometric view of a tractor partially pulled out from under the container, the container hanging from the long-range transport, according to an embodiment of the disclosure.
FIG. 24 is an isometric view of a tractor completely pulled out from under the container, the container hanging from the long-range transport, according to an embodiment of the disclosure.

FIG. 23 is an isometric view of the tractor partially pulled out from under the container, the container hanging from the long-range transport, according to an embodiment of the disclosure.

FIG. 24 is an isometric view of the tractor completely pulled out from under the container, the container hanging from the long-range transport, according to an embodiment of the disclosure. The long-range transport trailer 50 is that of FIGS. 16-18. The long-range transport trailer 50 has container brackets 66 underneath the roof of the trailer. The container 30 has a lip 31 on the left and right sides of the roof that are strong enough to carry the weight of the container 30 fully loaded. The container brackets 66 have grooves and end caps 67 that allow the container 30 to pass over the end caps 67 while the tractor is elevated on hydraulic suspension 68 but to block motion when the tractor hydraulic suspension 68 is lowered.

FIGS. 19-24 show the tractor 10 backing in and leaving the container 30 hanging from the trailer 50. Viewing these figures in reverse order, shows the tractor 10 taking the container 30 from the trailer 50. In FIG. 19, the tractor raises up on hydraulic suspension 68, causing the roof of the container 30 to be even with the bottom of the trailer's 50 underside. In FIGS. 20 and 21, the container 30 is then backed by the tractor 10 between the container brackets 66 and above the end caps 67 until the lip 31 is aligned with the container brackets 66. The hydraulic suspension 68 lowers enough that the lip 31 just makes contact with the container brackets 66. Upper pins 21 push forward from both grooves in the container brackets 66, engaging with the lip 31. The combination of the grooves in the container brackets 66, the end caps 67, and the upper pins 21, positively locks the container 30 in place under the trailer 50. The connection between the container groove 36 and the rail 18, via holes 17 and associated lower pins 19 (shown retracted in FIGS. 23 and 24), respectively, are then disconnected.

In FIG. 22, the hydraulic suspension 68 lowers the tractor 10 so the weight of the container 30 rests through lip 31 on the container brackets 66, thereby securing the container 30 to the trailer 50.

In FIGS. 23 and 24, the tractor 10 pulls forward, leaving the container 30 on the trailer 50 and shifts to the default hydraulic suspension 68 height. All steps are reversed for the tractor 10 to detach the container 30 from the trailer 50. In one embodiment, the default height for the hydraulic suspension is the height needed to back (or pull through) the container 30 lip 31 above the end caps 67.

In some embodiments, the upper pins and lower pins are solenoid actuated or magnetically coupled. In other embodiments, the pins are replaced by latches.

In another embodiment, the container and tractor combined are small enough to fit under the trailer and the entire tractor/container assemblage is carried back and forth by the trailer. In some embodiments, the tractor and container are a single unit, i.e., not separable. In other words, in some embodiments, the container is self-propelled, as shown in FIGS. 36-38 and described in more detail below.

Figure 25:
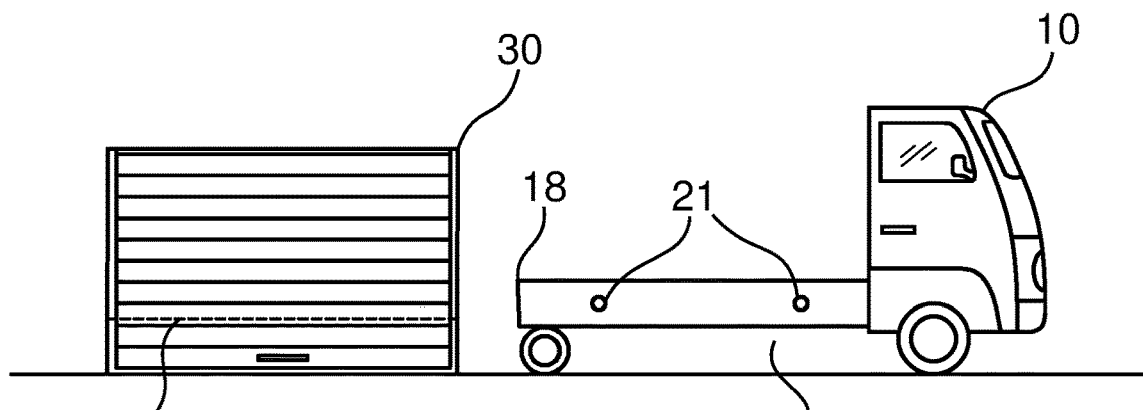
FIG. 25 is a side view of a tractor and container, according to an embodiment of the disclosure.

FIG. 25 is a side view of a short-range tractor and container that may be used in one embodiment of the present invention.

Figure 26:
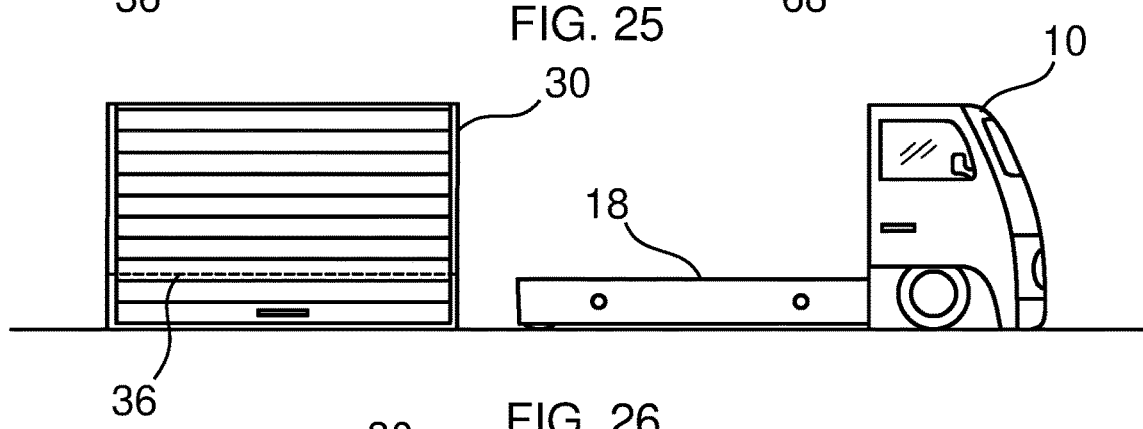
FIG. 26 is a side view of a tractor lowered by hydraulic suspension, according to an embodiment of the disclosure.

FIG. 26 is the side view of FIG. 19, the tractor lowered by hydraulic suspension, according to an embodiment of the disclosure.

Figure 27:
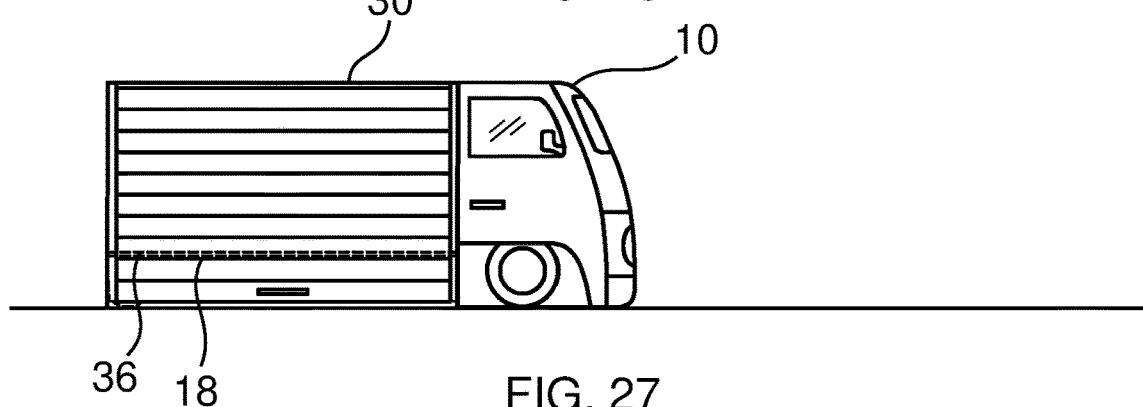
FIG. 27 is a side view of a tractor backed under the container, according to an embodiment of the disclosure.

FIG. 27 is the side view of FIG. 19, the tractor backed completely under the container, according to an embodiment of the disclosure.

Figure 28:
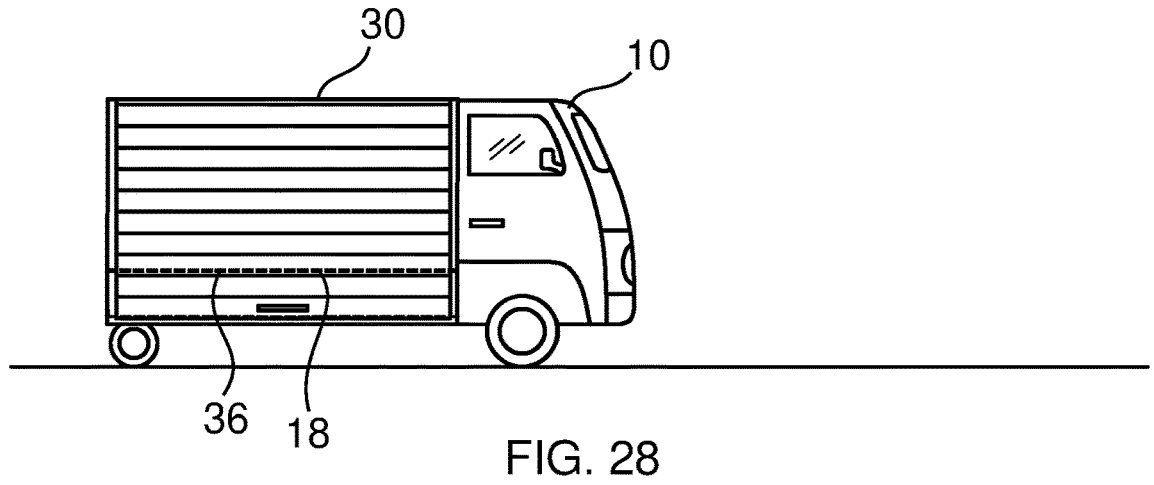
FIG. 28 is a side view of a tractor with a container raised back up by the hydraulic suspension, according to an embodiment of the disclosure.

FIG. 28 is the side view of the tractor and container shown in FIG. 19, the tractor raised back up by the hydraulic suspension, according to an embodiment of the disclosure. The tractor may be that of FIG. 1. The container may be that of FIG. 3. The tractor 10 begins at a standard height in FIG. 25. In FIG. 26, the hydraulic suspension 68 lowers the entire truck so that the rail 18 is low enough to fit under groove 36 of container 30. The tractor 10 backs under the trailer 30 in FIG. 27. The hydraulic suspension 68 then lifts the truck back to the standard height in FIG. 28. To positively lock the container 30 to the rail 18, a series of pins on both sides of the rail 18, actuated by solenoid or other means, extend from the rail 18 and engage with holes inside the groove 36 when the rail 18 is inside the groove 36. In one embodiment, an automated latch mechanically locks the removable container on the tractor.

Although the trailers illustrated herein are adapted to carry only the containers back and forth to the central warehouse, the trailers may also be configured to carry one or more containers. For example, if a short-range tractor needs a repair, it may be desirable to be able to carry it back to the warehouse by loading it on the trailer. Alternatively, the trailer may be configured to tow a short-range tractor behind it.

While the preferred system, which includes containers that are carried by the trailer and then taken by short-range tractors, has been illustrated and described above; an alternative embodiment of the system uses containers that are self-propelled as illustrated in FIGS. 36-37. In this alternative embodiment, the self-propelled, containers are filled with packages at the central warehouse and then loaded on a trailer or other long-range transport and taken to the intermediate destinations.

In some embodiments, the tractor has a cab configured with driving controls and a driver's door on the curb-side of the vehicle.

In one embodiment, the removable container has a top mounting bracket that mounts to an overhead bracket of a trailer configured to transport multiple removable containers.

In some embodiments, the first attachment member is located on a top surface of the containers. Multiple containers hang from a trailer load bearing structure when attached. In some embodiments, the second attachment member is located on a bottom surface of the containers. The containers rest on top of a tractor load bearing structure when attached.

In some embodiments, the trailer further consists of a lifting mechanism configured to move the trailer load bearing structure vertically, whereby when a container supported by the trailer load bearing structure is moved down, the container comes into contact with and rests on top of the tractor load bearing structure and when the trailer load bearing structure is moved up, the container is lifted off of the tractor load bearing structure to be fully supported by the trailer load bearing structure.

In some embodiments, each tractor further comprises a lifting mechanism configured to move the tractor load bearing structure vertically. When a container supported by the tractor load bearing structure is moved up, the container comes into contact with and attaches to the trailer load bearing structure and when the tractor load bearing structure is moved up, the container is released from of the trailer load bearing structure to be fully supported by the tractor load bearing structure.

In some embodiments, each trailer load bearing structure is a transverse rail extending from a longitudinal frame member of the trailer. The top surface of the containers includes a channel, which channel captures a transverse rail to attach a container to a trailer. Each tractor has at least four transverse rails to thereby attach at least four containers.

Figure 39:
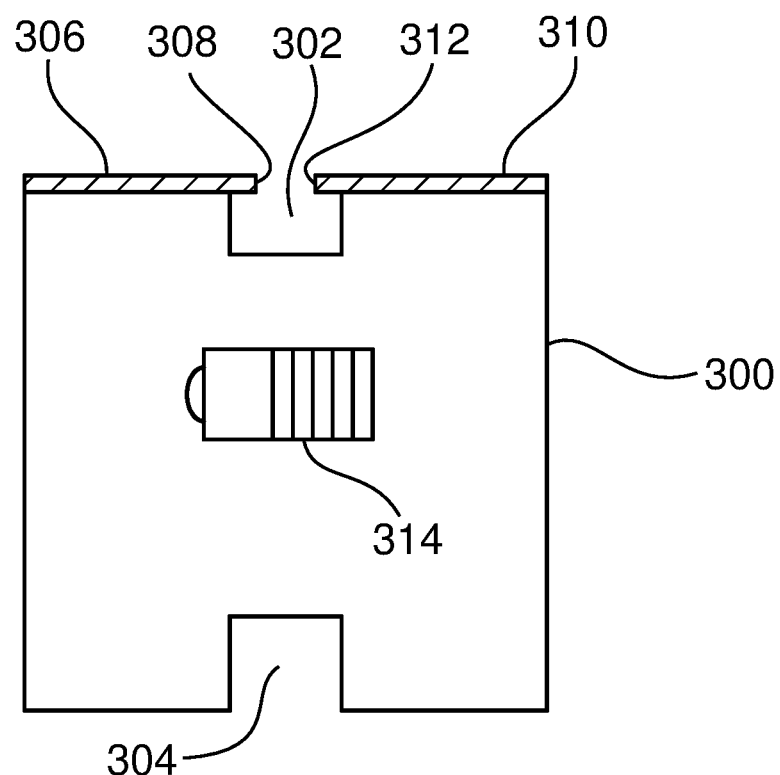
FIG. 39 is a front view of a container with a top channel, according to an embodiment of the invention.

FIG. 39 is a front view of a container 300 with a top channel, according to an embodiment of the invention. Container 300 is similar to container 30 described previously herein but further comprises a top channel 302 in addition to a bottom channel 304 wherein both channels extend completely end-to-end along the length of the container. Container 300 further comprises a top left structure 306 that forms a left lip 308 and a top right structure 310 that forms a right lip 312, and a battery charge indicator 314. Structure 306, 310 is preferably a reinforced material to be able to support at least the weight of the container when it is full of packages as it hangs from underneath a trailer on the transverse rails.

Figure 40:
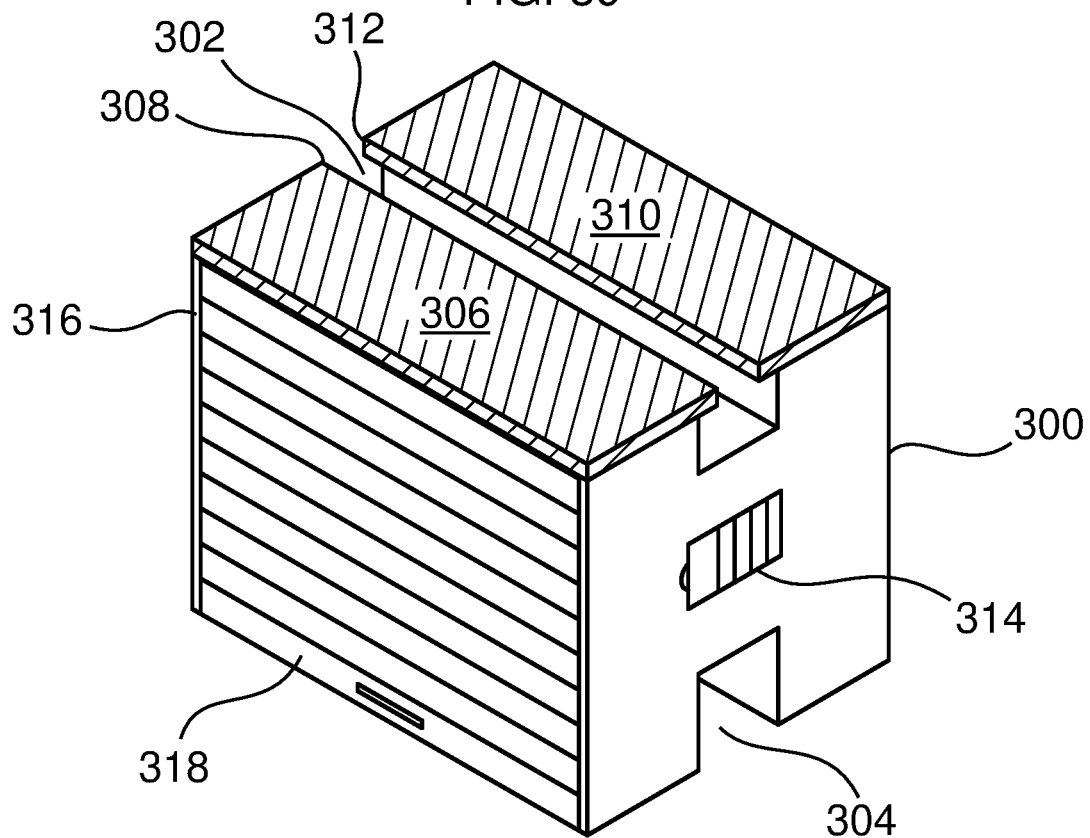
FIG. 40 is an isometric view of a container with a top channel, according to an embodiment of the invention.

In some embodiments, container embodiments may also have a top channel as illustrated in FIGS. 39-40.

FIG. 40 is an isometric view of a container 300 with a top channel, according to an embodiment of the invention. This view further illustrates how the top channel 302 extends along the length of the container 300. Container 300 further comprises a shell 316 and rolling door 318. A plurality of doors may also be used instead of rolling door as illustrated in FIGS. 10-12.

Figure 41:
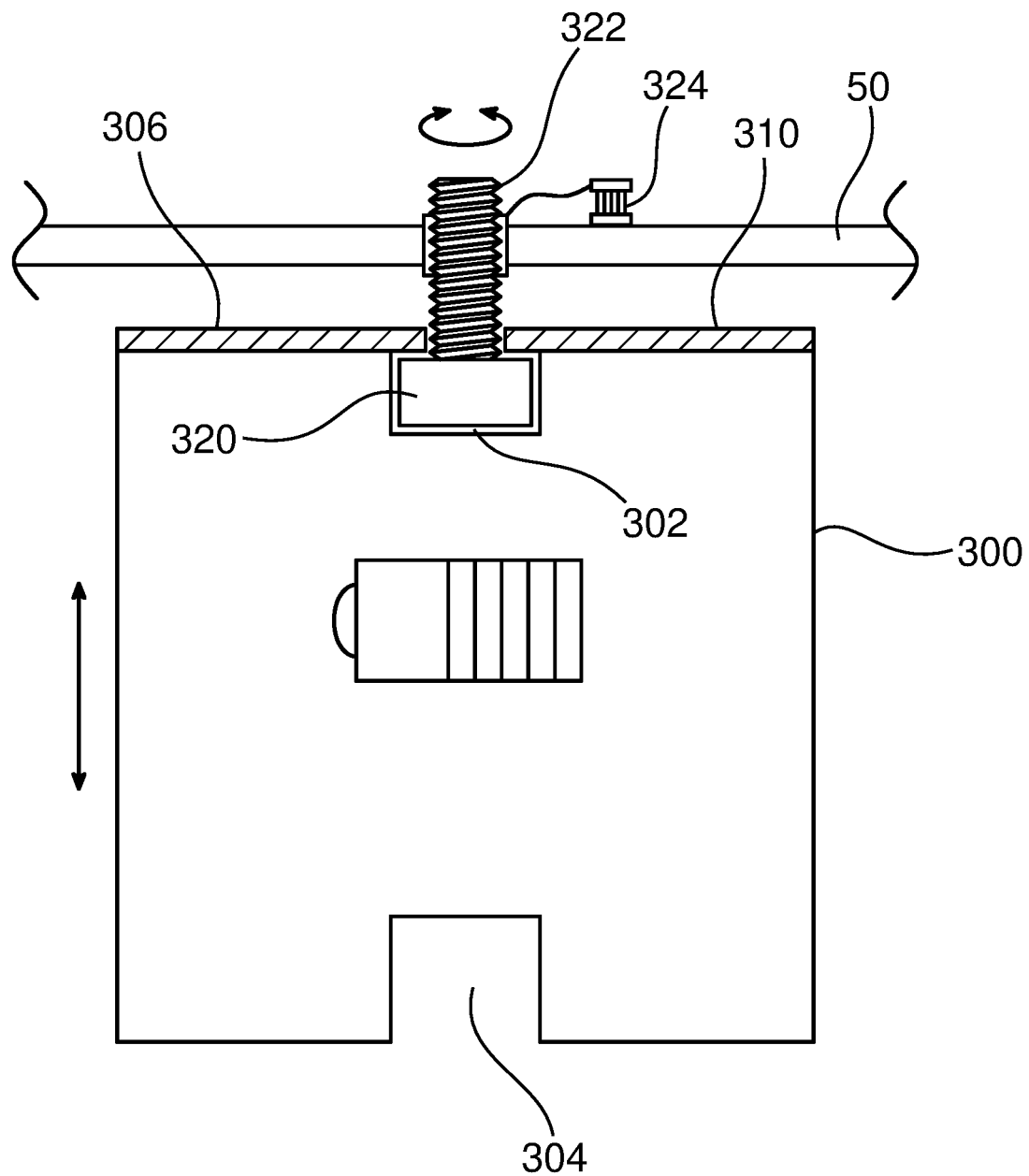
FIG. 41 is a front view of a container with a top channel hanging from a trailer, according to an embodiment of the disclosure.

FIG. 41 is a front view of a container 300 with a top channel hanging from a trailer, according to an embodiment of the disclosure. This view illustrates how container 300 hangs from a trailer 50 in a long-range transport. Only a portion of the trailer and a single transverse rail 320 is shown in FIG. 41. In this embodiment, the channel of the container 300 is aligned with the transverse rail so that the rail is inserted into the channel and the right and left lips 308, 312 rest on the top surface of the transverse rail. The container can be raised and lowered by a mechanical system 322. A screw lift is shown in FIG. 41 that is driven by a motor 324 but other mechanical lift systems may be used to move the transverse rails vertically. Each transverse rail may be moved independently of the other transverse rails.

When a container supported by the transverse rail is moved down, the container comes into contact with and rests on top of the tractor load bearing structure and when the transverse rail is moved up, the container is lifted off of the tractor load bearing structure to be fully supported by the trailer load bearing structure.

In one embodiment, a system for package distribution is provided. A long-range transport with at least four hanging mounts carries at least four containers. Each container has an overhead mount and a bottom mount and each container carries packages. Each of the overhead mounts is configured to mate with one of the hanging mounts. At least four tractors are provided, with each tractor have a top mount and each tractor being self-propelled. The top mount of the tractor is configured to mate with the bottom mount of the container. The tractor mates with the bottom mount, the overhead mount disconnects from the hanging mount, the tractor travels and delivers at least some of the packages, the tractor returns to the long-range transport, situating the container such that the overhead mount mates with the hanging mount, the bottom mount and top mount disconnecting, leaving the container mounted to the long-range transport.

In some embodiments, the top mount consists of pins and the bottom mount consists of holes, the pins configured to extend and mate with the holes, attaching the container to a tractor. In some embodiments, the overhead mount has lips that extends over both sides of the container and the hanging mount has two grooves with end caps, the lips resting in the grooves between the end caps as similarly shown in FIGS. 19-24. The container engages the grooves by being raised up such that the lip passes over the end caps, aligns the lips with the grooves, and lowers the container until the lips rest in the grooves. The tractor is configured to raise the container by hydraulic suspension, move the container to align the lips with the grooves, and lower the container, disengaging top mount from the bottom mount when the lips reach the grooves. Removal of the container from the grooves involves reversing these steps.

In one embodiment, a container consists of a top mounting member configured to mount the container to hang from a structure or a first transport and a bottom mounting member configured to mount the container on and be secured to a second transport.

In one embodiment, a container consists of a hanging member configured to hang the container from a hanging mount and a bottom member configured to rest on and be secured to a transport device.

Delivery Robot

Figure 42:
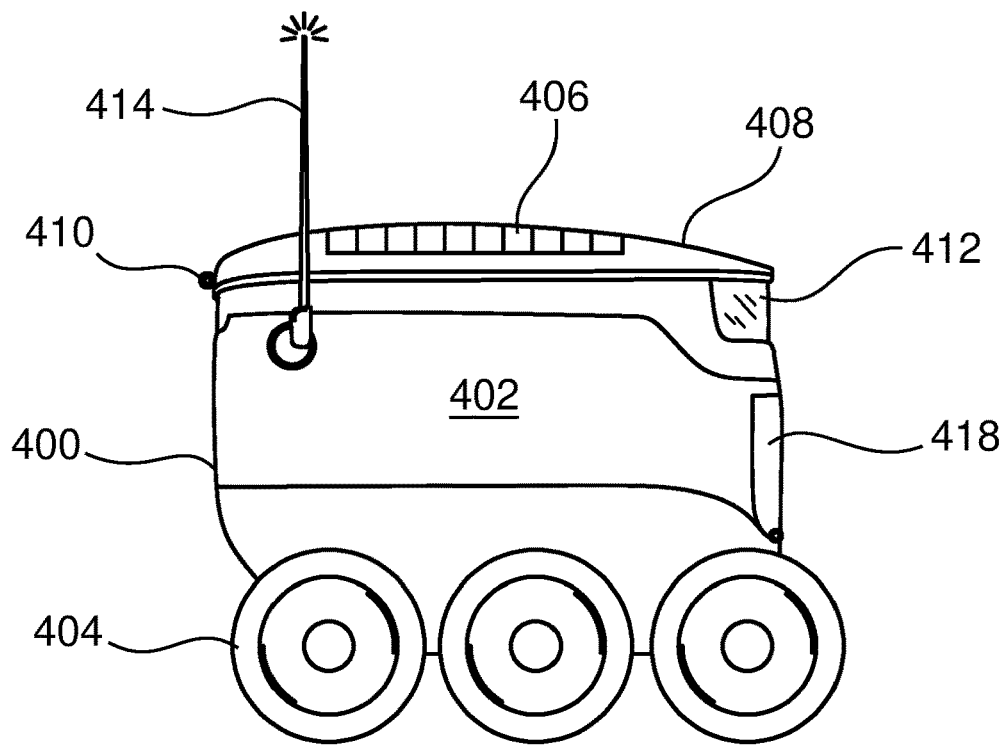
FIG. 42 is a front view of a delivery robot, according to an embodiment of the disclosure.

In some embodiments, a delivery robot may be used to deliver packages from the container at the end destination to a drop off point such as the front door of a residence of a recipient. The delivery robot may also be referred to as a "last mile" robot. FIG. 42 is a front view of a delivery robot 400, according to an embodiment of the disclosure. Robot 400 comprises a container body 402, which may also be referred to as a cargo bay, where a package or box can be securely held. The robot further comprises wheels that can be moved in forward and backward directions and can be used to change directions of the robot. The wheels are powered by at least one electric motor that is further supplied power by a rechargeable battery. The battery can be recharged or swapped out by a charged battery. The battery can be charged by the battery in the container or at the warehouse. The robot can be powered by a solar panel 406 located on the lid 408.

The robots use an omnidirectional drive in order to facilitate navigation to the drop off points. In some embodiments, the wheels on the robot may be Mecanum wheels to facilitate omnidirectional drive. A typical Mecanum wheel is a tireless wheel, having a series of rubberized external rollers with an axis of rotation at 45° to the wheel plane and at 45° to the axle line. Each Mecanum wheel is an independent drive wheel with its own motor. Spinning each wheel generates a propelling force perpendicular to the axle, which force can be vectored into a longitudinal and a transverse component in relation to the vehicle. As such, the robot with Mecanum wheels can be propelled in any direction by spinning each wheel in the appropriate direction.

Preferably, the design of the wheels, namely the diameter, width, tread and materials, are selected to provide the best performance for traveling from the delivery container to the drop off point for the package. For example, the wheels may be designed so that the robot can successfully get over curbs, stairs, or other obstacles on its way to the drop off point. In other embodiments, a pair of driven dual tracks are used instead of or in combination with wheels. In other embodiments, the robot may comprise four wheels or eight wheels. In some embodiments, the delivery robot may have one wheel in front and two in back or two in front and one in back.

The robot may include a suite of sensors such as cameras, a GPS intertial measurement unit, ultrasonic sensors, radar, or lidar that are used in navigating from the container to the drop off point. The robot may further comprise speakers to communicate with a human. In the event autonomous operation of the robot fails, it can be remote controlled instead. In some instances, the robot may be controlled by a combination of autonomous operation and remote control. The delivery robot may use feature detection of edges and mapping techniques to determine the suitability of navigable terrain. The robot is able to navigate stationary objects and moving humans or other moving objects such as vehicles.

The two or more robots may be able to communicate with each other to form an artificial neural network (ANN) wherein each robot act as a node. As the robots navigate through a city or town and come across obstacles that can delay their trip to their final destinations, the robots can collect and communicate this information to the other robots so that their trip can be adjusted and re-directed to avoid the obstacles and provide a more efficient route to their final destinations.

The drop off point is typically at the recipient's front door. A signal is generated, either an audible signal with a volume to be heard through the door, or a wireless signal to the recipient's device, informing the recipient that a package is at the front door. The delivery robot is programmed to wait a certain period of time for a response. The recipient may provide his preference in advance as to whether the package should be left at the front door or returned at a later date if no one is at home to accept the package.

The lid to the body of the robot is mechanically locked throughout the journey from the container to the location of the recipient to prevent the package from being stolen. Upon arrival, the recipient can open the lid to remove the package with a smartphone app. The location of the robots is tracked, so the recipient knows exactly the location of their order and receive a notification at the time of arrival.

In alternative embodiments, the drop off point is inside a garage or other structure on the recipient's property. For example, the delivery robot may use a system such as that disclosed in U.S. Pat. Nos. 9,608,834; 9,654,614; 9,712,335; 9,922,513; 9,811,958; 10,728,052; 10,217,303; 10,997,547; 10,783,479; or 10,950,076; all of which are related to in-garage delivery. For in-garage delivery, the robot may be programmed to generate a unique signal that opens the garage door.

Piloting the delivery robot to the drop off point is preferably done autonomously. Cameras on the delivery robot can facilitate this, as well as GPS signals and/or beacons placed at drop off spots such as at the front door or at the garage door. Preferably, the delivery robot uses AI to learn, store and execute navigation instructions upon multiple trips to individual drop off points.

The delivery robot further comprises a hinge 410 that connects the lid to the robot body and allows the lid to readily be opened and closed. The robot further comprises a navigational system located behind a window 412 and an antenna 414 to receive or transmit a wireless signal.

Figure 43:
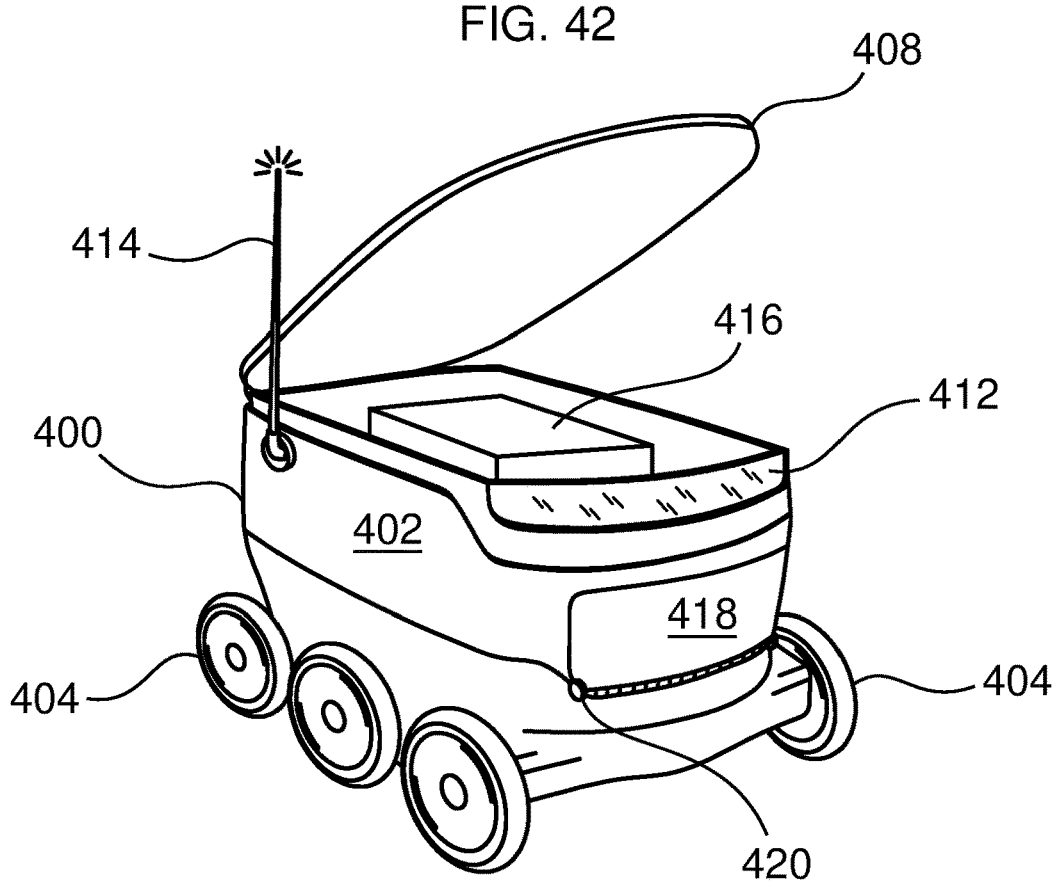
FIG. 43 is an isometric view of a delivery robot with the lid open, according to an embodiment of the disclosure.

FIG. 43 is an isometric view of a delivery robot 400 with the lid open, according to an embodiment of the disclosure. This view further illustrates the location of a package 416 and how it is situated inside the cargo bay of the robot with the lid open. The robot is further capable of notifying a recipient that the robot is at the door such that the recipient can receive the package. The robot may further comprise a mechanism to remove the package and leave it at the front door of the residence. The robot further comprises a door 418 that is connected to the robot body by a door hinge 420 that can be opened to push out a package out of the body of the robot body to leave the package at a location such at the front door of a residence.

Figure 46:
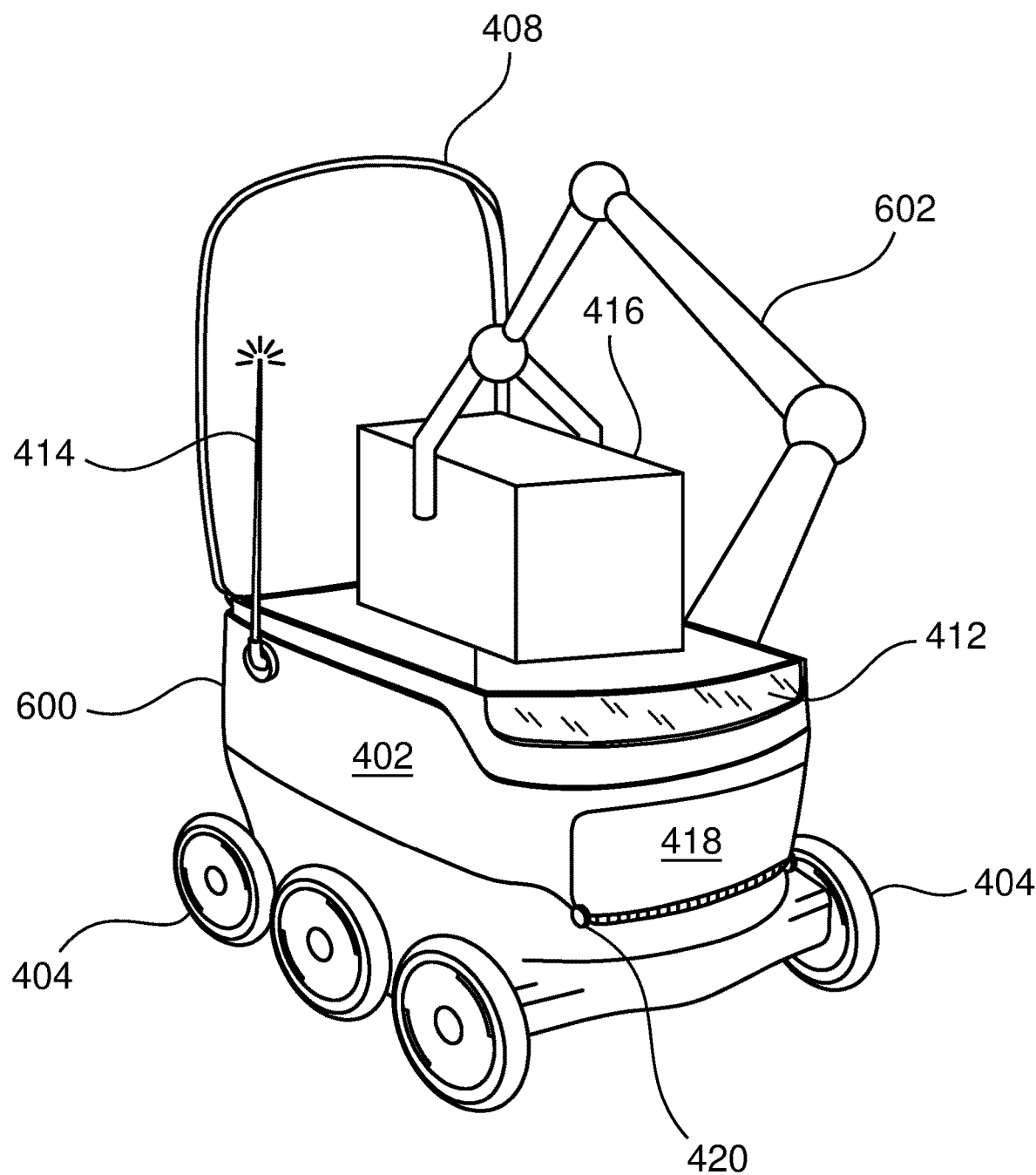
FIG. 46 is an isometric view of a delivery robot with a robotic arm, according to an embodiment of the disclosure.

In some embodiments, the delivery robot may further comprise a device to remove the package from inside the robot body. FIG. 46 is an isometric view of a delivery robot 600 with a robotic arm, according to an embodiment of the disclosure. The delivery robot 600 in FIG. 46 is similar to delivery robot 400 illustrated in FIGS. 42-43. The robotic arm is configured to grasp a package in order to place the package at the desired drop off point. This embodiment of a delivery robot can deliver the package by a recipient removing the package from the robot after the lid is opened, pushing it out the door 418 and a robotic arm with pincers grasping and lifting the package from the inside robot and placing it at a front door, in the garage, in a package receptacle, handing it directly to a recipient or other location. In some embodiments, the only method the delivery robot may have to remove and deliver the package is with a robotic arm.

Figure 44:
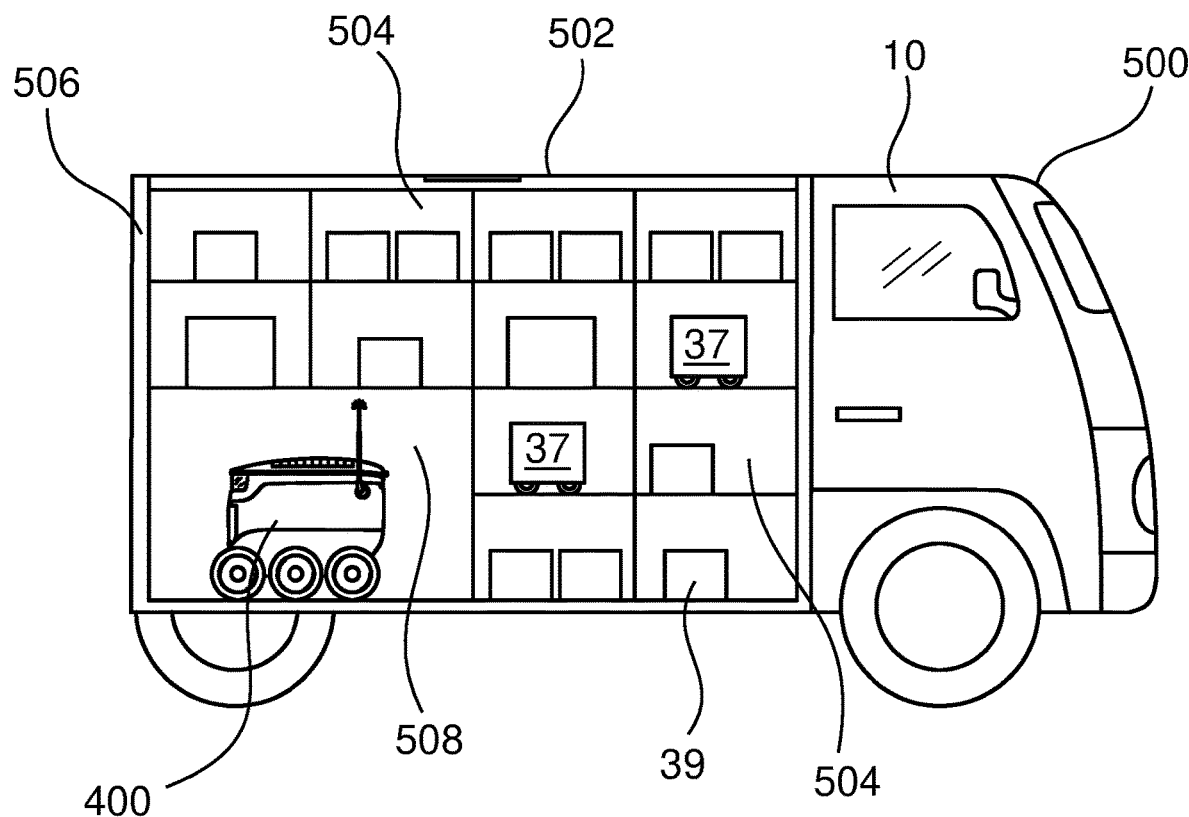
FIG. 44 is a side view of a container on a short-range tractor with a compartment for a delivery robot, according to an embodiment of the invention.

FIG. 44 is a side view of a container on a short-range tractor 500 with a compartment 508 for a delivery robot, according to an embodiment of the invention. The container 502 and tractor in this view is similar to that previously shown in FIG. 9. The container 502 in this embodiment comprises a plurality of compartments 504 and an outer shell 506. The compartments are filled with packages 37, 39. One or more of the compartments 508 has been modified to be able to store a delivery robot 400 until it is time for the delivery robot to leave the modified container 502 to deliver one or more packages. A ramp may be pulled out by a driver or be automatically lowered for the robot to leave the compartment 508. A robot with a robotic arm may also be used to deliver packages from a container.

Figure 45:
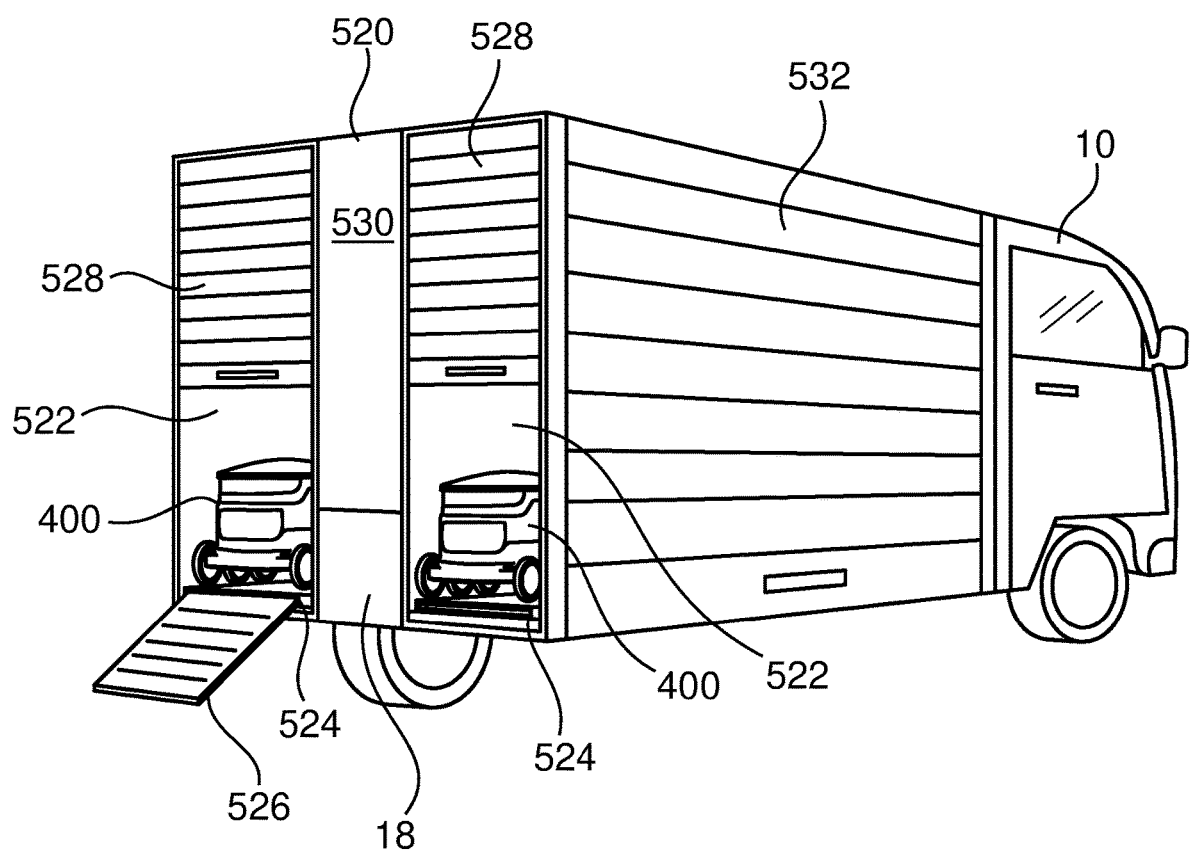
FIG. 45 is a rear isometric view of a container on a short-range tractor with cubbyholes for a delivery robot, according to an embodiment of the invention.

FIG. 45 is a rear isometric view of a container on a short-range tractor with cubbyholes for a delivery robot, according to an embodiment of the invention. In this embodiment, the container 520 located on a short-range tractor 10 with a rolling door 532 has been modified to comprise two rear cubbyholes 522 to store two delivery robots. The robots rest on a platform-like structure 524 that further comprises a lowered ramp 526 shown on the left. The ramp on the right has been removed to better view the robot on the right. The cubbyholes further comprise on overhanging structure 528 attached to the shell 530 to protect the robots from damage or weather.

A delivery robot with a robotic arm may be configured to help retain the delivery robot in its storage position in a compartment of a container. The robotic arm can also be configured to retain the delivery robot in its storage position. The robotic arm can also be configured to facilitate the delivery robot getting into and out of its storage position.

At least two delivery robots may be carried with each container, and wherein the two delivery robots are configured to simultaneously carry two different packages to two different drop off points. The two different drop off points, for example, may be located at two different residences on the same street. Each delivery robot may be configured to carry more than one package from the container and configured to navigate to more than one drop off spot before returning to the container. Each delivery robot may be configured to return to the container even when the container has been moved from the original end destination. This is referred to as catch up mode such as in the case when the container keeps moving down a street from one location to another. Each delivery robot may be configured to wait for the return of the container whenever the container has moved away from the end destination, and then navigate back to the container when the container has returned to the end destination. This is referred to as wait mode.

Multi-Use Package Receptacle

The following embodiments relate to a multi-use receptacle for deliveries of packages to and from end destinations.

Figure 14:
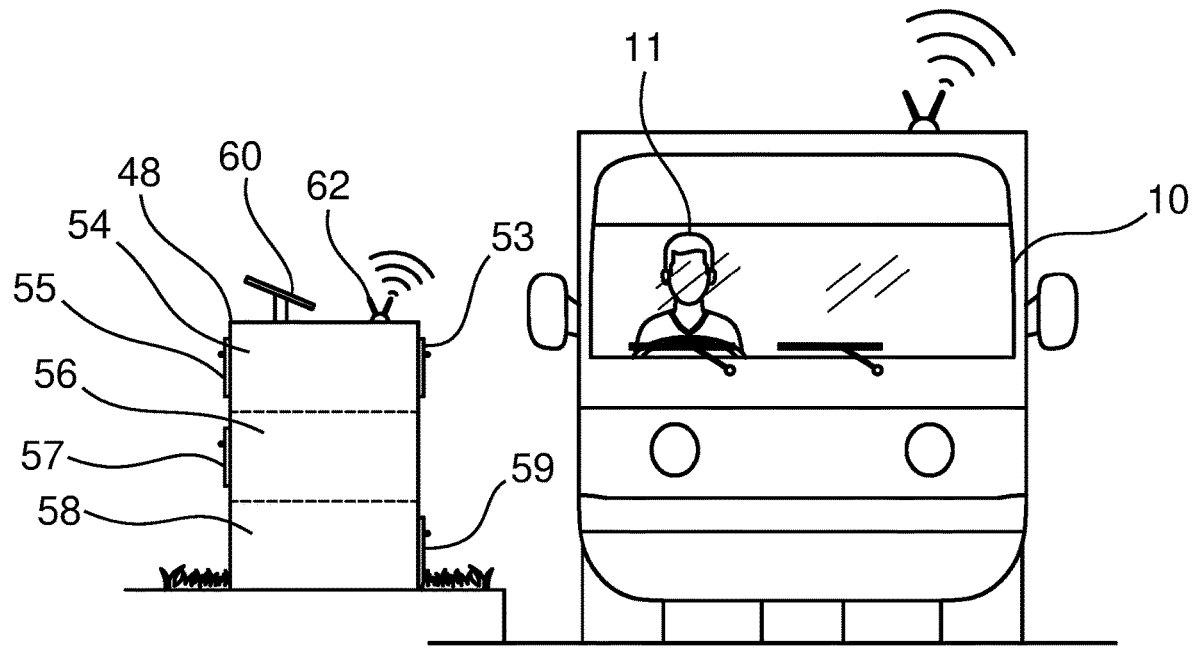
FIG. 14 is a front view of a delivery vehicle and a package receptacle, according to an embodiment of the disclosure.
Figure 15:
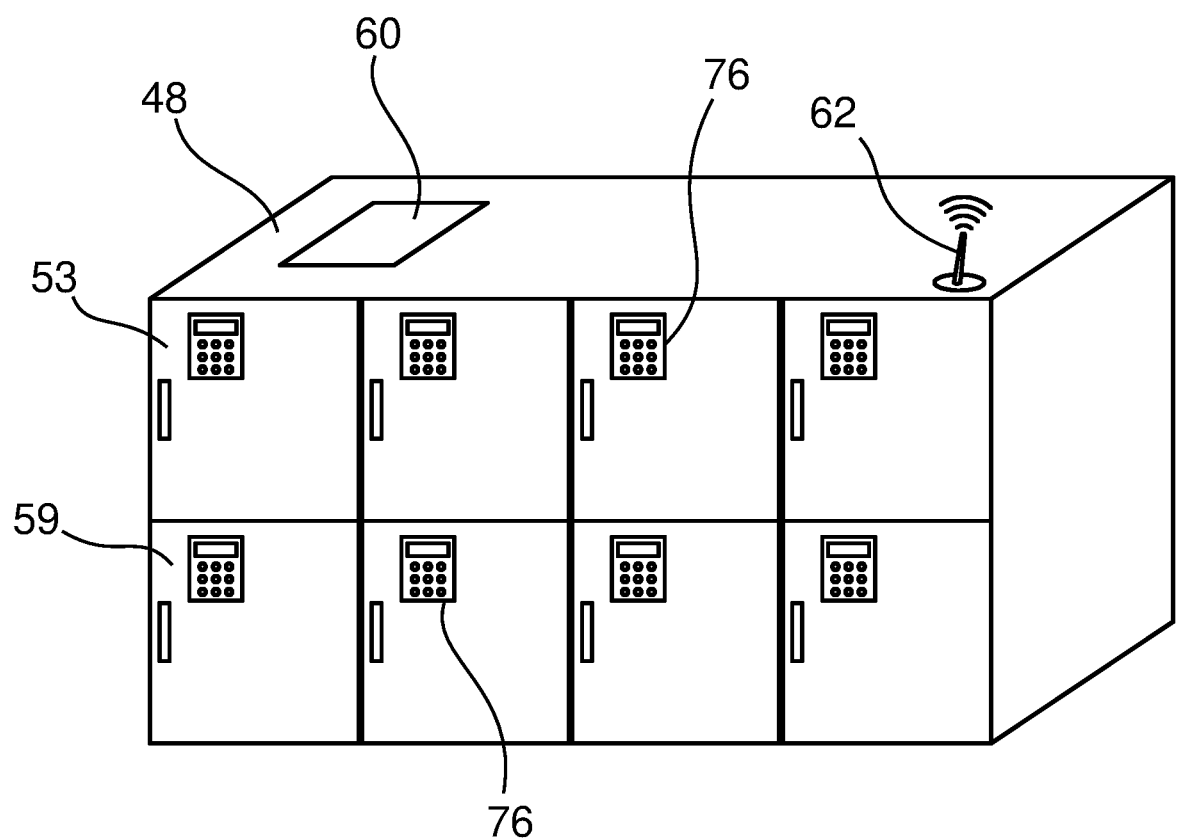
FIG. 15 is an isometric view of a multi-user package receptacle, according to an embodiment of the disclosure.

FIG. 15 is an isometric view of a multi-user package receptacle, according to an embodiment of the invention. The package receptacle 48 is preferably powered by solar panel 60 and communicates with transmitter/receiver 62 in the same manner as FIGS. 13-14. In this embodiment, the package receptacle is preferably used by a single residence or business. Alternatively, the receptacle may be used by a neighborhood, apartment complex, or office complex. Individual sets of doors 53 and 59 with their receiving chamber or first compartment on top and delivery chamber on the bottom, can be controlled by an individual household or company, or each set can be assigned on an as used basis. Unlike FIGS. 12-14, this embodiment has doors on the front only.

When an end user has a package to deliver, e.g., return to the warehouse or other location, the end user enters a code into a keypad 76 on a door 59 or uses a smart phone app to open the door, where he places his package. Placement of the package signals the delivery service that there is a package to be picked up. The delivery vehicle arrives and picks up any packages behind the doors 59 and delivers any packages behind door 53. The end user can then retrieve any packages at his convenience.

In another embodiment, the lower or second compartment 59 is a trash compactor, as in FIG. 14, and packages are delivered and received behind door 53. This lower or second compartment may also be used to receive re-usable packaging that can be returned to the warehouse, as previously described herein. The lower or second compartment may be used to receive recyclable materials that are returned to the warehouse or other location for recycling.

FIG. 14 is a front view of a delivery vehicle and a package receptacle that may be used in one embodiment of the present invention. The delivery vehicle 10 may be the same as in FIGS. 1-2, 3-10 or FIG. 10 or may be a truck with non-removable storage. The delivery driver 11 pulls the delivery vehicle 10 up to a package receptacle 48. The delivery driver 11 has a wireless electronic device, such as a smart phone or built-in device, that transmits a signal to the receiver 62. The door 53 for the top compartment 54, in this embodiment acting as both a receiving box for packages and as a delivery box for the package recipient to also send packages, is opened and the delivery driver 11 removes any packages in the top compartment 54 for delivery and places any packages for the end destination in the top compartment. The package recipient also has access to the middle and lower compartments, 56 and 58. Middle compartment 56 is a compactor into which cardboard may be placed and compressed into a removable block that is placed in lower compartment 58. The delivery driver 11 opens the door 59 and removes the block for recycling. In some embodiments, the compactor includes shredding capacity for shredding cardboard boxes before compaction. The package receptacle is powered by solar panel 60 with a battery for dark and cloudy times.

In some embodiments, the compactor receives not just cardboard but also other garbage to compact into a smaller volume for pickup. The lower chamber 58 preferably contains plastic that wraps the compacted garbage for removal by the delivery driver 11. In some embodiments, the lower chamber 58 sanitizes the garbage.

The refuse may be only recyclables, such as cardboard, paper, and plastics, or may include yard waste, food waste, and other garbage. In some embodiments, the compacted garbage is sanitized by steam, UV, ozone, or other chemical treatment. In some embodiments, the compacted garbage is sealed in a sanitary plastic wrap, which is preferably biodegradable. In some embodiments, a second compartment is provided to shred cardboard in a shredder that feeds a compactor.

In one embodiment, an alarm is configured to alert the end recipient of the delivery of a package, an item being picked up, or any tampering with the receptacle.

In one embodiment, the package receptacles contain an indicator to uniquely identify the delivery destination to verify correct delivery of the package. The container may include a reader to automatically read the indicator. This reader may be incorporated into the robotic arm. The indicator can be an optically scannable code or a radio-wave beacon.

The user may also use the receptacle to send a package. The sent package may be a return to the distribution center it came from. Alternatively, the receptacle may be used to deposit and thereby send a package to another location, for example via a carrier such as UPS or FedEx.

In one embodiment, the package recipient has a code, key, or wireless access to door 57 and can place the package into compartment 56. The wireless receiver 62 may also be a transmitter and signals the wireless transmitter 46, also a receiver, that there is a package or packages to retrieve. The door 59 is then opened and the package is provided to the robotic arm 42 which places it into the small compartment 58 that the package delivered was stored in. In other embodiments, other open small compartments may be used.

In some embodiments, a processor for processing data relating to the identity of the packages and the respective delivery destinations is provided. The processor is configured to determine efficient loading of the packages into each of the containers. The processor is further configured to determine efficient loading of the containers onto the long-range transports. The processor is still further configured to determine efficient locations of the one or more intermediate destinations. Artificial intelligence (AI) may be used to determine optimal loading of packages and containers, as well as delivery routes.

In some embodiments, package receptacles are located at at least some of the delivery destinations. The containers preferably each have a robotic device for placing a package in a package receptacle at a delivery destination. In alternative embodiments, the package receptacles have robotic means of retrieving the appropriate packages from the container. In some embodiments, the package receptacles have an indicator to uniquely identify its delivery destination and wherein that indicator is used to verify correct delivery of a package. The robotic device includes a reader to read the indicator. The indicator may be an optically scannable code or a radio-wave beacon. The containers may comprise a reader to automatically read indicators on.

In one embodiment, a multi-use package receptacle for deliveries to and pickups from a home is provided. A first compartment is for receiving a package delivered from a delivery service. A second compartment is for depositing an item to be picked up by a pickup service. For efficiency's sake, the delivery service and pickup service may be one and the same. An access control unit is configured to lock and unlock the first and second compartments. The access control unit grants access to both the first and second compartments to a user associated with the home. The access control unit grants access to the first compartment to a verified delivery service and grants access to the second compartment to a verified pickup service. By "verified," it means a service that has been pre-cleared and authorized. The item to be picked up may be trash or a package to be returned to a vendor or delivered to another recipient. In some embodiments, indicators uniquely identify the compartment of the set of first compartments and set of second compartments to verify correct delivery or pickup compartment.

In some embodiments, the receptacle has an indicator to uniquely identify the home and is used to verify correct delivery or pickup location. The indicator may be an optically scannable code or a radio-wave beacon. The indicator is configured to be automatically read by a vehicle of the delivery service and by a vehicle of the pickup service.

In some embodiments, the access control unit grants access to the user in response to a wireless signal generated by a smart device associated with the user. The smart device may be a smart phone. The wireless signal may be a Bluetooth® signal. The access control unit may grant access to a delivery service in response to a wireless signal generated by a device carried by a delivery vehicle. The access control unit may grant access to a pickup service in response to a wireless signal generated by a device carried by a pickup vehicle. The access control unit is powered by a battery that is recharged by a solar panel.

In some embodiments, the first and second compartments are configured to cooperate with a robotic delivery mechanism of a delivery vehicle and/or pickup vehicle.

In one embodiment, a container for delivering packages is provided. The container has one or more of package storage modules which may also be referred to as compartments. Each package storage module has a signal-actuated door on an external wall of the container. The one or more package storage modules are configured to carry one or more packages to end destinations. The one or more packages are placed in the one or more package modules by a delivery service. The container travels to an end destination. A package recipient supplies a digital signal, supplied by the delivery service, to open one of the package modules and retrieve the one or more packages contained therein.

In one embodiment, the container has a GPS receiver that signals a processor that determines the location of the container and determines which package recipient is next and which of the one or more packages storage modules contains the one or more packages for the package recipient.

In one embodiment, each of the signal-actuated doors has an indicator, such as a colored light. The light for the signal-actuated door of the next of the package storage modules is turned on when the processor determines which package recipient is next, the light indicating which door the package recipient is to open to retrieve his one or more packages.

In some embodiments, the container has a single package storage module which has an inner door that faces a bulk package storage that contains all packages that are to be delivered while the container is traveling to a plurality of the end destinations. The bulk package storage has a robotic arm for moving the one or more packages for the end destination from the bulk package storage, through the inner door, and into the single package storage module.

In some embodiments, the container has a GPS that signals a processor that determines the location of the container and determines which package recipient is next, opens the inner door, directs the robotic arm to grab the one or more packages for that end destination and place them in the single package storage module, and closes the inner door.

Preferably, each of the signal-actuated doors face curb side to provide more efficient and safer access.

In one embodiment, the container has a vertical board with mount points on which the one or more package modules are mounted. In one embodiment, the package modules are sized to fit the varying sizes of the one or more packages contained therein and placed with other package modules on the container based on proximate end destinations. In one embodiment, a robotic system fills the one or more package modules and mounts the one or more package modules onto the vertical board. In one embodiment, the vertical board runs the length of the container and has mount points on both sides such that the package modules are located on both sides. In one embodiment, the container is autonomous and is configured to drive forward and backward as needed so that the container aligns the package module being accessed by the package recipient to curbside.

In one embodiment, the signal-actuated door is hinged on the top such that as the package is pushed through the signal-actuated door, the package recipient takes the package and the signal-actuated door closes and locks, prohibiting the package recipient from taking packages being delivered to other recipients.

In one embodiment, an end user with a package to deliver signals the delivery provider to pick-up his package. The delivery provider adds the location of the end user as a stop during delivery to proximate end destinations. The container signals the end user upon arrival such that the end user brings the package to load into a selected package storage module. The end user supplies a signal to the container that the end user is ready. The container then delivers the package to the delivery provider for ultimate delivery.

Container for Delivering Multiple Packages at a Pickup Location

Figure 47:
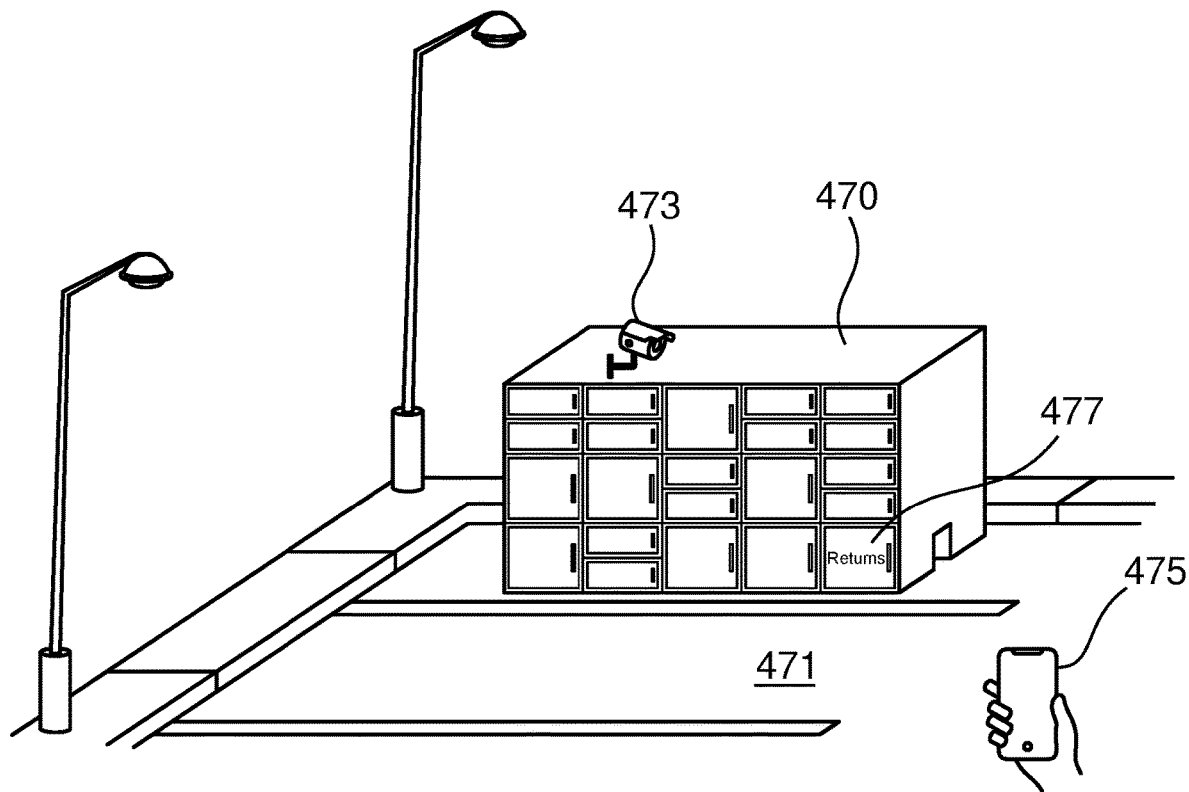
FIG. 47 is an isometric view of a container parked at a pickup location.
Figure 48:
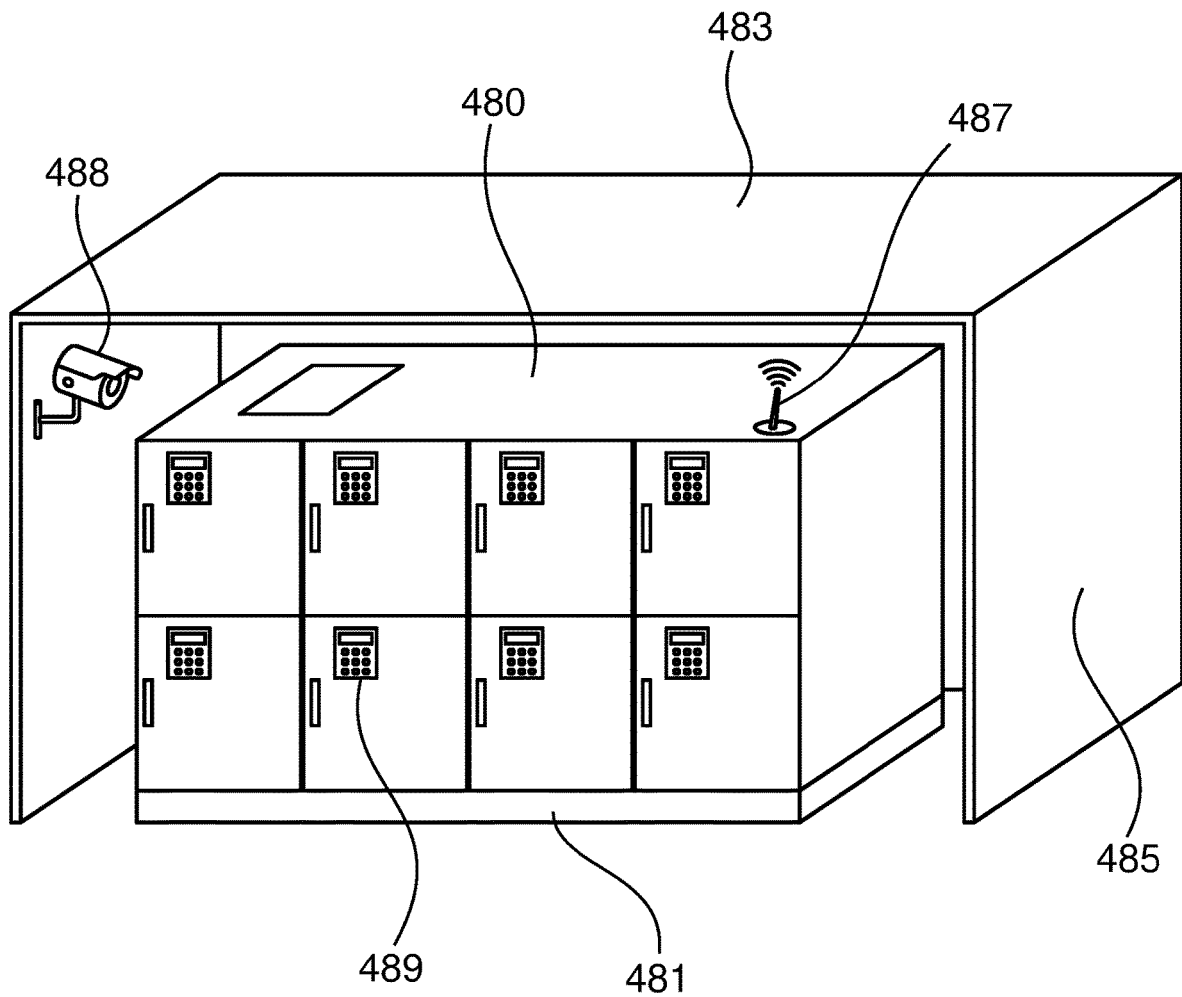
FIG. 48 is an isometric view of a container parked on a protected landing pad at a pickup location.

As noted above, one embodiment is a system for delivering packages that uses a plurality of containers that are transported from a distribution center to pick up locations and parked there, whereupon package recipients retrieve their packages from the container. As depicted in FIGS. 47 and 48, each container includes a plurality of package storage compartments, with each compartment having an individually controlled access door on an external wall of the container. One or more packages are placed in at least some of the plurality of modules at the distribution center.

The container is configured to be transported between the distribution center and the pickup location. Preferably, this is accomplished as described above in connection with FIGS. 16-30. In summary, the containers are loaded with packages at the distribution center, whereupon the containers are loaded onto a long-range transport, which carries the containers to one or more intermediate destinations. At the intermediate destination, each container is attached to a short-range tractor, which takes the container to a pickup location. The container is parked, i.e., left at the pickup location, for a predetermined period of time. At the end of that time, a short-range tractor picks up the empty, or mostly empty container and takes it back to the intermediate destination. At that point, the container is loaded on the long-range transport and carried back to the distribution center to restart the process.

These containers can be transported to the pickup locations by other means. For example, in one alternative embodiment, the containers may be provided with a motor and wheels and thus be self-propelled. As such, the containers can transport themselves between the distribution center and the pickup locations. Such self-propelled containers may be driven autonomously (see FIG. 37), by remote control, or include a cab for a human driver (See FIG. 38).

In a second alternative embodiment, these containers may also be loaded onto the tractors, so as those shown in FIGS. 1 and 2 at the central distribution center and delivered directly to the pickup locations. In other words, this second embodiment eliminates the intermediate destinations and the long-range transports.

In a third alternative embodiment, multiple containers are loaded onto a long-range transport (See FIG. 16), which transports each of the containers to the appropriate pickup locations. In other words, this third embodiment eliminates the intermediate destinations and the short-range tractors. In a particularly busy pickup location, two or more containers may be parked to handle the volume.

In the simplest embodiment (see FIG. 47), the containers are parked on a paved or even a gravel or dirt spot. For example, a corner of an existing parking lot 471 may be used. In other embodiments (see FIG. 48), the containers are provided with landing pads 481 at the pickup locations. Other features such as a roof 483 and walls 485 may be added to protect the container and users from the elements. Alternatively, features such as an extendable awning may be provided as part of the container.

The recipients of the packages in the compartments of the container are notified of the arrival of the packages at the pickup location. This can be accomplished by a processor at central station sending out messages, such as e-mails or texts. Preferably, the notifications are made through an app running on the recipient's smart device, such as a smart phone.

Preferably, the notification includes not only the arrival of the package, but also communicates the time window within which the package must be retrieved, i.e. the time before the container will be picked up and returned to the distribution center. Even more preferably, the system will send reminders to the package recipient if the package has not been picked up by a certain time and warning that the package will be returned if not picked up. The reminder may also indicate that extra shipping charges may be incurred if the package has to be returned. For this preferred embodiment, the system needs a way of knowing when packages are picked up. This may be accomplished by simply detecting and recording when a particular compartment door is opened. Alternatively, one or more cameras, weight sensors or other devices may be used to detect individual package retrieval. Cameras 473 and 488 may be preferred, in that a record of who retrieved each package can be maintained. Cameras and other security systems may also be employed to protect the packages from theft and the users from harm.

The notifications may be triggered according to the delivery schedule. Alternatively, the notifications may be triggered by a positive detection that the container with the appropriate packages has been parked at the pickup location.

Preferably, the system includes devices 487 to facilitate wireless communication between the containers and a central station. Through such, the central station can keep track of the location of the containers, both while in transit and when parked. Also, the wireless communication allows the central station to detect and record when individual packages are retrieved. The communication also allows the central station to monitor any unsafe weather or criminal conditions at the parked containers' locations.

This system is configured to provide each package recipient with access to the compartment containing the package intended for that recipient. In its simplest form, this is provided by sending the recipient the identification, e.g., number, of the compartment along with an access code, such as a sequence of numbers or letters, that, when entered into a keypad 489 or touchscreen at the container, opens the door of the appropriate compartment. In alternative embodiments, the system stores bio-identifiers of each recipient, e.g., fingerprint, facial print, retinal scan, etc., and the recipient uses a touch pad or other input device to have that bio-identifier read by the system.

In still other embodiments, the package recipient is provided with means to generate a unique wireless signal, e.g., a Bluetooth sequence from his smart phone 475, that opens the appropriate door of the container. Preferably, such a signal would be managed and generated by an app running on the recipient's smart phone.

One preferred feature of such a delivery app or of the ordering website is for the recipient to be able to specify a convenient day for pickup of his package from the parked container. For example, if the default day would occur when the recipient would be away, he can reset the day and time to one that suits his travel schedule. The app or website may also be used to select a date that would allow multiple packages to be picked up together, i.e., delay delivery of a first package to a date a second package would be set to arrive.

Another preferred function of these embodiments is to allow customers to return packages through the system. In other words, one or more compartments 477 can be set aside for customers to place packages that they want to return to the distribution center. Through the app or through the web site, a customer wanting to return an item receives an authorization code that can be entered in order to open the return compartment door. Once the return compartment door is closed, the system records that an item has been placed therein for return to the distribution center.

Preferably, each container is provided with a battery to power the mechanisms, electronics and communication systems thereon. The container's battery may be charged while the container resides at the distribution center. Alternatively, the container's battery can be swapped out for a charged battery when depleted or degraded. In other embodiments, the container can be powered through connection to the landing pad 481.

Methods to Manufacture the Components of the System

A tab and slot method of fabrication may be used to assemble any of the components of the systems described herein. This provides an efficient and precise way to build all or part of the container, the delivery vehicle, the long-range transport, the tractor and/or the receptacle. Further, non-additive laser welding may be used to produce high quality welds, to speed up manufacturing, and to aide automation.

It also reduces material costs, provides smokeless manufacturing, which is less hazardous, and reduces and cleanup costs.

The preferred method of manufacturing these components of the present invention involves a tab and slot method, whereby a chassis and/or frame are constructed from metal pieces cut from flat stock, such as an aluminum alloy or stainless steel. This technique has been described in the following U.S. Patents, the entire disclosure of which are incorporated by reference: U.S. Pat. Nos. 8,398,159; 9,387,886; 9,802,663; and 10,604,192. By one method, a frame is constructed by the tab and slot method and a skin, such as a molded fiber reinforced polymer or a metal, such as an aluminum alloy or stainless steel, is attached thereto.

The invention has been described with reference to various specific and preferred embodiments and techniques. Nevertheless, it is understood that many variations and modifications may be made while remaining within the spirit and scope of the invention.

What is claimed is:

1. A fleet for delivering packages comprising:
   a first number of at least four containers, each container comprising:
     at least one compartment for receiving packages at a main distribution center;
     a first attachment member on an outer surface; and
     a second attachment member on an outer surface;
   a second number of long-range transports, each long-range transport configured to carry multiple containers from the main distribution center to an intermediate distribution center, each long-range transport comprising multiple first attachment receivers, whereby the first attachment members of the multiple containers are releasably attached to the long-range transports during transport from the main distribution center to the intermediate distribution center; and
   a third number of short-range tractors, each short-range tractor comprising a load bearing structure and configured to carry at least one container from the intermediate distribution center to delivery destinations for the packages in the container, each tractor comprising at least one second attachment receiver, whereby the second attachment member of the at least one container is releasably attached to the short-range tractor during transport from the intermediate distribution center to the delivery destinations and back to the intermediate distribution center;
   wherein the third number is at least twice as large as the second number and wherein the first number is at least twice as large as the third number.

2. The fleet of claim 1, wherein the long-range transports comprise a trailer pulled by a long-range tractor.

3. The fleet of claim 2, wherein the first attachment member is located on a top surface of the containers, whereby multiple containers hang from a trailer load bearing structure when attached.

4. The fleet of claim 3, wherein the second attachment member is located on a bottom surface of the containers, whereby the containers rest on top of a tractor load bearing structure when attached.

5. The fleet of claim 4, wherein the trailer further comprises a lifting mechanism configured to move the trailer load bearing structure vertically, whereby when a container supported by the trailer load bearing structure is moved down, the container comes into contact with and rests on top of the tractor load bearing structure and when the trailer load bearing structure is moved up, the container is lifted off of the tractor load bearing structure to be fully supported by the trailer load bearing structure.

6. The fleet of claim 4, wherein each short-range tractor further comprises a lifting mechanism configured to move the short-range tractor load bearing structure vertically, whereby when a container supported by the short-range tractor load bearing structure is moved up, the container comes into contact with and attaches to the trailer load bearing structure and when the short-range tractor load bearing structure is moved up, the container is released from of the trailer load bearing structure to be fully supported by the short-range tractor load bearing structure.

7. The fleet of claim 4, wherein the short-range tractor load bearing structure is a horizontal, longitudinal rail, extending rearwardly from a cab.

8. The fleet of claim 7, wherein the bottom surface of the containers includes a channel into which the rail is inserted to attach a container to a short-range tractor.

9. The fleet of claim 3 wherein each trailer load bearing structure is a transverse rail extending from a longitudinal frame member of the trailer.

10. The fleet of claim 9, wherein the top surface of the containers includes a channel, which channel captures a transverse rail to attach a container to a trailer.

11. The fleet of claim 10, wherein each trailer comprises at least four transverse rails to thereby attach at least four containers.

12. The fleet of claim 11, wherein the trailer further comprises a lifting mechanism for each of the at least four transverse rails, with each lifting mechanism configured to move one transverse rail vertically, whereby when a container supported by the transverse rail is moved down, the container comes into contact with and rests on top of the short-range tractor load bearing structure and when the transverse rail is moved up, the container is lifted off of the short-range tractor load bearing structure to be fully supported by the trailer load bearing structure.

13. The fleet of claim 11, wherein the trailer further comprises a lifting mechanism for all of the at least four transverse rails, with the lifting mechanism configured to move all of the transverse rail vertically, whereby when containers supported by the transverse rail are moved down, the containers comes into contact with and rests on top of the short-range tractor load bearing structures and when the transverse rails are moved up, the containers are lifted off of the short-range tractor load bearing structures to be fully supported by the transverse rails.

14. A system for package distribution comprising:
   a long-range transport comprising at least four hanging mounts;
   at least four containers each comprising an overhead mount and a bottom mount and each short-range transport carrying packages;
   each of the overhead mounts configured to mate with one of the hanging mounts;
   at least four short-range tractors, each comprising a top mount and each short-range tractor being self-propelled;
   the top mount configured to mate with the bottom mount; and
   wherein the short-range tractor mates with the bottom mount, the overhead mount disconnects from the hanging mount, the short-range tractor travels and delivers at least a portion of the packages, the short-range tractor returns to the long-range transport, situating the container such that the overhead mount mates with the hanging mount, the bottom mount and top mount disconnecting, leaving the container mounted to the long-range transport.

15. The system of claim 14, wherein the top mount comprises pins and the bottom mount comprises holes, the pins configured to extend and mate with the holes, attaching the container to the short-range tractor.

16. The system of claim 14, wherein the overhead mount comprises lips that extends over both sides of the container and the hanging mount comprises two grooves with end caps, the lips resting in the grooves between the end caps, the container engaging the grooves by being raised up such that the lip passes over the end caps, aligning the lips with the grooves, and lowering the container until the lips rest in the grooves.

17. The system of claim 16, wherein the short-range tractor is configured to raise the container by hydraulic suspension, move the container to align the lips with the grooves, and lower the container, disengaging top mount from the bottom mount when the lips reach the grooves, wherein removal of the container from the grooves involves reversing these steps.

* * * * *